(12) United States Patent
Richard et al.

(10) Patent No.: US 11,835,955 B2
(45) Date of Patent: Dec. 5, 2023

(54) SYSTEMS AND METHODS FOR MONITORING OFF-ROAD VEHICLES

(71) Applicant: Camso Inc., Magog (CA)

(72) Inventors: Simon Richard, Sherbrooke (CA); Eric Blondeau, Magog (CA); Jean-Francois Migneault, Magog (CA); Ghislain Laperle, Sherbrooke (CA); Michel Deslauriers, Magog (CA); David Gingras, Magog (CA); Jeremie Zuchoski, Sherbrooke (CA); Jake Dalphond, Magog (CA); Stephan Georgiev, Saint-Hubert (CA); Martin Tremblay, Montreal (CA)

(73) Assignee: Camso Inc., Magog (CA)

( * ) Notice: Subject to any disclaimer, the term of this patent is extended or adjusted under 35 U.S.C. 154(b) by 148 days.

(21) Appl. No.: 16/770,746

(22) PCT Filed: Dec. 7, 2018

(86) PCT No.: PCT/CA2018/051567
§ 371 (c)(1),
(2) Date: Jun. 8, 2020

(87) PCT Pub. No.: WO2019/109191
PCT Pub. Date: Jun. 13, 2019

(65) Prior Publication Data
US 2021/0173399 A1   Jun. 10, 2021

Related U.S. Application Data

(60) Provisional application No. 62/724,846, filed on Aug. 30, 2018, provisional application No. 62/596,507, filed on Dec. 8, 2017.

(51) Int. Cl.
*B62D 55/24* (2006.01)
*B60K 31/00* (2006.01)
(Continued)

(52) U.S. Cl.
CPC ......... *G05D 1/0212* (2013.01); *A01B 79/005* (2013.01); *G06V 20/56* (2022.01); *G05D 2201/0201* (2013.01)

(58) Field of Classification Search
None
See application file for complete search history.

(56) References Cited

U.S. PATENT DOCUMENTS 1,539,582 A   5/1925  Landry
1,673,541 A   6/1928  Wilson
(Continued)

FOREIGN PATENT DOCUMENTS

CA   2606039 A1   4/2009
CA   2838935 A1   1/2013
(Continued)

OTHER PUBLICATIONS

Wikipedia, Thermocouple, Nov. 21, 2017, provided by "https://en.wikipedia.org/w/index.php?title=Thermocouple&oldid=811478000" on Dec. 1, 2022 (Year: 2017).*
(Continued)

*Primary Examiner* — Adam D Tissot
*Assistant Examiner* — Laura E Linhardt
(74) *Attorney, Agent, or Firm* — Hahn Loeser & Parks LLP; Bret A. Hrivnak

(57) ABSTRACT

A vehicle (e.g., an agricultural vehicle or other off-road vehicle) comprising a track system can be monitored to obtain information regarding the vehicle, including information regarding the track system, such as one or more parameters (e.g., a temperature, a pressure, an acceleration, an identifier, etc.) of the track system and/or one or more characteristics of an environment of the track system (e.g., a compliance, a profile, a soil moisture level, etc. of the ground beneath the track system), which can be used for
(Continued)

various purposes, such as, for example, to: convey the information to a user (e.g., an operator of the vehicle); control the vehicle (e.g., a speed of the vehicle, operation of a work implement, etc.); transmit the information to a remote party (e.g., a provider such as a manufacturer or distributor of the track system and/or of the vehicle; a supplier of a substance such as fertilizer used where the vehicle is located; etc.); control equipment (e.g., an irrigation system, a fertilizing system, etc.) external to the vehicle; etc.

22 Claims, 44 Drawing Sheets

(51) Int. Cl.
    *B62D 55/06*     (2006.01)
    *B62D 55/125*     (2006.01)
    *G01K 13/06*     (2006.01)
    *G01C 22/00*     (2006.01)
    *G07C 5/02*     (2006.01)
    *G07C 5/08*     (2006.01)
    *G05D 1/02*     (2020.01)
    *A01B 79/00*     (2006.01)
    *G06V 20/56*     (2022.01)

(56) References Cited

U.S. PATENT DOCUMENTS

| | | |
|---|---|---|
| 2,025,999 A | 12/1935 | Myers |
| 2,040,696 A | 5/1936 | Johnston |
| 2,369,130 A | 2/1945 | Benson |
| 2,461,150 A | 2/1949 | Flynn |
| 2,523,182 A | 9/1950 | Battaglia |
| 2,562,264 A | 7/1951 | Ford |
| 2,596,919 A | 5/1952 | Smith |
| 2,854,294 A | 9/1958 | Bannister |
| 3,019,061 A | 1/1962 | Schomers |
| 3,118,709 A | 1/1964 | Case |
| 3,464,476 A | 9/1969 | Scheuba |
| 3,582,154 A | 6/1971 | Russ, Sr. |
| 3,612,626 A | 10/1971 | Fuchs |
| 3,747,995 A | 7/1973 | Russ, Sr. |
| 3,747,996 A | 7/1973 | Huber |
| 3,767,275 A | 10/1973 | Russ, Sr. |
| 3,781,067 A | 12/1973 | Dodson et al. |
| 3,858,948 A | 1/1975 | Johnson et al. |
| 3,887,244 A | 6/1975 | Haslett et al. |
| 3,914,990 A | 10/1975 | Borg |
| 3,944,006 A | 3/1976 | Lassanske |
| 3,981,943 A | 9/1976 | Fujio et al. |
| 4,059,313 A | 11/1977 | Beyers et al. |
| RE29,718 E | 8/1978 | Reinsma et al. |
| 4,150,858 A | 4/1979 | Fox et al. |
| 4,218,101 A | 8/1980 | Thompson |
| 4,279,449 A | 7/1981 | Martin et al. |
| 4,538,860 A | 9/1985 | Edwards et al. |
| 4,583,791 A | 4/1986 | Nagata et al. |
| 4,586,757 A | 5/1986 | Bloechlinger |
| 4,587,280 A | 5/1986 | Guha et al. |
| 4,607,892 A | 8/1986 | Payne et al. |
| 4,614,508 A | 9/1986 | Kerivan |
| 4,696,520 A | 9/1987 | Henke et al. |
| 4,721,498 A | 1/1988 | Grob |
| D298,018 S | 10/1988 | Cartwright |
| 4,843,114 A | 6/1989 | Touchet et al. |
| 4,844,561 A | 7/1989 | Savage et al. |
| 4,880,283 A | 11/1989 | Savage et al. |
| 4,953,919 A | 9/1990 | Langford |
| 4,953,921 A | 9/1990 | Burns |
| 4,981,188 A | 1/1991 | Kadela |
| 5,018,591 A | 5/1991 | Price |
| 5,050,710 A | 9/1991 | Bargfrede |
| 5,117,930 A | 6/1992 | Argouarc'h |
| 5,145,242 A | 9/1992 | Togashi |
| 5,190,363 A | 3/1993 | Brittain et al. |
| 5,299,860 A | 4/1994 | Anderson |
| 5,320,585 A | 6/1994 | Kato |
| 5,352,029 A | 10/1994 | Nagorcka |
| 5,362,142 A | 11/1994 | Katoh |
| 5,368,115 A | 11/1994 | Crabb |
| 5,380,076 A | 1/1995 | Hori |
| 5,447,365 A | 9/1995 | Muramatsu et al. |
| 5,452,949 A | 9/1995 | Kelderman |
| 5,482,364 A | 1/1996 | Edwards et al. |
| 5,498,188 A | 3/1996 | Deahr |
| 5,511,869 A | 4/1996 | Edwards et al. |
| 5,513,683 A | 5/1996 | Causa et al. |
| 5,529,267 A | 6/1996 | Giras et al. |
| 5,540,489 A | 7/1996 | Muramatsu et al. |
| 5,632,537 A | 5/1997 | Yoshimura et al. |
| 5,707,123 A | 1/1998 | Grob |
| 5,722,745 A | 3/1998 | Courtemanche et al. |
| 5,813,733 A | 9/1998 | Hori et al. |
| 5,866,265 A | 2/1999 | Reilly et al. |
| 5,894,900 A | 4/1999 | Yamamoto et al. |
| 5,904,217 A | 5/1999 | Yamamoto et al. |
| 5,984,438 A | 11/1999 | Tsunoda et al. |
| 5,997,109 A | 12/1999 | Kautsch |
| 6,000,766 A | 12/1999 | Takeuchi et al. |
| 6,024,183 A | 2/2000 | Dietz et al. |
| 6,030,057 A | 2/2000 | Fikse |
| 6,056,656 A | 5/2000 | Kitano et al. |
| 6,065,818 A | 5/2000 | Fischer |
| 6,068,354 A | 5/2000 | Akiyama et al. |
| 6,074,025 A | 6/2000 | Juncker et al. |
| 6,079,802 A | 6/2000 | Nishimura et al. |
| 6,095,275 A | 8/2000 | Shaw |
| 6,120,405 A | 9/2000 | Oertley et al. |
| 6,129,426 A | 10/2000 | Tucker |
| 6,139,121 A | 10/2000 | Muramatsu |
| 6,153,686 A | 11/2000 | Granatowicz et al. |
| 6,170,925 B1 | 1/2001 | Ono |
| 6,176,557 B1 | 1/2001 | Ono |
| 6,186,604 B1 | 2/2001 | Fikse |
| 6,193,335 B1 | 2/2001 | Edwards |
| 6,206,492 B1 | 3/2001 | Moser |
| 6,224,172 B1 | 5/2001 | Goodwin |
| 6,241,327 B1 | 6/2001 | Gleasman et al. |
| 6,259,361 B1 | 7/2001 | Robillard et al. |
| 6,296,329 B1 | 10/2001 | Rodgers et al. |
| 6,299,264 B1 | 10/2001 | Kautsch et al. |
| 6,300,396 B1 | 10/2001 | Tsunoda et al. |
| 6,352,320 B1 | 3/2002 | Bonko et al. |
| 6,386,652 B1 | 5/2002 | Bonko |
| 6,386,653 B1 | 5/2002 | Brandenburger |
| 6,386,654 B1 | 5/2002 | Singer et al. |
| 6,416,142 B1 | 7/2002 | Oertley |
| 6,474,756 B2 | 11/2002 | Hori et al. |
| 6,494,548 B2 | 12/2002 | Courtemanche |
| 6,536,852 B2 | 3/2003 | Katayama et al. |
| 6,536,853 B2 | 3/2003 | Egle et al. |
| 6,568,769 B1 | 5/2003 | Watanabe et al. |
| 6,581,449 B1 | 6/2003 | Brown et al. |
| D476,599 S | 7/2003 | Whittington |
| 6,588,862 B1 | 7/2003 | Pringiers |
| 6,637,276 B2 | 10/2003 | Adderton et al. |
| 6,652,043 B2 | 11/2003 | Oertley |
| 6,671,609 B2 | 12/2003 | Nantz et al. |
| 6,698,850 B2 | 3/2004 | Ueno |
| D488,171 S | 4/2004 | Juncker et al. |
| 6,716,012 B2 | 4/2004 | Yovichin et al. |
| 6,733,091 B2 | 5/2004 | Deland et al. |
| 6,733,093 B2 | 5/2004 | Deland et al. |
| 6,769,746 B2 | 8/2004 | Rodgers et al. |
| 6,800,236 B1 | 10/2004 | Kurata et al. |
| 6,848,757 B2 | 2/2005 | Ueno |
| 6,874,586 B2 | 4/2005 | Boivin et al. |
| D505,136 S | 5/2005 | Brazier |
| 6,904,986 B2 | 6/2005 | Brazier |
| 6,913,329 B1 | 7/2005 | Rodgers et al. |
| 6,921,197 B2 | 7/2005 | Aubel et al. |

(56) References Cited

U.S. PATENT DOCUMENTS

| | | |
|---|---|---|
| 6,923,515 B2 | 8/2005 | Konickson et al. |
| 6,932,442 B2 | 8/2005 | Hori |
| 6,935,708 B2 | 8/2005 | Courtemanche |
| 6,948,784 B2 | 9/2005 | Wodrich et al. |
| 6,962,222 B2 | 11/2005 | Kirihata |
| 6,964,462 B2 | 11/2005 | Katoh et al. |
| 6,974,196 B2 | 12/2005 | Gagne et al. |
| 7,001,294 B2 | 2/2006 | Fukuda |
| 7,032,636 B2 | 4/2006 | Salakari |
| 7,077,216 B2 | 7/2006 | Juncker |
| D528,133 S | 9/2006 | Brazier |
| 7,114,788 B2 | 10/2006 | Deland et al. |
| 7,131,508 B2 | 11/2006 | Brazier |
| 7,137,675 B1 | 11/2006 | Simula et al. |
| 7,197,922 B2 | 4/2007 | Rimkus et al. |
| 7,202,777 B2 | 4/2007 | Tsuji et al. |
| 7,222,924 B2 | 5/2007 | Christianson |
| 7,229,141 B2 | 6/2007 | Dandurand et al. |
| 7,252,348 B2 | 8/2007 | Gingras |
| 7,293,844 B2 | 11/2007 | Uchiyama |
| D556,791 S | 12/2007 | Brazier |
| 7,316,251 B2 | 1/2008 | Kogure et al. |
| 7,325,888 B2 | 2/2008 | Fujita et al. |
| 7,367,637 B2 | 5/2008 | Gleasman |
| 7,407,236 B2 | 8/2008 | Fukushima |
| 7,413,268 B2 | 8/2008 | Kato et al. |
| 7,416,266 B2 | 8/2008 | Soucy et al. |
| 7,497,530 B2 | 3/2009 | Bessette |
| 7,567,171 B2 | 7/2009 | Dufournier |
| 7,597,161 B2 | 10/2009 | Brazier |
| D603,880 S | 11/2009 | Brazier |
| 7,625,050 B2 | 12/2009 | Bair |
| 7,676,307 B2 | 3/2010 | Schmitt et al. |
| 7,708,092 B2 | 5/2010 | Despres |
| 7,729,823 B2 | 6/2010 | Ruoppolo |
| 7,740,094 B2 | 6/2010 | Pelletier |
| 7,778,741 B2 | 8/2010 | Rao et al. |
| 7,779,947 B2 | 8/2010 | Stratton |
| 7,784,884 B2 | 8/2010 | Soucy et al. |
| 7,798,260 B2 | 9/2010 | Albright et al. |
| 7,823,987 B2 | 11/2010 | Dandurand et al. |
| 7,866,766 B2 | 1/2011 | Berg |
| 7,914,088 B2 | 3/2011 | Bair |
| 7,914,089 B2 | 3/2011 | Bair |
| D644,670 S | 9/2011 | Barrelmeyer |
| 8,122,581 B1 | 2/2012 | Hurst et al. |
| 8,327,960 B2 | 12/2012 | Couture et al. |
| 8,342,257 B2 | 1/2013 | Rosenboom |
| D680,561 S | 4/2013 | Zuchoski et al. |
| D681,071 S | 4/2013 | Zuchoski et al. |
| D683,371 S | 5/2013 | Aube |
| D683,769 S | 6/2013 | Aube |
| 8,567,876 B2 | 10/2013 | Wellman |
| 8,628,152 B2 | 1/2014 | Delisle et al. |
| 8,736,147 B1 | 5/2014 | Wang |
| D711,928 S | 8/2014 | Brazier |
| 8,985,250 B1 | 3/2015 | Lussier et al. |
| 9,033,431 B1 | 5/2015 | Zuchoski et al. |
| 9,067,631 B1 | 6/2015 | Lussier et al. |
| 9,334,001 B2 | 5/2016 | Lussier et al. |
| 9,855,843 B2 | 1/2018 | Vik et al. |
| 9,878,750 B2 | 1/2018 | Leblanc et al. |
| 9,880,075 B2 | 1/2018 | Finch et al. |
| 9,975,554 B2 | 5/2018 | Lussier et al. |
| 10,006,836 B2 | 6/2018 | Monti et al. |
| 10,272,959 B2 | 4/2019 | Zuchoski et al. |
| 10,328,982 B2 | 6/2019 | Lussier et al. |
| 10,745,069 B2 | 8/2020 | Gustafson |
| 10,783,723 B2 | 9/2020 | Richard et al. |
| 10,933,877 B2 | 3/2021 | Lussier et al. |
| 11,046,377 B2 | 6/2021 | Lussier et al. |
| 11,167,810 B2 | 11/2021 | Boily et al. |
| 11,186,330 B2 | 11/2021 | Zuchoski et al. |
| 2002/0070607 A1 | 6/2002 | Edwards |
| 2002/0140288 A1 | 10/2002 | Herberger, Sr. et al. |
| 2002/0145335 A1 | 10/2002 | Soucy et al. |
| 2003/0019133 A1 | 1/2003 | Hori |
| 2003/0034189 A1 | 2/2003 | Lemke et al. |
| 2003/0034690 A1 | 2/2003 | Hori et al. |
| 2003/0080618 A1 | 5/2003 | Krishnan et al. |
| 2003/0089534 A1 | 5/2003 | Kanzler et al. |
| 2003/0161687 A1 | 8/2003 | Kirihata |
| 2004/0004395 A1 | 1/2004 | Soucy et al. |
| 2004/0070273 A1 | 4/2004 | Safe et al. |
| 2004/0084962 A1 | 5/2004 | Courtemanche |
| 2004/0130212 A1 | 7/2004 | Ishibashi |
| 2004/0135433 A1 | 7/2004 | Inaoka et al. |
| 2005/0035654 A1 | 2/2005 | Tamaru et al. |
| 2005/0056468 A1 | 3/2005 | Tucker |
| 2005/0103540 A1 | 5/2005 | Lavoie |
| 2005/0104449 A1 | 5/2005 | Lavoie et al. |
| 2005/0104450 A1 | 5/2005 | Gagne et al. |
| 2005/0168069 A1 | 8/2005 | Ueno |
| 2006/0060395 A1 | 3/2006 | Boivin et al. |
| 2006/0090558 A1 | 5/2006 | Raskas |
| 2006/0103236 A1 | 5/2006 | Soucy et al. |
| 2006/0124366 A1 | 6/2006 | Le Masne De Chermont |
| 2006/0144480 A1 | 7/2006 | Takayama et al. |
| 2006/0175108 A1 | 8/2006 | Kubota |
| 2006/0220456 A1 | 10/2006 | Sugahara |
| 2006/0248484 A1 | 11/2006 | Baumgartner et al. |
| 2006/0273660 A1 | 12/2006 | Dandurand et al. |
| 2007/0046100 A1 | 3/2007 | McGilvrey et al. |
| 2007/0075456 A1 | 4/2007 | Feldmann |
| 2007/0126286 A1 | 6/2007 | Feldmann et al. |
| 2007/0159004 A1 | 7/2007 | St-Amant |
| 2007/0251621 A1 | 11/2007 | Prost |
| 2007/0252433 A1 | 11/2007 | Fujita |
| 2008/0007118 A1 | 1/2008 | Fujita |
| 2008/0073971 A1 | 3/2008 | Paradis et al. |
| 2008/0084111 A1 | 4/2008 | Rainer |
| 2008/0100134 A1 | 5/2008 | Soucy et al. |
| 2008/0136255 A1 | 6/2008 | Feldmann et al. |
| 2008/0169147 A1 | 7/2008 | Brazier |
| 2008/0179124 A1 | 7/2008 | Stratton |
| 2008/0203813 A1 | 8/2008 | Doyle |
| 2008/0211300 A1 | 9/2008 | Matsuo et al. |
| 2008/0211301 A1 | 9/2008 | Jee et al. |
| 2009/0085398 A1 | 4/2009 | Maltais |
| 2009/0102283 A1 | 4/2009 | Choi |
| 2009/0166101 A1 | 7/2009 | Wenger et al. |
| 2009/0195062 A1 | 8/2009 | Uchida |
| 2009/0302676 A1 | 12/2009 | Brazier |
| 2009/0302677 A1 | 12/2009 | Sugihara |
| 2009/0309415 A1 | 12/2009 | Shimozono |
| 2009/0326109 A1 | 12/2009 | Kameda et al. |
| 2010/0012399 A1 | 1/2010 | Hansen |
| 2010/0033010 A1 | 2/2010 | Shimozono |
| 2010/0079238 A1 | 4/2010 | Gravelle et al. |
| 2010/0095506 A1 | 4/2010 | Bair |
| 2010/0096915 A1 | 4/2010 | Hagio |
| 2010/0096917 A1 | 4/2010 | Bair |
| 2010/0121644 A1 | 5/2010 | Glasser |
| 2010/0133019 A1 | 6/2010 | Muemken |
| 2010/0139994 A1 | 6/2010 | Hansen |
| 2010/0191417 A1 | 7/2010 | Murahashi et al. |
| 2010/0194553 A1 | 8/2010 | Mizutani et al. |
| 2010/0230185 A1 | 9/2010 | Mallette et al. |
| 2010/0253138 A1 | 10/2010 | Despres |
| 2010/0256946 A1 | 10/2010 | Carresjo et al. |
| 2010/0283317 A1 | 11/2010 | Soucy et al. |
| 2011/0068620 A1 | 3/2011 | Delisle et al. |
| 2011/0121644 A1 | 5/2011 | Wellman |
| 2011/0148189 A1 | 6/2011 | Courtemanche et al. |
| 2011/0301825 A1 | 12/2011 | Grajkowski et al. |
| 2011/0315459 A1 | 12/2011 | Zuchoski et al. |
| 2012/0001478 A1 | 1/2012 | Zuchoski et al. |
| 2012/0056473 A1 | 3/2012 | Hashimoto et al. |
| 2012/0104840 A1 | 5/2012 | Zuchoski et al. |
| 2012/0242142 A1 | 9/2012 | Kautsch et al. |
| 2012/0242143 A1 | 9/2012 | Feldmann |
| 2012/0253590 A1 | 10/2012 | Fink |
| 2012/0306916 A1 | 12/2012 | Marumoto et al. |
| 2013/0033271 A1 | 2/2013 | Woodard |

(56) References Cited

U.S. PATENT DOCUMENTS

| | | |
|---|---|---|
| 2013/0073157 A1 | 3/2013 | Person et al. |
| 2013/0082846 A1 | 4/2013 | McKinley et al. |
| 2013/0126196 A1 | 5/2013 | Rosenboom |
| 2013/0134772 A1 | 5/2013 | Dandurand et al. |
| 2013/0134773 A1 | 5/2013 | Dandurand et al. |
| 2013/0162016 A1 | 6/2013 | Lajoie et al. |
| 2013/0245911 A1 | 9/2013 | Nakajima et al. |
| 2013/0255354 A1 | 10/2013 | Hawkins et al. |
| 2013/0325266 A1 | 12/2013 | Padilla et al. |
| 2014/0105481 A1 | 4/2014 | Hasselbusch et al. |
| 2014/0125117 A1 | 5/2014 | Weeks et al. |
| 2014/0180534 A1 | 6/2014 | Son |
| 2014/0182960 A1 | 7/2014 | Bedard et al. |
| 2014/0288763 A1 | 9/2014 | Bennett et al. |
| 2014/0324301 A1 | 10/2014 | Rebinsky |
| 2015/0042152 A1 | 2/2015 | Lussier et al. |
| 2015/0042153 A1 | 2/2015 | Lussier et al. |
| 2015/0107975 A1 | 4/2015 | Chen et al. |
| 2015/0129329 A1 | 5/2015 | Cox |
| 2015/0191173 A1 | 7/2015 | Lussier et al. |
| 2015/0321710 A1 | 11/2015 | Zuchoski et al. |
| 2016/0052572 A1 | 2/2016 | McKinley et al. |
| 2016/0059779 A1 | 3/2016 | Vandendriessche |
| 2016/0121945 A1 | 5/2016 | Rust et al. |
| 2016/0129954 A1 | 5/2016 | Hasselbusch et al. |
| 2016/0236733 A1 | 8/2016 | Tiede et al. |
| 2016/0332682 A1 | 11/2016 | Lussier et al. |
| 2017/0036714 A1 | 2/2017 | Lunkenbein |
| 2017/0087987 A1 | 3/2017 | Vik et al. |
| 2017/0094894 A1* | 4/2017 | Heim ............... A01C 7/203 |
| 2017/0174277 A1 | 6/2017 | Zuchoski et al. |
| 2017/0177011 A1 | 6/2017 | Garvin et al. |
| 2018/0043949 A1 | 2/2018 | Boily |
| 2018/0093724 A1 | 4/2018 | Boily |
| 2018/0172557 A1 | 6/2018 | Ghidotti Piovan et al. |
| 2018/0190045 A1* | 7/2018 | Richard ............... G07C 5/0808 |
| 2018/0237020 A1 | 8/2018 | Lussier et al. |
| 2018/0265145 A1* | 9/2018 | Todd ............... B60K 31/00 |
| 2018/0364744 A1 | 12/2018 | Garvin et al. |
| 2019/0116740 A1* | 4/2019 | Maddux ............... A01C 21/007 |
| 2019/0351957 A1 | 11/2019 | Zuchoski et al. |
| 2019/0359270 A1 | 11/2019 | Lussier et al. |
| 2020/0070906 A1 | 3/2020 | Laperle et al. |
| 2021/0024150 A1 | 1/2021 | Boily et al. |
| 2021/0074089 A1 | 3/2021 | Boily et al. |
| 2021/0197625 A1 | 7/2021 | Laperle et al. |
| 2021/0213954 A1 | 7/2021 | Lussier et al. |
| 2021/0339758 A1 | 11/2021 | Laperle et al. |
| 2022/0055699 A1 | 2/2022 | Desmarais et al. |
| 2022/0063740 A1 | 3/2022 | Boily et al. |

FOREIGN PATENT DOCUMENTS

| | | |
|---|---|---|
| CA | 2978482 A1 | 9/2016 |
| CA | 3064100 A1 | 9/2016 |
| CA | 2991072 | 1/2017 |
| CA | 2947575 A1 | 5/2017 |
| CA | 3110606 | 3/2020 |
| CN | 110588813 | 12/2019 |
| DE | 20207342 U1 | 8/2002 |
| EP | 0578504 A2 | 1/1994 |
| EP | 1008509 A1 | 6/2000 |
| EP | 1211169 A2 | 6/2002 |
| EP | 1260429 A2 | 11/2002 |
| EP | 1273504 A1 | 1/2003 |
| EP | 1283152 A1 | 2/2003 |
| EP | 1325820 B1 | 9/2004 |
| EP | 1506913 A1 | 2/2005 |
| EP | 1882627 A1 | 1/2008 |
| EP | 1953070 A1 | 8/2008 |
| EP | 2014542 A1 | 1/2009 |
| EP | 2119620 A1 | 11/2009 |
| EP | 3185097 | 6/2017 |
| EP | 3265368 A1 | 1/2018 |
| EP | 3313717 A1 | 5/2018 |
| EP | 3721200 | 10/2020 |
| EP | 3721200 A1 | 10/2020 |
| EP | 3747746 A1 | 12/2020 |
| EP | 3812249 | 4/2021 |
| EP | 3844473 | 7/2021 |
| EP | 3844474 | 7/2021 |
| EP | 3960593 | 2/2022 |
| GB | 2229410 A | 9/1990 |
| GB | 2360501 | 9/2001 |
| JP | H02074476 | 3/1990 |
| JP | H11129946 A | 5/1999 |
| JP | 2000053037 A | 2/2000 |
| JP | 2003011860 A | 1/2003 |
| JP | 2003089366 A | 3/2003 |
| JP | 2004330830 A | 11/2004 |
| JP | 2006103482 A | 4/2006 |
| JP | 2007022304 A | 2/2007 |
| JP | 2009061829 A | 3/2009 |
| JP | 2009248924 A | 10/2009 |
| JP | 2010018091 A | 1/2010 |
| JP | 2010047040 A | 3/2010 |
| JP | 2010089729 A | 4/2010 |
| KR | 100829059 | 5/2008 |
| KR | 20120055071 A | 5/2012 |
| SU | 1446017 A2 | 12/1988 |
| WO | 2008088355 A1 | 7/2008 |
| WO | 2008108439 A1 | 9/2008 |
| WO | 2009105892 A1 | 9/2009 |
| WO | 2009106617 A1 | 9/2009 |
| WO | 2013002781 A1 | 1/2013 |
| WO | 2014056089 A1 | 4/2014 |
| WO | 2014168851 A1 | 10/2014 |
| WO | 2016138592 A1 | 9/2016 |
| WO | 2017000068 A1 | 1/2017 |
| WO | 2017049393 | 3/2017 |
| WO | 2019109191 A1 | 6/2019 |
| WO | 2019225752 | 11/2019 |
| WO | 2020041897 A1 | 3/2020 |
| WO | 2020041899 A1 | 3/2020 |
| WO | 2020049532 | 3/2020 |
| WO | 2021189154 | 9/2021 |

OTHER PUBLICATIONS

Non-final Office Action dated Oct. 5, 2020, in connection with U.S. Appl. No. 15/724,733, 7 pages.
Non-Final Office Action dated Sep. 22, 2014 in connection with U.S. Appl. No. 13/325,796, 25 pages.
Non-Final Office Action dated Sep. 29, 2014 in connection with U.S. Appl. No. 13/325,783, 27 pages.
Notice of Allowance dated Apr. 2, 2020, in connection with U.S. Appl. No. 15/724,733, 5 pages.
Notice of Allowance dated Dec. 17, 2018 in connection with U.S. Appl. No. 15/454,881, 5 pages.
Notice of Allowance dated Feb. 15, 2019 in connection with U.S. Appl. No. 15/139,572, 7 pages.
Notice of Allowance dated Jan. 11, 2016 in connection with U.S. Appl. No. 13/326,278, 7 pages.
Notice of Allowance dated Jan. 19, 2018 in connection with U.S. Appl. No. 14/665,075, 8 pages.
Notice of Allowance dated Jan. 21, 2015 in connection with U.S. Appl. No. 13/326,110, 6 pages.
Restriction Requirement dated Oct. 25, 2019 in connection with U.S. Appl. No. 15/555,148, 7 pages.
European Extended Search Report dated Mar. 20, 2019 in connection with European Patent Application No. 16758408.5, 8 pages.
International Search Report dated Jun. 29, 2016 in connection with International Patent Application No. PCT/CA2016/050234, 3 pages.
Written Opinion dated Jun. 29, 2016 in connection with International Patent Application No. PCT/CA2016/050234, 3 pages.
Communication pursuant to Article 94 (3) EPC dated Aug. 22, 2019, in connection with European Patent Application No. 16816886.2, 4 pages.
Communication pursuant to Rule 63(1) EPC dated Nov. 8, 2018 in connection with European Patent Application No. 16758408.5, 4 pages.

(56) References Cited

OTHER PUBLICATIONS

Communication under Rule 71(3) EPC dated Mar. 16, 2020, in connection with European Patent Application 16758408.5, 7 pages.
Communication under Rule 71(3) EPC dated May 6, 2020, in connection with European Patent Application No. 16816886.2, 7 pages.
European Extended Search Report dated Nov. 6, 2020, in connection with European Patent Application No. 20187079.7, 15 pages.
Ex Parte Quayle issued on Sep. 11, 2018, in connection with U.S. Appl. No. 15/139,572, 7 pages.
Examiners Report dated Apr. 7, 2020, in connection with Canadian Patent Application 3,064,100, 3 pages.
Examiners report dated Aug. 28, 2018, in connection with Canadian Patent application No. 2,991,072, 4 pages.
Examiners Report dated Feb. 1, 2018 in connection with Canadian Patent Application No. 2,991,072, 3 pages.
Examiners Report dated Jan. 11, 2018 in connection with Canadian Patent Application No. 2,978,482, 3 pages.
Examiners report dated Jan. 16, 2019 in connection with Canadian Patent Application No. 2,991,072, 3 pages.
Examiners Report dated Jul. 9, 2020, in connection with Canadian Patent Application 3,064,100, 3 pages.
Examiners Report dated Oct. 14, 2020, in connection with Canadian Patent Application 3,042,780, 4 pages.
Extended European Search Report and Written Opinion dated Sep. 13, 2013 in connection, with European Patent Application No. 10835318.6, 8 pages.
Extended European Search Report dated Jan. 9, 2019 in connection with European Patent Application No. 16816886.2, 7 pages.
Extended European Search Report dated Mar. 20, 2019 in connection with European Patent Application No. 16758408.5, 8 pages.
Final Office Action dated Aug. 19, 2019, in connection with U.S. Appl. No. 15/724,733, 18 pages.
Final Office Action dated Aug. 24, 2018 in connection with U.S. Appl. No. 15/454,881, 30 pages.
Final Office Action dated Dec. 23, 2014 in connection with U.S. Appl. No. 13/326,132, 15 pages.
Final Office Action dated Dec. 31, 2015 in connection with U.S. Appl. No. 13/326,132, 15 pages.
Final Office Action dated Jan. 12, 2017 in connection with U.S. Appl. No. 14/665,075, 11 pages.
Final Office Action dated Jul. 6, 2020, in connection with U.S. Appl. No. 15/555,148, 20 pages.
Final Office Action dated Jun. 26, 2015 in connection with U.S. Appl. No. 13/326,278, 15 pages.
Final Office Action dated Mar. 27, 2014 in connection with U.S. Appl. No. 13/170,753, 16 pages.
Final Office Action dated Mar. 5, 2015 in connection with U.S. Appl. No. 13/325,796, 33 pages.
Final Office Action dated Sep. 8, 2017 in connection with U.S. Appl. No. 15/139,572, 14 pages.
International Search Report and Written Opinion dated Sep. 29, 2016 in connection with PCT/CA2016/050760, 8 pages.
International Search Report and Written Opinion dated Nov. 12, 2019, in connection with International PCT Application No. PCT/CA2019/051217, 8 pages.
International Search Report and Written Opinion dated Oct. 29, 2019 in connection with International PCT Application No. PCT/CA2019/051219, 9 pages.
International Search Report dated Mar. 5, 2019, in connection with International PCT application No. PCT/CA2018/051567, 4 pages.
Interview Summary dated Dec. 10, 2018 in connection with U.S. Appl. No. 15/139,572, 3 pages.
Interview Summary dated Nov. 2, 2018 in connection with U.S. Appl. No. 15/454,881, 3 pages.
Interview Summary Report dated Sep. 12, 2015 in connection with U.S. Appl. No. 13/326,278, 3 pages.
Non-Final Office Action dated Apr. 5, 2016 in connection with U.S. Appl. No. 14/665,075, 5 pages.
Non-Final Office Action dated Apr. 9, 2019 in connection with U.S. Appl. No. 15/724,733, 56 pages.
Non-Final Office Action dated Dec. 1, 2016 in connection with U.S. Appl. No. 15/139,572, 5 pages.
Non-Final Office Action dated Dec. 30, 2019 in connection with U.S. Appl. No. 15/740,976, 16 pages.
Non-Final Office Action dated Feb. 21, 2017 in connection with U.S. Appl. No. 14/721,326, 12 pages.
Non-Final Office Action dated Jan. 11, 2017 in connection with U.S. Appl. No. 14/886,327, 11 pages.
Non-Final Office Action dated Jul. 10, 2014 in connection with U.S. Appl. No. 13/326,110, 16 pages.
Non-Final Office Action dated Jul. 10, 2014 in connection with U.S. Appl. No. 13/424,459, 11 pages.
Non-Final Office Action dated Jul. 14, 2014 in connection with U.S. Appl. No. 13/112,840, 16 pages.
Non-Final Office Action dated Jun. 12, 2017 in connection with U.S. Appl. No. 14/665,075, 9 pages.
Non-Final Office Action dated Jun. 2, 2014 in connection with U.S. Appl. No. 13/326,010, 6 pages.
Non-Final Office Action dated Jun. 24, 2015 in connection with U.S. Appl. No. 13/326,132, 17 pages.
Non-Final Office Action dated Mar. 20, 2018 in connection with U.S. Appl. No. 15/139,572, 7 pages.
Non-Final Office Action dated Mar. 6, 2015 in connection with U.S. Appl. No. 13/326,278, 16 pages.
Non-Final Office Action dated May 17, 2018 in connection with U.S. Appl. No. 15/454,881, 8 pages.
Non-Final Office Action dated Oct. 11, 2017 in connection with U.S. Appl. No. 14/665,075, 6 pages.
Non-Final Office Action dated Oct. 2, 2013 in connection with U.S. Appl. No. 13/170,753, 15 pages.
European Extended Search Report dated Aug. 18, 2021, in connection with European Patent Application No. 18887057.0, 8 pages.
Examiner's report dated Jan. 22, 2021, in connection with Canadian Patent Application No. 2,991,072, 3 pages.
Non-Final Office Action dated Dec. 14, 2020, in connection with U.S. Appl. No. 15/555,148, 9 pages.
Notice of Allowance dated Feb. 23, 2021 in connection with U.S. Appl. No. 15/724,733, 18 pages.
Final Office Action dated Mar. 9, 2021, in connection with U.S. Appl. No. 15/555,148, 14 pages.
Notice of Allowance dated Mar. 4, 2015 in connection with U.S. Appl. No. 13/325,783, 13 pages.
Notice of Allowance dated May 20, 2020 in connection with U.S. Appl. No. 15/740,976, 12 pages.
Notice of Allowance dated May 30, 2018 in connection with U.S. Appl. No. 15/139,572, 10 pages.
Notice of Allowance dated Nov. 14, 2014 in connection with U.S. Appl. No. 13/326,010, 7 pages.
Notice of Allowance dated Oct. 30, 2020 in connection with U.S. Appl. No. 15/958,156, 30 pages.
Notice of Allowance dated Oct. 24, 2014 in connection with U.S. Appl. No. 13/170,753, 5 pages.
Non-Final Office Action dated Feb. 2, 2021, in connection with U.S. Appl. No. 16/360,060, 55 pages.
Non-Final Office Action dated Jan. 24, 2020 in connection with U.S. Appl. No. 15/555,148, 57 pages.
Non-Final Office Action dated May 29, 2020, in connection with U.S. Appl. No. 15/958,156, 45 pages.
Non-Final Office Action dated Nov. 9, 2012, in connection with U.S. Appl. No. 29/405,414, 9 pages.
Restriction Requirement dated Jan. 27, 2014 in connection with U.S. Appl. No. 13/326,010, 5 pages.
Restriction Requirement dated Jun. 9, 2014 in connection with U.S. Appl. No. 13/326,278, 7 pages.
Restriction Requirement dated Sep. 26, 2013 in connection with U.S. Appl. No. 13/326,010, 6 pages.
Supplementary Search Report dated Jan. 2, 2019 in connection with the European Patent Application No. 16816886, 1 page.
Written Opinion dated Mar. 5, 2019 in connection with International PCT application No. PCT/CA2018/051567, 6 pages.

(56) References Cited

OTHER PUBLICATIONS

International Search Report and Written Opinion dated Jun. 21, 2021 in connection with International PCT application No. PCT/CA2021/050404, 8 pages.
Notice of Allowance dated Jul. 9, 2021, in connection with U.S. Appl. No. 15/555,148, 6 pages.
Notice of Allowance dated Jul. 26, 2021, in connection with U.S. Appl. No. 16/360,060, 14 pages.
Extended European Search Report dated Mar. 30, 2021, in connection with European Patent Application No. 20201638.2, 10 pages.
Non-Final Office Action dated Mar. 11, 2021 in connection with U.S. Appl. No. 16/419,760, 28 pages.
Final Office Action dated Nov. 9, 2021 in connection with U.S. Appl. No. 16/419,760, 57 pages.
International Search Report and Written Opinion dated Nov. 3, 2021 in connection with International PCT application No. PCT/CA2021/051143, 17 pages.
Non-Final Office Action dated Nov. 9, 2012, in connection with U.S. Appl. No. 29/405,417, 10 pages.
Extended European Search Report dated Feb. 1, 2022, in connection with European Patent Application No. 21191893.3, 11 pages.
Bair Products, Inc. "Larry Lugs—Patented Bolt-On-Replacement Drive Lugs", http://www.bairproductsinc.com/products/larry_lugs.html, Jan. 1, 2011, 2 pages.
Bridgestone Industrial Products America Inc. "Stay on the Right Track. New Generation Features Rubber Tracks for Excavators", Brochure 2009, 12 pages.
Bridgestone Industrial Products America Inc., "Stay on the Right Track. Rubber Tracks for Track Loaders", Brochure 2009, 6 pages.
Camoplast Inc. "ATV/UTV Track Systems", 2009-2010 Catalog, 8 pages.
CAN-AM BRP, "Parts & Accessories—Track Systems", Parts, Accessories & Riding Gear Catalogue, p. 66 (2011).
Red Roo Solutions Pty Ltd—World Class Solutions for the Earth Moving Industry, "Save thousands of dollars and add thousands of hours to your tracks with Larry Lugs", http://www.redroosolutions.com.au/larrylugs.html, Jun. 8, 2009, 3 pages.
Story by Staff, BRP upgrades Apache ATV track system for Outlander—Apache system features larger footprint and power steering mode, atv.com, http://www.atc.com/news/brp-upgrades-apache-atv-track-system-for-outlander-1481.html 2 pages (Nov. 24, 2009).
Non-Final Office Action dated Nov. 9, 2012, in connection with U.S. Appl. No. 29/405,416, 9 pages.

* cited by examiner

SYSTEMS AND METHODS FOR MONITORING OFF-ROAD VEHICLES

CROSS-REFERENCE TO RELATED APPLICATION

This application claims priority from U.S. Patent Application 62/596,507, filed on Dec. 8, 2017, and U.S. Patent Application 62/724,846, filed on Aug. 30, 2018, both of which are hereby incorporated by reference herein.

FIELD

This disclosure relates generally to off-road vehicles (e.g., agricultural vehicles or other industrial vehicles, etc.) and, more particularly, to monitoring such off-road vehicles.

BACKGROUND

Off-road vehicles, including industrial vehicles such as agricultural vehicles (e.g., tractors, harvesters, combines, etc.), construction vehicles (e.g., loaders, excavators, bulldozers, etc.), and forestry vehicles (e.g., feller-bunchers, tree chippers, knuckleboom loaders, etc.), military vehicles (e.g., combat engineering vehicles (CEVs), etc.), snowmobiles, and all-terrain vehicles (ATVs), are used on soft, slippery and/or irregular grounds (e.g., soil, mud, sand, ice, snow, etc.) for work and/or other purposes. To enhance their traction and floatation on such grounds, certain off-road vehicles are equipped with track systems. In some cases, off-road vehicles may also be operable on paved roads.

For example, agricultural vehicles can travel in agricultural fields to perform agricultural work and possibly on paved roads (e.g., to travel between agricultural fields). Numerous factors affect performance of the agricultural vehicles and efficiency of agricultural work they do, including their components (e.g., track systems) and their environments (e.g., grounds on which they operate). While some of these factors may be managed by users (e.g., operators) of the agricultural vehicles, this may lead to suboptimal agricultural work, greater wear or other deterioration of components of the agricultural vehicles, and/or other issues in some cases.

Similar considerations may arise in relation to other off-road vehicles (e.g., construction vehicles, snowmobiles, ATVs, etc.) in some cases.

For these and other reasons, there is a need to improve monitoring of off-vehicles.

SUMMARY

In accordance with various aspects of this disclosure, a vehicle (e.g., an agricultural vehicle or other off-road vehicle) comprising a track system can be monitored to obtain information regarding the vehicle, including information regarding the track system, such as one or more parameters (e.g., a temperature, a pressure, an acceleration, an identifier, etc.) of the track system and/or one or more characteristics of an environment of the track system (e.g., a compliance, a profile, a soil moisture level, etc. of the ground beneath the track system), which can be used for various purposes, such as, for example, to: convey the information to a user (e.g., an operator of the vehicle); control the vehicle (e.g., a speed of the vehicle, operation of a work implement, etc.); transmit the information to a remote party (e.g., a provider such as a manufacturer or distributor of the track system and/or of the vehicle; a supplier of a substance such as fertilizer used where the vehicle is located; etc.); control equipment (e.g., an irrigation system, a fertilizing system, etc.) external to the vehicle; etc.

In accordance with an aspect, this disclosure relates to a monitoring system for a vehicle. The vehicle comprises a track system for traction of the vehicle, the track system comprises a track and a track-engaging assembly configured to move the track around the track-engaging assembly. The track-engaging assembly comprises a plurality of wheels for engaging the track, and the track is elastomeric to flex around the track-engaging assembly. The monitoring system comprises a monitoring device configured to monitor an area associated with the track system and a processing apparatus configured to issue a signal based on output of the monitoring device.

In accordance with another aspect, this disclosure relates to a monitoring system for a vehicle. The vehicle comprises a track system for traction of the vehicle, the track system comprises a track and a track-engaging assembly configured to move the track around the track-engaging assembly. The track-engaging assembly comprises a plurality of wheels for engaging the track, and the track is elastomeric to flex around the track-engaging assembly. The monitoring system comprises an optical device configured to optically monitor an area associated with the track system and a processing apparatus configured to issue a signal based on output of the optical device.

In accordance with yet another aspect, this disclosure relates to a track system for traction of a vehicle. The track system comprises a track, a track-engaging assembly configured to move the track around the track-engaging assembly. The track-engaging assembly comprises a plurality of wheels for engaging the track, and the track is elastomeric to flex around the track-engaging assembly; and an optical device configured to optically monitor an area associated with the track system.

In accordance with another aspect, this disclosure relates to a monitoring system for a vehicle. The vehicle comprises a track system for traction of the vehicle, the track system comprises a track and a track-engaging assembly configured to move the track around the track-engaging assembly. The track-engaging assembly comprises a plurality of wheels for engaging the track, and the track is elastomeric to flex around the track-engaging assembly. The monitoring system comprises a monitoring device configured to monitor soil on which the track system moves and a processing apparatus configured to issue a signal relating to compaction of the soil based on output of the monitoring device.

In accordance with another aspect, this disclosure relates to a track system for traction of a vehicle. The track system comprises a track and a track-engaging assembly configured to move the track around the track-engaging assembly. The track-engaging assembly comprises a plurality of wheels for engaging the track, and the track is elastomeric to flex around the track-engaging assembly. The track system comprises a monitoring device configured to monitor soil on which the track system moves.

In accordance with another aspect, this disclosure relates to track for traction of a vehicle. The track is mountable around a track-engaging assembly configured to move the track around the track-engaging assembly. The track-engaging assembly comprises a plurality of wheels for engaging the track, and the track is elastomeric to flex around the track-engaging assembly. The track comprises a ground-engaging outer surface for engaging the ground, an inner surface opposite to the ground-engaging outer surface and a monitoring device configured to monitor soil on which the track moves.

In accordance with another aspect, this disclosure relates to a monitoring system for a vehicle. The vehicle comprises a track system for traction of the vehicle. The track system comprises a track and a track-engaging assembly configured to move the track around the track-engaging assembly. The track-engaging assembly comprises a plurality of wheels for engaging the track, and the track is elastomeric to flex around the track-engaging assembly. The monitoring system comprises a moisture sensor configured to sense a moisture level of soil on which the track system moves and a processing apparatus configured to issue a signal based on the moisture level of the soil.

In accordance with another aspect, this disclosure relates to a track system for traction of a vehicle. The track system comprises a track and a track-engaging assembly configured to move the track around the track-engaging assembly. The track-engaging assembly comprises a plurality of wheels for engaging the track, and the track is elastomeric to flex around the track-engaging assembly. The track system comprises a moisture sensor configured to sense a moisture level of soil on which the track system moves.

In accordance with another aspect, this disclosure relates to a track for traction of a vehicle. The track is mountable around a track-engaging assembly configured to move the track around the track-engaging assembly. The track-engaging assembly comprises a plurality of wheels for engaging the track, and the track is elastomeric to flex around the track-engaging assembly. The track comprises a ground-engaging outer surface for engaging the ground, an inner surface opposite to the ground-engaging outer surface and a moisture sensor configured to sense a moisture level of soil on which the track moves.

In accordance with another aspect, this disclosure relates to a monitoring system for a vehicle. The vehicle comprises a track system for traction of the vehicle, the track system comprises a track and a track-engaging assembly configured to move the track around the track-engaging assembly. The track-engaging assembly comprises a plurality of wheels for engaging the track, and the track is elastomeric to flex around the track-engaging assembly. The monitoring system comprises a chemical sensor configured to sense a chemical characteristic of soil on which the track system moves and a processing apparatus configured to issue a signal based on the chemical characteristic of the soil.

In accordance with another aspect, this disclosure relates to a track system for traction of a vehicle. The track system comprises a track and a track-engaging assembly configured to move the track around the track-engaging assembly. The track-engaging assembly comprises a plurality of wheels for engaging the track, and the track is elastomeric to flex around the track-engaging assembly. The track sytem comprises a chemical sensor configured to sense a chemical characteristic of soil on which the track system moves.

In accordance with another aspect, this disclosure relates to a track for traction of a vehicle. The track is mountable around a track-engaging assembly configured to move the track around the track-engaging assembly. The track-engaging assembly comprises a plurality of wheels for engaging the track, and the track is elastomeric to flex around the track-engaging assembly. The track comprises a ground-engaging outer surface for engaging the ground, an inner surface opposite to the ground-engaging outer surface and a chemical sensor configured to sense a chemical characteristic of soil on which the track moves.

In accordance with another aspect, this disclosure relates to a monitoring system for a vehicle. The vehicle comprises a track system for traction of the vehicle. The track system comprises a track and a track-engaging assembly configured to move the track around the track-engaging assembly. The track-engaging assembly comprises a plurality of wheels for engaging the track, and the track is elastomeric to flex around the track-engaging assembly. The track comprises a ground-engaging outer surface, an inner surface opposite to the ground-engaging outer surface, a plurality of traction projections projecting from the ground-engaging surface, and a plurality of wheel-contacting projections projecting from the inner surface. The monitoring system comprises a monitoring device configured to monitor the track and a processing apparatus configured to issue a signal relating to presence of the traction projections and the wheel-contacting projections.

In accordance with another aspect, this disclosure relates to a track system for traction of a vehicle. The track system comprises a track comprising a ground-engaging outer surface, an inner surface opposite to the ground-engaging outer surface, a plurality of traction projections projecting from the ground-engaging surface, and a plurality of wheel-contacting projections projecting from the inner surface. The track system comprises a track-engaging assembly configured to move the track around the track-engaging assembly. The track-engaging assembly comprises a plurality of wheels for engaging the track, and the track is elastomeric to flex around the track-engaging assembly. The track system comprises a monitoring device configured to monitor the track and produce output processable to assess presence of the traction projections and the wheel-contacting projections.

In accordance with another aspect, this disclosure relates to a track for traction of a vehicle. The track is mountable around a track-engaging assembly configured to move the track around the track-engaging assembly. The track-engaging assembly comprises a plurality of wheels for engaging the track. The track is elastomeric to flex around the track-engaging assembly. The track comprises a ground-engaging outer surface for engaging the ground, an inner surface opposite to the ground-engaging outer surface, and a monitoring device configured to monitor the track and produce output processable to assess presence of the traction projections and the wheel-contacting projections.

In accordance with another aspect, this disclosure relates to a monitoring system for a vehicle. The vehicle comprises a track system for traction of the vehicle. The track system comprises a track and a track-engaging assembly configured to move the track around the track-engaging assembly. The track-engaging assembly comprises a plurality of wheels for engaging the track, the track being elastomeric to flex around the track-engaging assembly. The monitoring system comprises a monitoring device configured to monitor at least one of the track system and a road travelled upon by the vehicle and a processing apparatus configured to issue a signal relating to positioning of the track system relative to the road.

In accordance with another aspect, this disclosure relates to a track system for traction of a vehicle. The track system comprises a track comprising a ground-engaging outer surface and an inner surface opposite to the ground-engaging outer surface. The track system comprises a track-engaging assembly configured to move the track around the track-engaging assembly. The track-engaging assembly comprises a plurality of wheels for engaging the track, and the track is elastomeric to flex around the track-engaging assembly. The track system comprises a monitoring device configured to monitor at least one of the track system and a road travelled upon by the vehicle and produce output processable to assess positioning of the track system relative to the road.

In accordance with another aspect, this disclosure relates to a track for traction of a vehicle. The track is mountable around a track-engaging assembly configured to move the track around the track-engaging assembly. The track-engaging assembly comprises a plurality of wheels for engaging the track, and the track is elastomeric to flex around the track-engaging assembly. The track comprises a ground-engaging outer surface for engaging the ground, an inner surface opposite to the ground-engaging outer surface, and a monitoring device configured to monitor the track and produce output processable to assess positioning of the track relative to a road travelled upon by the vehicle.

In accordance with another aspect, this disclosure relates to a monitoring system for a vehicle. The vehicle comprises a track system for traction of the vehicle, the track system comprises a track and a track-engaging assembly configured to move the track around the track-engaging assembly. The track-engaging assembly comprising a plurality of wheels for engaging the track, and the track is elastomeric to flex around the track-engaging assembly. The monitoring system comprises a monitoring device configured to monitor an area associated with the track system and a processing apparatus configured to issue a signal directed to a powertrain of the vehicle to operate the powertrain of the vehicle differently when the vehicle is off-road than when the vehicle is on-road, based on output of the monitoring device.

In accordance with another aspect, this disclosure relates to a track system for traction of a vehicle. The track system comprises a track comprising a ground-engaging outer surface and an inner surface opposite to the ground-engaging outer surface. The track system comprises a track-engaging assembly configured to move the track around the track-engaging assembly. The track-engaging assembly comprises a plurality of wheels for engaging the track, and the track is elastomeric to flex around the track-engaging assembly. The track system comprises a monitoring device configured to monitor an area associated with the track system and produce output processable to assess whether the vehicle is off-road or on-road.

In accordance with another aspect, this disclosure relates to a track for traction of a vehicle. The track is mountable around a track-engaging assembly configured to move the track around the track-engaging assembly, the track-engaging assembly comprises a plurality of wheels for engaging the track, and the track is elastomeric to flex around the track-engaging assembly. The track comprises a ground-engaging outer surface for engaging the ground, an inner surface opposite to the ground-engaging outer surface and a monitoring device configured to monitor the track and produce output processable to assess whether the vehicle is off-road or on-road.

In accordance with another aspect, this disclosure relates to a monitoring system for a vehicle. The vehicle comprising a track system for traction of the vehicle, and the track system comprises a track and a track-engaging assembly configured to move the track around the track-engaging assembly. The track-engaging assembly comprises a plurality of wheels for engaging the track, and the track is elastomeric to flex around the track-engaging assembly. The monitoring system comprises a monitoring device configured to monitor an area associated with the track system and a processing apparatus configured to issue a signal relating to a substance used where the vehicle travels.

In accordance with another aspect, this disclosure relates to a track system for traction of a vehicle. The track system comprises a track comprising a ground-engaging outer surface and an inner surface opposite to the ground-engaging outer surface. The track system comprises a track-engaging assembly configured to move the track around the track-engaging assembly. The track-engaging assembly comprises a plurality of wheels for engaging the track, and the track is elastomeric to flex around the track-engaging assembly. The track system comprises a monitoring device configured to monitor an area associated with the track system and produce output processable to derive information regarding a substance used where the vehicle travels.

In accordance with another aspect, this disclosure relates to a track for traction of a vehicle. The track is mountable around a track-engaging assembly configured to move the track around the track-engaging assembly. The track-engaging assembly comprises a plurality of wheels for engaging the track, and the track is elastomeric to flex around the track-engaging assembly. The track comprises a ground-engaging outer surface for engaging the ground, an inner surface opposite to the ground-engaging outer surface, and a monitoring device configured to monitor the track and produce output processable to derive information regarding a substance used where the vehicle travels.

In accordance with another aspect, this disclosure relates to a monitoring system for a vehicle. The vehicle comprises a track system for traction of the vehicle. The track system comprises a track and a track-engaging assembly configured to move the track around the track-engaging assembly. The track-engaging assembly comprises a plurality of wheels for engaging the track, and the track is elastomeric to flex around the track-engaging assembly. The monitoring system comprises a monitoring device configured to monitor an area associated with the track system and a processing apparatus configured to issue a signal relating to equipment external to the vehicle.

In accordance with another aspect, this disclosure relates to a track system for traction of a vehicle. The track system comprises a track comprising a ground-engaging outer surface and an inner surface opposite to the ground-engaging outer surface. The track system comprises a track-engaging assembly configured to move the track around the track-engaging assembly. The track-engaging assembly comprises a plurality of wheels for engaging the track, and the track is elastomeric to flex around the track-engaging assembly. The track system comprises a monitoring device configured to monitor an area associated with the track system and produce output processable to derive information regarding equipment external to the vehicle.

In accordance with another aspect, this disclosure relates to a track for traction of a vehicle. The track is mountable around a track-engaging assembly configured to move the track around the track-engaging assembly. The track-engaging assembly comprises a plurality of wheels for engaging the track, and the track is elastomeric to flex around the track-engaging assembly. The track comprises a ground-engaging outer surface for engaging the ground, an inner surface opposite to the ground-engaging outer surface and a monitoring device configured to monitor the track and produce output processable to derive information regarding equipment external to the vehicle.

In accordance with another aspect, this disclosure relates to a track for traction of a vehicle. The track is mountable around a track-engaging assembly configured to move the track around the track-engaging assembly. The track-engaging assembly comprises a plurality of wheels for engaging the track, and the track is elastomeric to flex around the track-engaging assembly. The track comprises a ground-engaging outer surface for engaging the ground, an inner surface opposite to the ground-engaging outer surface, a monitoring device configured to issue a signal and a protective substance applied onto the monitoring device to cover at least part of the monitoring device and allowing the signal to pass through the protective substance and elastomeric material of the track.

In accordance with another aspect, this disclosure relates to a track for traction of a vehicle. The track is mountable around a track-engaging assembly configured to move the track around the track-engaging assembly. The track-engaging assembly comprises a plurality of wheels for engaging the track, and the track is elastomeric to flex around the track-engaging assembly. The track comprises a ground-engaging outer surface for engaging the ground, an inner surface opposite to the ground-engaging outer surface and a monitoring device configured to issue a signal. The monitoring device comprises a piezoelectric generator configured to power the monitoring device. The piezoelectric generator comprises a piezoelectric element deformable in response to deformation of a portion of elastomeric material of the track to generate power.

In accordance with another aspect, this disclosure relates to a track system for traction of a vehicle. The track system comprises a track and a track-engaging assembly configured to move the track around the track-engaging assembly. The track-engaging assembly comprises a plurality of wheels for engaging the track, and the track is elastomeric to flex around the track-engaging assembly. The track system comprises a tag associated with a component of the track system and configured to convey an identifier of the component of the track system processable by a processing apparatus.

In accordance with another aspect, this disclosure relates to a track for traction of a vehicle. The track is mountable around a track-engaging assembly configured to move the track around the track-engaging assembly. The track-engaging assembly comprises a plurality of wheels for engaging the track, and the track is elastomeric to flex around the track-engaging assembly. The track comprises a ground-engaging outer surface for engaging the ground, an inner surface opposite to the ground-engaging outer surface and a tag configured to convey an identifier of the track processable by a processing apparatus.

In accordance with another aspect, this disclosure relates to a monitoring system for a vehicle. The vehicle comprises a track system for traction of the vehicle. The track system comprises a track and a track-engaging assembly configured to move the track around the track-engaging assembly. The track-engaging assembly comprises a plurality of wheels for engaging the track, and the track is elastomeric to flex around the track-engaging assembly. The monitoring system comprises a tag associated with a component of the track system and configured to convey an identifier of the component of the track system and a processing apparatus configured to issue a signal based on the identifier of the component of the track system.

In accordance with another aspect, this disclosure relates to a monitoring system for a vehicle. The vehicle comprising a track system for traction of the vehicle. The track system comprises a track and a track-engaging assembly configured to move the track around the track-engaging assembly. The track-engaging assembly comprises a plurality of wheels for engaging the track, and the track is elastomeric to flex around the track-engaging assembly. The monitoring system comprises a monitoring device configured to monitor the track system and a processing apparatus configured to issue a signal for servicing of the track system.

In accordance with another aspect, this disclosure relates to a track system for traction of a vehicle. The track system comprises a track comprising a ground-engaging outer surface and an inner surface opposite to the ground-engaging outer surface. The track system comprises a track-engaging assembly configured to move the track around the track-engaging assembly. The track-engaging assembly comprises a plurality of wheels for engaging the track, and the track is elastomeric to flex around the track-engaging assembly. The track system comprises a monitoring device configured to monitor the track system and produce output relating to servicing of the track system.

In accordance with another aspect, this disclosure relates to a track for traction of a vehicle. The track is mountable around a track-engaging assembly configured to move the track around the track-engaging assembly. The track-engaging assembly comprises a plurality of wheels for engaging the track. The track is elastomeric to flex around the track-engaging assembly. The track comprises a ground-engaging outer surface for engaging the ground, an inner surface opposite to the ground-engaging outer surface, and a monitoring device configured to monitor the track and produce output relating to servicing of the track system.

In accordance with another aspect, this disclosure relates to a device to be retrofitted to a vehicle. The vehicle comprising a track system for traction of the vehicle. The track system comprises a track and a track-engaging assembly configured to move the track around the track-engaging assembly. The track-engaging assembly comprises a plurality of wheels for engaging the track. The track is elastomeric to flex around the track-engaging assembly. The device comprises a communication interface connectable to a standard communication interface of the vehicle and configured to receive output of a monitoring device configured to monitor an area associated with the track system and a processing apparatus configured to issue a signal based on the output of the monitoring device.

These and other aspects of this disclosure will now become apparent to those of ordinary skill in the art upon review of a description of embodiments in conjunction with accompanying drawings.

BRIEF DESCRIPTION OF THE DRAWINGS

A detailed description of embodiments is provided below, by way of example only, with reference to accompanying drawings, in which.

It is to be expressly understood that the description and drawings are only for purposes of illustrating certain embodiments and are an aid for understanding. They are not intended to and should not be limiting.

DETAILED DESCRIPTION OF EMBODIMENTS

Figure 1:
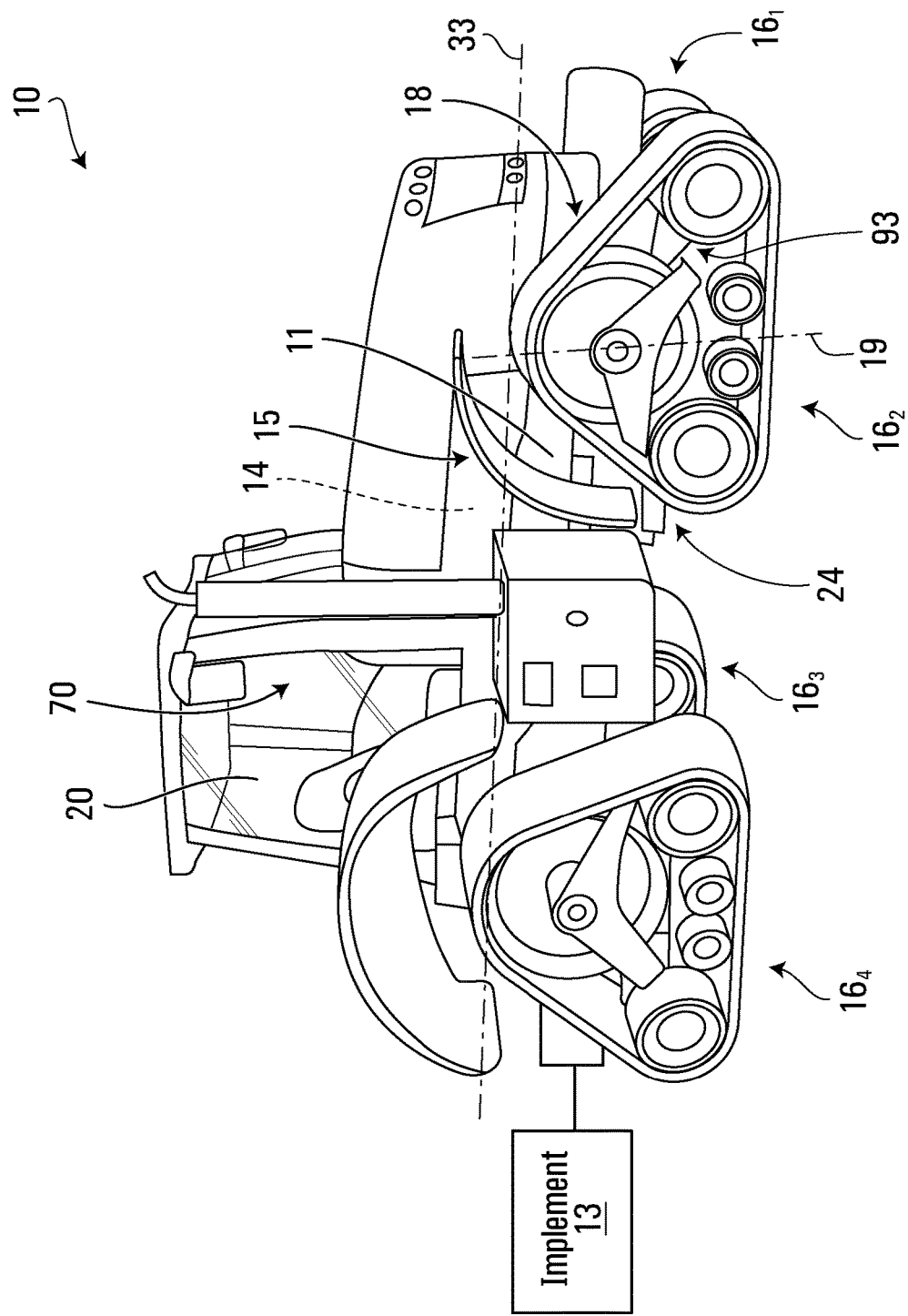
FIG. 1 shows an example of an embodiment of a vehicle comprising track systems and a monitoring system.

FIG. 1 shows an example of an embodiment of a vehicle 10 comprising track systems $16_1$-$16_4$. In this embodiment, the vehicle 10 is a heavy-duty work vehicle for performing agricultural, construction or other industrial work, or military work. More particularly, in this embodiment, the vehicle 10 is an agricultural vehicle for performing agricultural work. Specifically, in this example, the agricultural vehicle 10 is a tractor. In other examples, the agricultural vehicle 10 may be a harvester, a planter, or any other type of agricultural vehicle.

In this embodiment, the vehicle 10 comprises a frame 11, a powertrain 15, a steering mechanism 18, a suspension 24, and an operator cabin 20 that enable a user to move the vehicle 10 on the ground, including on an agricultural field and possibly on a paved road (e.g., between agricultural fields), using the track systems $16_1$-$16_4$ and perform work using a work implement 13.

As further discussed later, in this embodiment, the agricultural vehicle 10, including the track systems $16_1$-$16_4$, can be monitored (e.g., during operation of the agricultural vehicle 10) to obtain information regarding the agricultural vehicle 10, including information regarding the track systems $16_1$-$16_4$, such as one or more parameters (e.g., a temperature, a pressure, an acceleration, an identifier, etc.) of the track systems $16_1$-$16_4$ and/or one or more characteristics of an environment of the track systems $16_1$-$16_4$ (e.g., a compliance, a profile, a soil moisture level, etc. of the ground beneath the track systems $16_1$-$16_4$), which can be used for various purposes, such as, for example, to: convey the information to a user (e.g., the operator); control the agricultural vehicle 10 (e.g., a speed of the agricultural vehicle 10, operation of the work implement 13, etc.); transmit the information to a remote party (e.g., a provider such as a manufacturer or distributor of the track systems $16_1$-$16_4$ and/or of the agricultural vehicle 10; a supplier of an agricultural substance such as fertilizer used on an agricultural field where the vehicle travels; etc.); control agricultural equipment (e.g., an irrigation system, a fertilizing system, etc.) external to the agricultural vehicle 10; etc. This may be useful, for example, to gain knowledge about the agricultural vehicle 10, the track systems $16_1$-$16_4$, and/or their environment to enhance efficiency of agricultural work performed by the agricultural vehicle 10, help prevent rapid wear or other deterioration of the track systems $16_1$-$16_4$, and/or for various other reasons.

The powertrain 15 is configured to generate power for the agricultural vehicle 10, including motive power for the track systems $16_1$-$16_4$ to propel the vehicle 10 on the ground. To that end, the powertrain 15 comprises a power source 14 (e.g., a primer mover) that includes one or more motors. For example, in this embodiment, the power source 14 comprises an internal combustion engine. In other embodiments, the power source 14 may comprise another type of motor (e.g., an electric motor) or a combination of different types of motor (e.g., an internal combustion engine and an electric motor). The powertrain 15 can transmit power from the power source 14 to one or more of the track systems $16_1$-$16_4$ in any suitable way (e.g., via a transmission, a differential, a direct connection, and/or any other suitable mechanism). In some embodiments, at least part of the powertrain 15 (e.g., a motor and/or a transmission) may be part of one or more of the track systems $16_1$-$16_4$.

The operator cabin 20 is where the user sits and controls the vehicle 10. More particularly, the operator cabin 20 comprises a user interface 70 allowing the user to steer the vehicle 10 on the ground, operate the work implement 13, and control other aspects of the vehicle 10. In this embodiment, the user interface 70 comprises input devices, such as an accelerator, a brake control, and a steering device (e.g., a steering wheel, a stick, etc.) that are operated by the user to control motion of the vehicle 10 on the ground. The user interface 70 also comprises output devices such as an instrument panel (e.g., a dashboard) which provides indicators (e.g., a speedometer indicator, a tachometer indicator, etc.) to convey information to the user.

The work implement 13 is used to perform agricultural work. For example, in some embodiments, the work implement 13 may include a combine head, a cutter, a scraper pan, a tool bar, a planter, or any other type of agricultural work implement.

The track systems $16_1$-$16_4$ engage the ground to provide traction to the vehicle 10. More particularly, in this embodiment, front ones of the track systems $16_1$-$16_4$ provide front traction to the vehicle 10, while rear ones of the track systems $16_1$-$16_4$ provide rear traction to the vehicle 10.

In this embodiment, each of the front ones of the track systems $16_1$-$16_4$ is pivotable relative to the frame 11 of the vehicle 10 about a steering axis 19 by the steering mechanism 18 (e.g., in response to input of the user at the steering device of the user interface 70) to change the orientation of that track system relative to the frame 11 in order to steer the vehicle 10 on the ground. The orientation of each of the front ones of the track systems $16_1$-$16_4$ relative to a longitudinal axis 33 of the vehicle 10, which defines a steering angle θ of that track system, is thus changeable. In this example, the steering mechanism 18 includes a steering unit 34 (e.g., comprising a steering knuckle) on each side of the vehicle 10 dedicated to each of the front ones of the track systems $16_1$-$16_4$ and defining the steering axis 19 for that track system. Each of the front ones of the track systems $16_1$-$16_4$ is therefore steerable.

Figure 2:
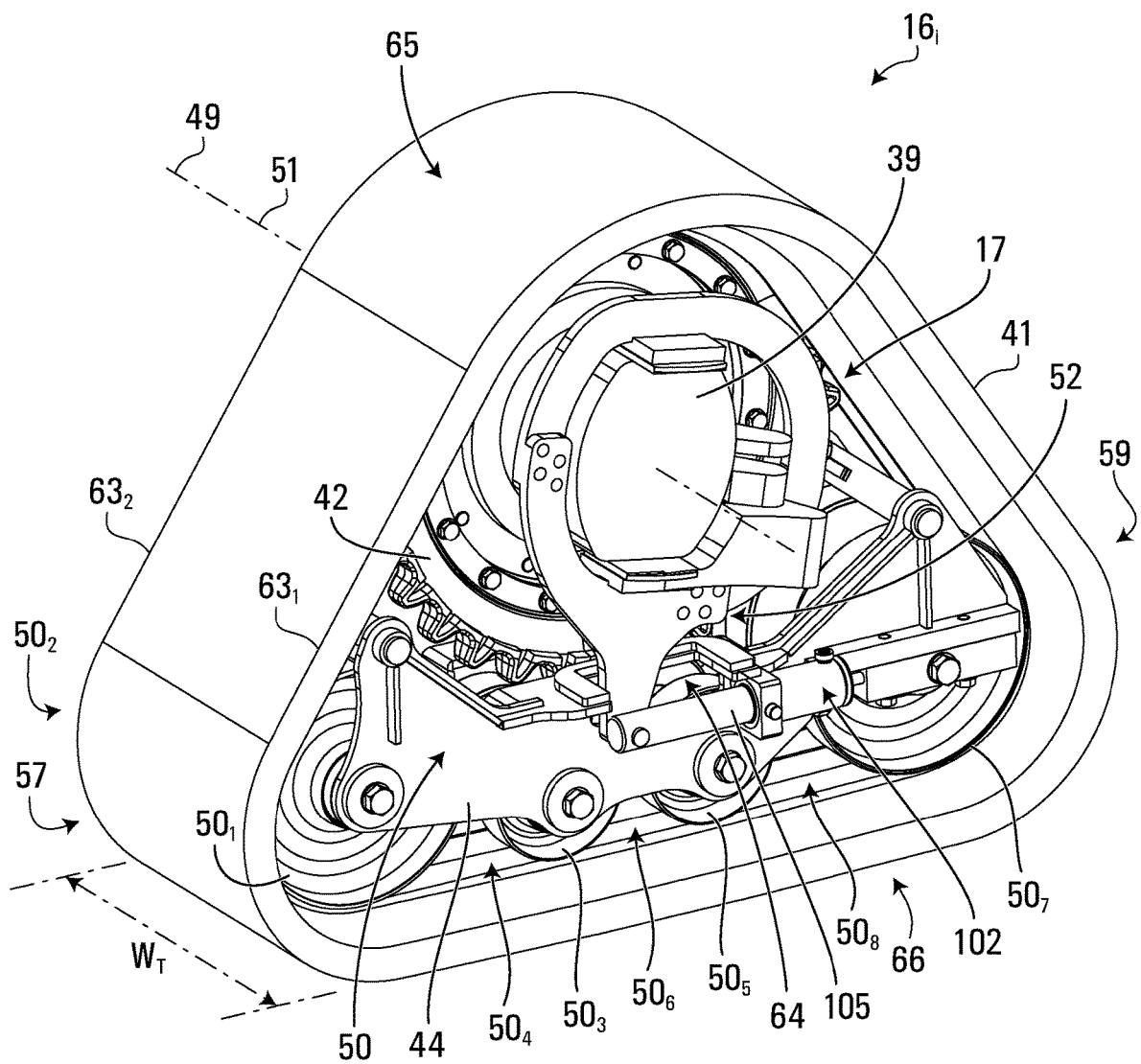
FIGS. 2 and 3 show a perspective view and a side view of a given one of the track systems.
Figure 3:
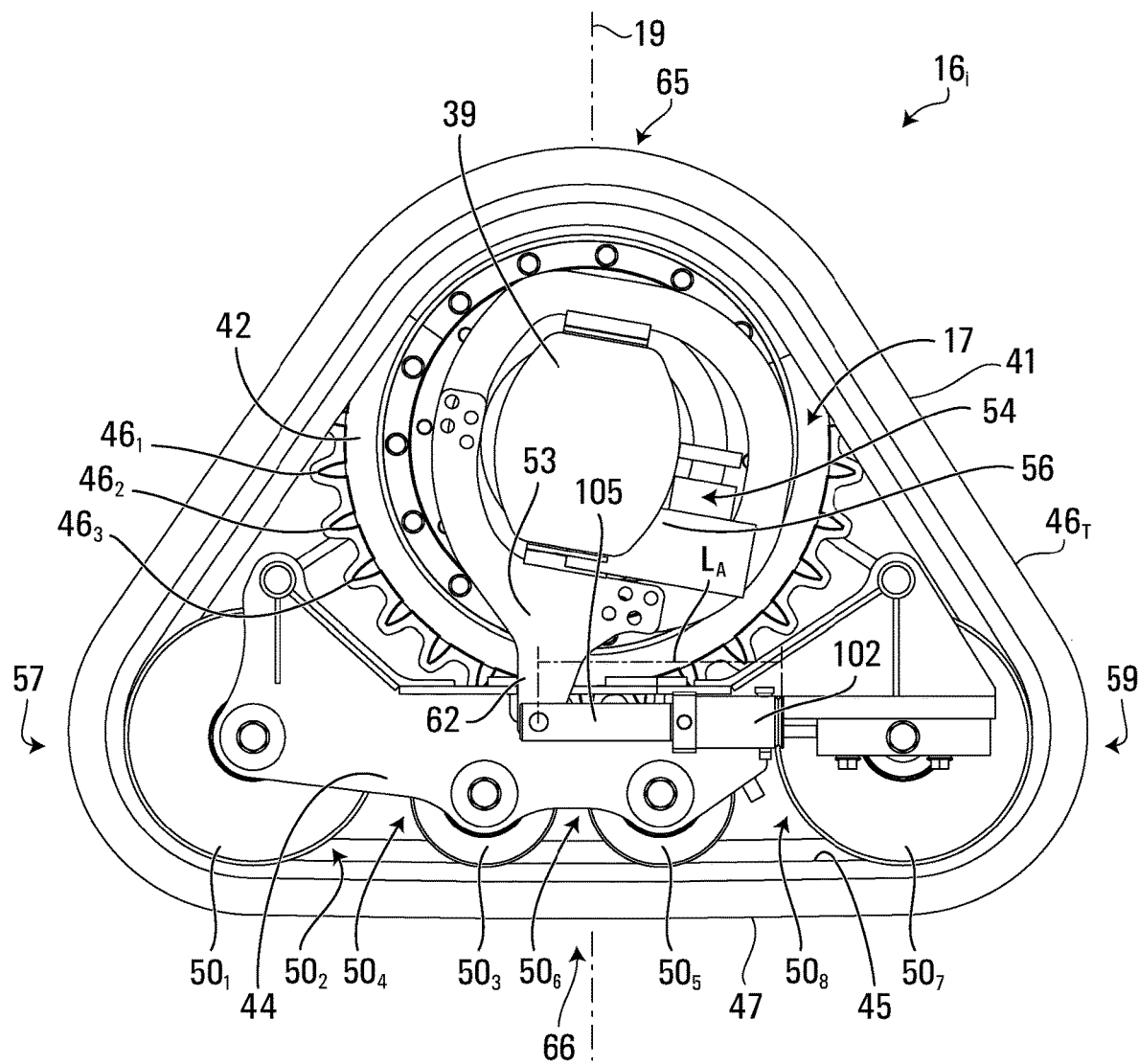
Figure 5:
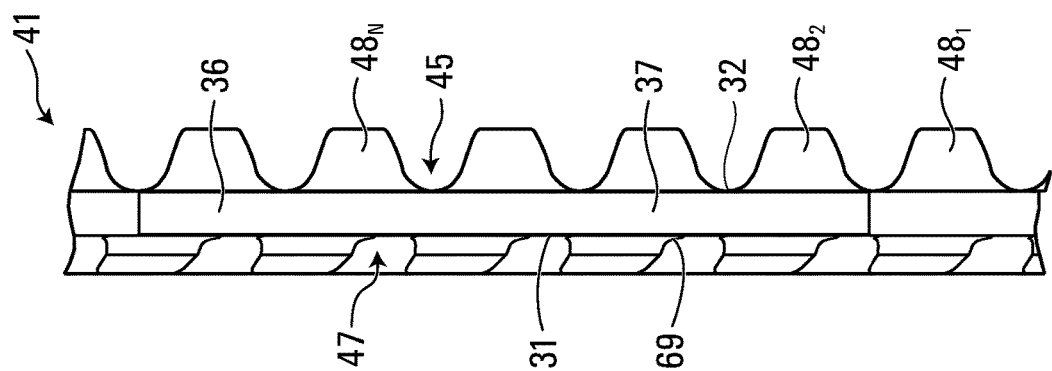
FIGS. 4 to 7 show an outer plan view, a side view, an inner plan view, and a cross-sectional view of a track of the given one of the track systems.
Figure 4:
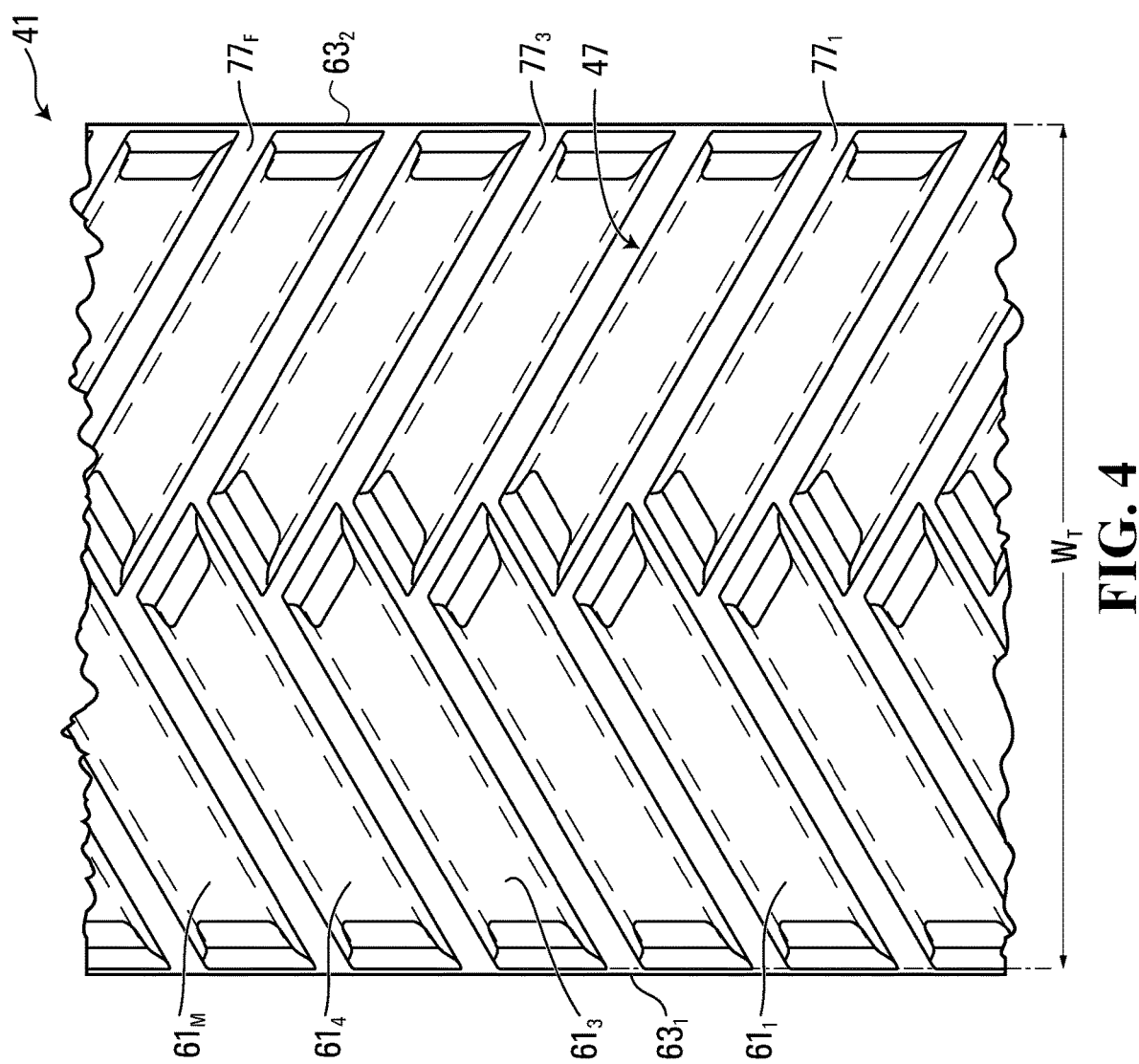
Figure 6:
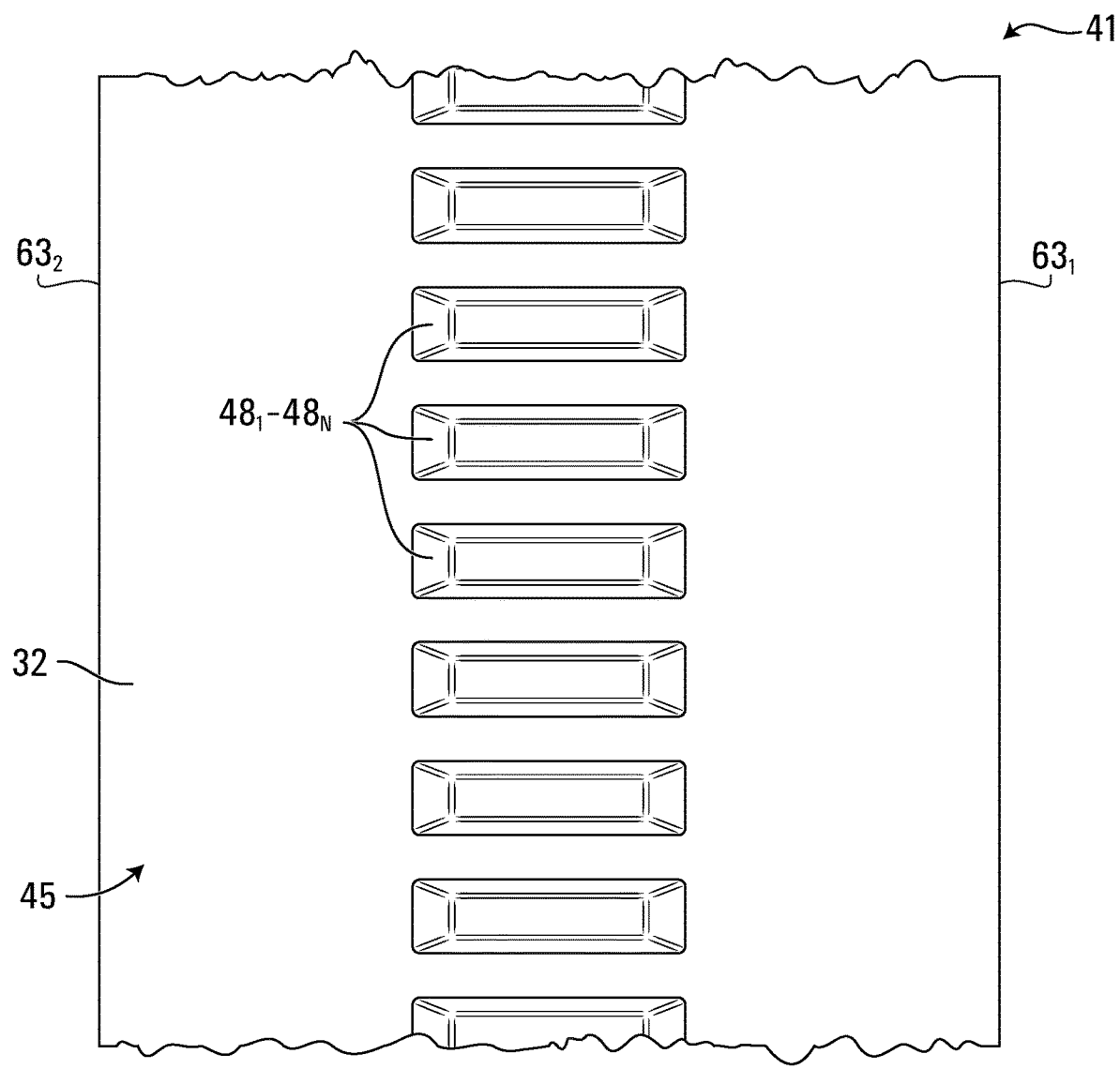
Figure 7:
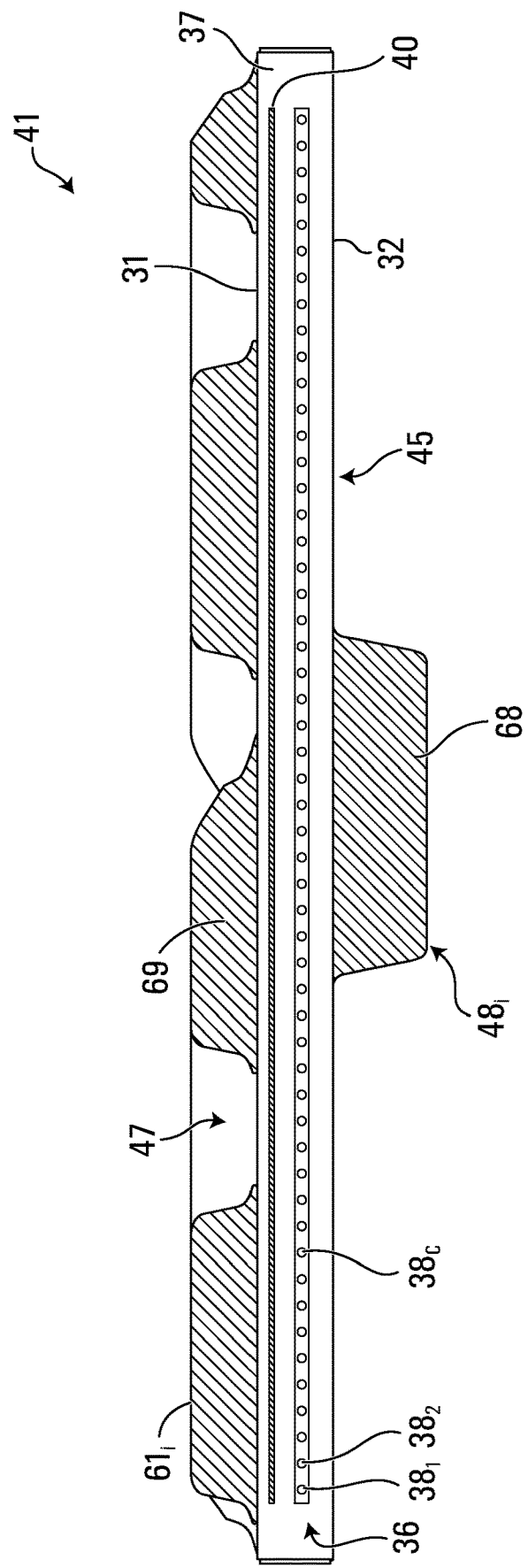

With additional reference to FIGS. 2 and 3, in this embodiment, each track system $16_i$ comprises a track 41 and a track-engaging assembly 17 that is configured to drive and guide the track 41 around the track-engaging assembly 17. In this example, the track-engaging assembly 17 comprises a frame 44 and a plurality of track-contacting wheels which includes a drive wheel 42 and a plurality of idler wheels $50_1$-$50_8$, which includes leading idler wheels $50_1$, $50_2$, trailing idler wheels $50_7$, $50_8$, and roller wheels $50_3$-$50_6$ between the leading idler wheels $50_1$, $50_2$ and the trailing idler wheels $50_7$, $50_8$. The track system $16_i$ has a front longitudinal end 57 and a rear longitudinal end 59 that define a length of the track system $16_i$. A width of the track system $16_i$ is defined by a width $W_T$ of the track 41. The track system $16_i$ has a longitudinal direction, a widthwise direction, and a heightwise direction.

The track 41 engages the ground to provide traction to the vehicle 10. A length of the track 41 allows the track 41 to be mounted around the track-engaging assembly 17. In view of its closed configuration without ends that allows it to be disposed and moved around the track-engaging assembly 17, the track 41 can be referred to as an "endless" track. Referring additionally to FIGS. 4 to 7, the track 41 comprises an inner side 45 facing the wheels 42, $50_1$-$50_8$ and defining an inner area of the track 41 in which these wheels are located. The track 41 also comprises a ground-engaging outer side 47 opposite the inner side 45 for engaging the ground on which the vehicle 10 travels. Lateral edges $63_1$, $63_2$ of the track 41 define its width $W_T$. The track 41 has a top run 65 which extends between the longitudinal ends 57, 59 of the track system $16_i$ and over the track-engaging assembly 17, and a bottom run 66 which extends between the longitudinal ends 57, 59 of the track system $16_i$ and under the track-engaging assembly 17. The track 41 has a longitudinal direction, a widthwise direction, and a thicknesswise direction.

The track 41 is elastomeric, i.e., comprises elastomeric material, allowing it to flex around the wheels 42, $50_1$-$50_8$. The elastomeric material of the track 41 can include any polymeric material with suitable elasticity. In this embodiment, the elastomeric material includes rubber. Various rubber compounds may be used and, in some cases, different rubber compounds may be present in different areas of the track 41. In other embodiments, the elastomeric material of the track 41 may include another elastomer in addition to or instead of rubber (e.g., polyurethane elastomer). The track 41 can be molded into shape in a mold by a molding process during which its elastomeric material is cured.

More particularly, the track 41 comprises an elastomeric belt-shaped body 36 underlying its inner side 45 and its ground-engaging outer side 47. In view of its underlying nature, the body 36 can be referred to as a "carcass". The carcass 36 comprises elastomeric material 37 which allows the track 41 to flex around the wheels 42, $50_1$-$50_8$.

In this embodiment, the carcass 36 comprises a plurality of reinforcements embedded in its elastomeric material 37. One example of a reinforcement is a layer of reinforcing cables $38_1$-$38_C$ that are adjacent to one another and that extend in the longitudinal direction of the track 41 to enhance strength in tension of the track 41 along its longitudinal direction. In some cases, a reinforcing cable may be a cord or wire rope including a plurality of strands or wires. In other cases, a reinforcing cable may be another type of cable and may be made of any material suitably flexible longitudinally (e.g., fibers or wires of metal, plastic or composite material). Another example of a reinforcement is a layer of reinforcing fabric 40. Reinforcing fabric comprises pliable material made usually by weaving, felting, or knitting natural or synthetic fibers. For instance, a layer of reinforcing fabric may comprise a ply of reinforcing woven fibers (e.g., nylon fibers or other synthetic fibers). Various other types of reinforcements may be provided in the carcass 36 in other embodiments.

The carcass 36 may be molded into shape in the track's molding process during which its elastomeric material 37 is cured. For example, in this embodiment, layers of elastomeric material providing the elastomeric material 37 of the carcass 36, the reinforcing cables $38_1$-$38_C$ and the layer of reinforcing fabric 40 may be placed into the mold and consolidated during molding.

In this embodiment, the inner side 45 of the track 41 comprises an inner surface 32 of the carcass 36 and a plurality of wheel-contacting projections $48_1$-$48_N$ that project from the inner surface 32 to contact at least some of the wheels 42, $50_1$-$50_8$ and that are used to do at least one of driving (i.e., imparting motion to) the track 41 and guiding the track 41. In that sense, the wheel-contacting projections $48_1$-$48_N$ can be referred to as "drive/guide projections", meaning that each drive/guide projection is used to do at least one of driving the track 41 and guiding the track 41. Also, such drive/guide projections are sometimes referred to as "drive/guide lugs" and will thus be referred to as such herein. More particularly, in this embodiment, the drive/guide lugs $48_1$-$48_N$ interact with the drive wheel 42 in order to cause the track 41 to be driven, and also interact with the idler wheels $50_1$-$50_8$ in order to guide the track 41 as it is driven by the drive wheel 42. The drive/guide lugs $48_1$-$48_N$ are thus used to both drive the track 41 and guide the track 41 in this embodiment.

The drive/guide lugs $48_1$-$48_N$ are spaced apart along the longitudinal direction of the track 41. In this case, the drive/guide lugs $48_1$-$48_N$ are arranged in a plurality of rows that are spaced apart along the widthwise direction of the track 41. The drive/guide lugs $48_1$-$48_N$ may be arranged in other manners in other embodiments (e.g., a single row or more than two rows). Each of the drive/guide lugs $48_1$-$48_N$ is an elastomeric drive/guide lug in that it comprises elastomeric material 68. The drive/guide lugs $48_1$-$48_N$ can be provided and connected to the carcass 36 in the mold during the track's molding process.

The ground-engaging outer side 47 of the track 41 comprises a ground-engaging outer surface 31 of the carcass 36 and a plurality of traction projections $61_1$-$61_M$ that project from the outer surface 31 and engage and may penetrate into the ground to enhance traction. The traction projections $61_1$-$61_M$, which can sometimes be referred to as "traction lugs", are spaced apart in the longitudinal direction of the track system $16_i$. The ground-engaging outer side 47 comprises a plurality of traction-projection-free areas $71_1$-$71_F$ (i.e., areas free of traction projections) between successive ones of the traction projections $61_1$-$61_M$. In this example, each of the traction projections $61_1$-$61_M$ is an elastomeric traction projection in that it comprises elastomeric material 69. The traction projections $61_1$-$61_M$ can be provided and connected to the carcass 36 in the mold during the track's molding process.

The track 41 may be constructed in various other ways in other embodiments. For example, in some embodiments, the track 41 may comprise a plurality of parts (e.g., rubber sections) interconnected to one another in a closed configuration. The track 41 may have recesses or holes that interact with the drive wheel 42 in order to cause the track 41 to be driven (e.g., in which case the drive/guide lugs $48_1$-$48_N$ may be used only to guide the track 41 without being used to drive the track 41), and/or the ground-engaging outer side 47 of the track 41 may comprise various patterns of traction projections.

The drive wheel 42 is rotatable about an axis of rotation 49 for driving the track 41 in response to rotation of an axle of the vehicle 10. In this example, the axis of rotation 49 corresponds to the axle of the vehicle 10. More particularly, in this example, the drive wheel 42 has a hub which is mounted to the axle of the vehicle 10 such that power generated by the power source 14 and delivered over the powertrain 15 of the vehicle 10 rotates the axle, which rotates the drive wheel 42, which imparts motion of the track 41.

In this embodiment, the drive wheel 42 comprises a drive sprocket engaging the drive/guide lugs $48_1$-$48_N$ of the inner side 45 of the track 41 in order to drive the track 41. In this case, the drive sprocket 42 comprises a plurality of drive members $46_1$-$46_T$ (e.g., bars, teeth, etc.) distributed circumferentially of the drive sprocket 42 to define a plurality of lug-receiving spaces therebetween that receive the drive/guide lugs $48_1$-$48_N$ of the track 41. The drive wheel 42 may be configured in various other ways in other embodiments. For example, in embodiments where the track 41 comprises recesses or holes, the drive wheel 42 may have teeth that enter these recesses or holes in order to drive the track 41. As yet another example, in some embodiments, the drive wheel 42 may frictionally engage the inner side 45 of the track 41 in order to frictionally drive the track 41.

The idler wheels $50_1$-$50_8$ are not driven by power supplied by the powertrain 15, but are rather used to do at least one of supporting part of a weight of the vehicle 10 on the ground via the track 41, guiding the track 41 as it is driven by the drive wheel 42, and tensioning the track 41. More particularly, in this embodiment, the leading and trailing idler wheels $50_1$, $50_2$, $50_7$, $50_8$ maintain the track 41 in tension, and can help to support part of the weight of the vehicle 10 on the ground via the track 41. The roller wheels $50_3$-$50_6$ roll on the inner side 45 of the track 41 along the bottom run 66 of the track 41 to apply the bottom run 66 on the ground. The idler wheels $50_1$-$50_8$ may be arranged in other configurations and/or the track system $16_i$ may comprise more or less idler wheels in other embodiments.

The frame 44 of the track system $16_i$ supports components of the track system $16_i$, including the idler wheels $50_1$-$50_8$. More particularly, in this embodiment, the front idler wheels $50_1$, $50_2$ are mounted to the frame 44 in a front longitudinal end region of the frame 44 proximate the front longitudinal end 57 of the track system $16_i$, while the rear idler wheels $50_7$, $50_8$ are mounted to the frame 44 in a rear longitudinal end region of the frame 44 proximate the rear longitudinal end 59 of the track system $16_i$. The roller wheels $50_3$-$50_6$ are mounted to the frame 44 in a central region of the frame 44 between the front idler wheels $50_1$, $50_2$ and the rear idler wheels $50_7$, $50_8$. Each of the roller wheels $50_3$-$50_6$ may be rotatably mounted directly to the frame 44 or may be rotatably mounted to a link which is pivotally mounted to the frame 44 to which is rotatably mounted an adjacent one of the roller wheels $50_3$-$50_6$ (e.g., forming a "tandem").

The frame 44 of the track system $16_i$ is supported at a support area 39. More specifically, in this embodiment, the frame 44 is supported by the axle of the vehicle 10 to which is coupled the drive wheel 42, such that the support area 39 is intersected by the axis of rotation 49 of the drive wheel 42.

In this example of implementation, the track system $16_i$ comprises a tensioner 93 for tensioning the track 41. For instance, in this embodiment, the tensioner 93 comprises an actuator (e.g., a hydraulic actuator) mounted at one end to the frame 44 of the track system $16_i$ and at another end to a hub of the leading idler wheels $50_1$, $50_2$. This allows the tensioner 93 to modify a distance between the front idler wheels $50_1$, $50_2$ and the rear idler wheels $50_7$, $50_8$ in the longitudinal direction of the track system $16_i$.

Figure 8:
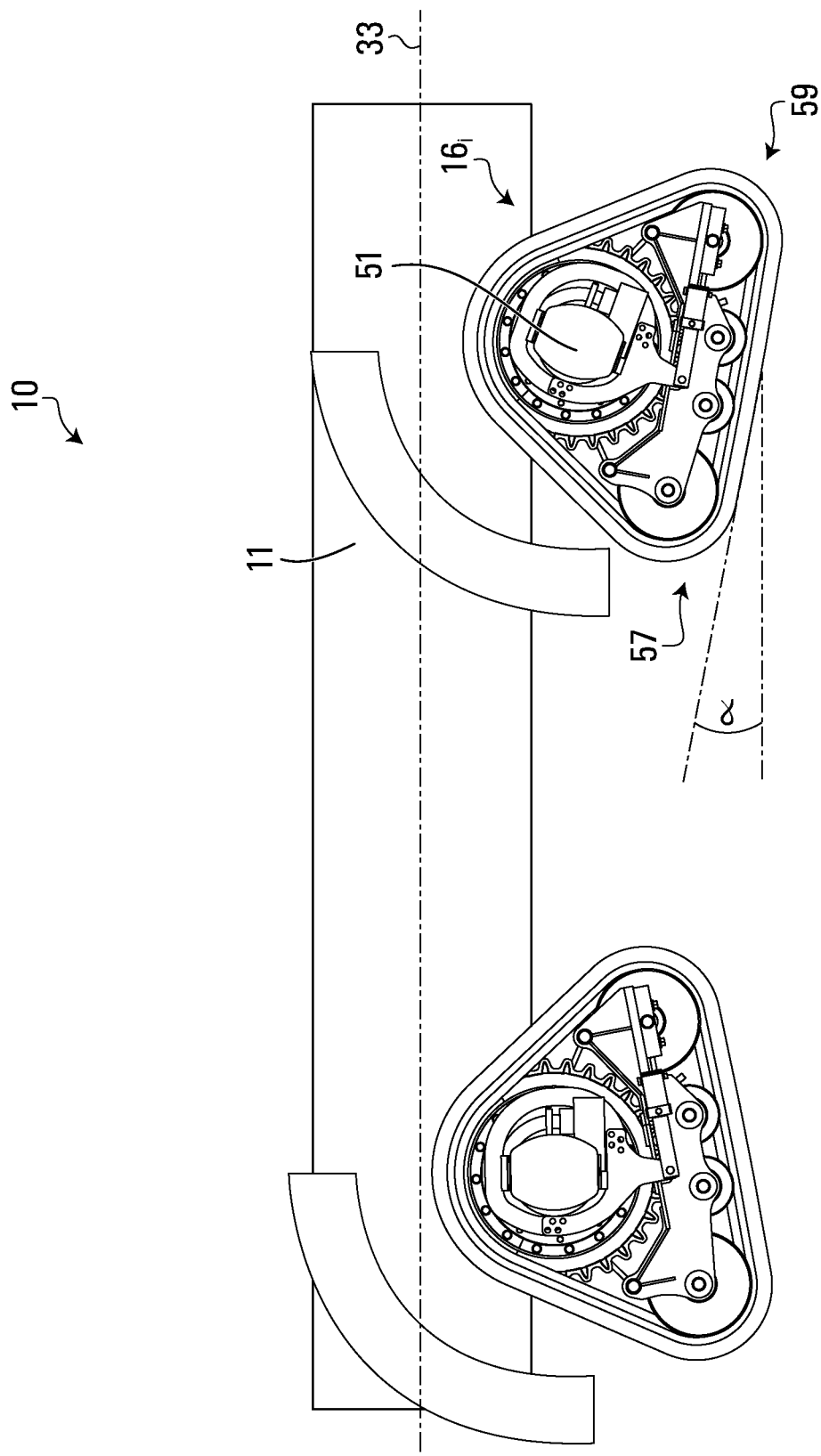
FIG. 8 shows an example of each of the track systems pivoting about a pivot axis relative to change an angle of attack of that track system.

In this embodiment, as shown in FIG. 8, the track system $16_i$ is pivotable (e.g., swingable) relative to the frame 11 of the vehicle 10 about a pivot axis 51 so that its longitudinal ends 57, 59 move vertically, such as, for instance, to accommodate unevenness of the ground. This may facilitate motion of the track system $16_i$ on uneven or other types of terrain and enhance its traction on the ground. The pivot axis 51 is transversal to the longitudinal direction of the track system $16_i$, and, in this example where the track system $16_i$ is steerable, transversal to the steering axis 19. In this case, the pivot axis 51 is substantially parallel to the widthwise direction of the track system $16_i$. The orientation of the track system $16_i$ relative to pivot axis 51, which can be observed as an orientation of the bottom run 66 of the track 41 or a longitudinal part of the frame 44 of the track system $16_i$ relative to the longitudinal direction of the vehicle 10, can be viewed as defining an "angle of attack" a.

More particularly, in this embodiment, the frame 44 of the track system $16_i$ is pivotable relative to the frame 11 of the vehicle 10 about the pivot axis 51. In this example, the pivot axis 51 corresponds to the axis of rotation 49 of the drive wheel 42 and the frame 44 can pivot about the axle of the vehicle 10 to which the drive wheel 42 is coupled. In other examples, the pivot axis 51 may be located elsewhere (e.g., lower than the axis of rotation 49 of the drive wheel 42).

In view of its pivotability relative to the frame 11 of the vehicle 10 about the pivot axis 51, in this embodiment, the track system $16_i$ comprises an anti-rotation device 52 to restrict the pivoting movement of the track system $16_i$ about the pivot axis 51 relative to the frame 11 of the vehicle 10. More particularly, in this embodiment, the anti-rotation device 52 is connectable between the frame 44 of the track system $16_i$ and the frame 11 of the vehicle 10 and configured to engage the frame 44 of the track system $16_i$ in order to limit the pivoting movement of the track system $16_i$ about the pivot axis 51.

Figure 9:
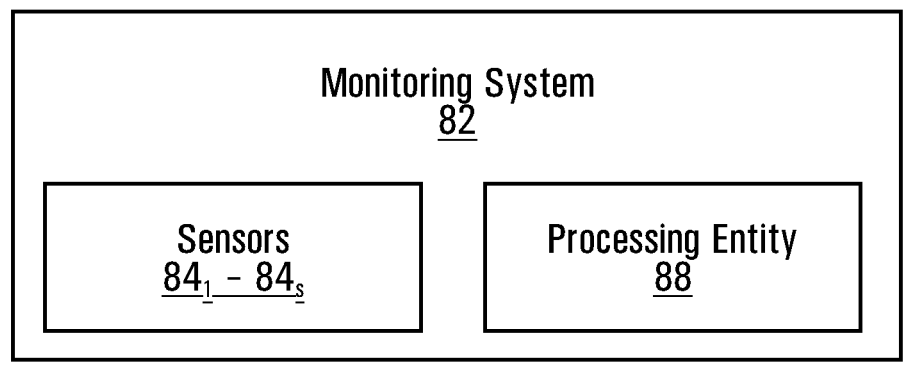
FIG. 9 shows an example of an embodiment of the monitoring system.
Figure 10:
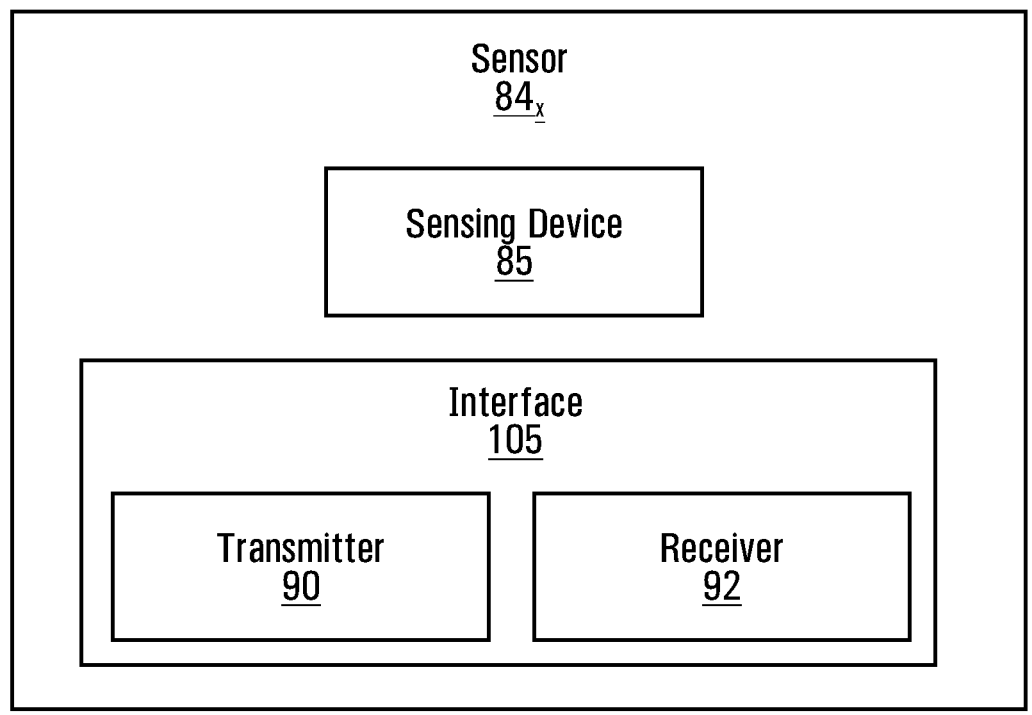
FIG. 10 shows an example of an embodiment of a sensor of the monitoring system.

In this embodiment, with additional reference to FIG. 9, the agricultural vehicle 10 comprises a monitoring system 82 configured to monitor the agricultural vehicle 10, including the track systems $16_1$-$16_4$, to obtain information regarding the vehicle 10, such as information regarding the track systems $16_1$-$16_4$, that can be used for various purposes, such as, for example, to: convey the information to a user (e.g., the operator); control the agricultural vehicle 10 (e.g., a speed of the agricultural vehicle 10, operation of the work implement 13, etc.); transmit the information to a remote party (e.g., a provider such as a manufacturer or distributor of the track systems $16_1$-$16_4$ and/or of the agricultural vehicle 10; a supplier of an agricultural substance such as fertilizer; etc.); control agricultural equipment (e.g., an irrigation system, a fertilizing system, etc.) external to the agricultural vehicle 10; etc. This may be useful, for example, to gain knowledge about the agricultural vehicle 10, the track systems $16_1$-$16_4$, and/or their environment to enhance efficiency of agricultural work performed by the agricultural vehicle 10, help prevent rapid wear or other deterioration of the track systems $16_1$-$16_4$, and/or for various other reasons.

The information regarding the agricultural vehicle 10 that is obtained by the monitoring system 82 may include information regarding each track system $16_i$, which may be intrinsic or extrinsic to the track system $16_i$.

For example, in some embodiments, the information regarding the track system $16_i$ that is obtained by the monitoring system 82 may include one or more parameters of the track system $16_i$. For instance, in some embodiments, this may include one or more parameters of the track 41 of the track system 16—such as:

a temperature of the track 41, a pressure within the track 41, a force on the track 41, a strain of the track 41, an acceleration of the track 41, and/or any physical characteristic of the track 41;

an identifier of the track 41, such as a serial number, a make, a model, a type, and/or any other information identifying the track 41 (i.e., indicating an identity of the track 41); and/or any other information about the track 41, such as, but not limited to, manufacturing date, installation date, manufacturing plant number, etc.

As another example, additionally or alternatively, in some embodiments, the information regarding the track system $16_i$ that is obtained by the monitoring system 82 may include one or more characteristics of the environment of the track system $16_i$. For instance, in some embodiments, this may include one or more characteristics of the ground beneath the track system 16—such as:

a compliance (e.g., softness or hardness) of the ground;

a soil moisture level of the ground;

a profile (e.g., a slope or steepness or a levelness) of the ground;

a chemical parameter (e.g., a soil pH, composition, presence of a particular element or ion, concentration, etc.) of the ground; and/or any other information about the ground.

In this embodiment, the monitoring system 82 comprises a plurality of monitoring devices, such as a plurality of sensors $84_1$-$84_s$ and/or a plurality of tags $78_1$-$78_G$, for monitoring the agricultural vehicle 10, including the track systems $16_1$-$16_4$, and/or an environment of the agricultural vehicle 10, including that of the track systems $16_1$-$16_4$, and a processing entity 88 for performing certain actions based on input from the sensors $84_1$-$84_s$ and/or the tags $78_1$-$78_G$. Notably, the sensors $84_1$-$84_s$ and/or the tags $78_1$-$78_G$ may be used to monitor areas associated with the track systems $16_1$-$16_4$, i.e., monitor at least part of each of the track systems $16_1$-$16_4$ and/or the environment of each of the track systems $16_1$-$16_4$. For example, in various embodiments, actions performed by the processing entity 88 based on input from the sensors $84_1$-$84_s$ and/or the tags $78_1$-$78_G$ may include an action to convey the information regarding the agricultural vehicle 10 (e.g., the information regarding each track system $16_i$), an action to store the information regarding the agricultural vehicle 10, and/or an action relating to the operation of the agricultural vehicle 10, such as, for example, controlling the speed and/or another operational aspect of the agricultural vehicle 10 and/or providing information to the operator of the agricultural vehicle 10.

Each of the sensors $84_1$-$84_s$ is configured to sense a physical aspect of the agricultural vehicle 10, such as of each of the track systems $16_1$-$16_4$, or of the environment of the agricultural vehicle 10, such as of each of the track systems $16_1$-$16_4$ (e.g., the ground beneath or around each of the track systems $16_1$-$16_4$) to issue a sensor signal derived based on the physical aspect that is sensed. Each of the sensors $84_1$-$84_s$ comprises a sensing device 85 to sense the physical aspect of the agricultural vehicle 10 or the environment of the agricultural vehicle 10 that is sensed.

For example, in various embodiments, the physical aspect of each track system $16_i$ that can be sensed by a sensor $84_x$ may be:

- a temperature of the track system 16—such as a temperature of the track 41, in which case the sensor $84_x$ is a temperature sensor. For instance, in some embodiments, the sensing device 85 may comprise a thermocouple, a thermistor, a resistance temperature detector, an infrared sensor, or any other type of sensing device capable of sensing temperature; and
- a pressure within the track system 16—such as a pressure within the track 41, in which case the sensor $84_x$ is a pressure sensor. For instance, in some embodiments, the sensing device 85 may comprise a pressure transducer or any other type of sensing device capable of sensing pressure;
- a strain of the track 41, in which case the sensor $84_x$ is a strain sensor;
- a force within the track system 16—such as a force applied onto the track 41, in which case the sensor $84_x$ is a force sensor (e.g., a load cell);
- an acceleration of the track 41, in which case the sensor $84_x$ is an accelerometer;
- a geo-location of the track system $16_i$, such as a geo-location of the track 41, in which case the sensor $84_x$ is a position sensor (e.g., a global positioning system (GPS) device);
- etc.

As another example, in various embodiments, the physical aspect of the environment of the agricultural vehicle 10, such as of each track system $16_i$, that can be sensed by a sensor $84_x$ may be:

- a compliance (e.g., softness or hardness) of the ground, in which case the sensor $84_x$ may be a ground hardness sensor (e.g., sensing the pressure applied by the track 41 onto the ground or a depth of penetration of the traction projections $61_1$-$61_M$ of the track 41 into the ground). In another embodiment, recording the pressure profile (i.e. pressure reading over time) in the midrollers can provide an indication of whether the track is on a hard or soft ground. For example, if the track is traversing hard ground, the periodic increase in pressure applied by to the midrollers when a treadbar passes thereunder will result in a clear and periodic pressure profile while the midrollers are rolling on the wheel path. If, on the other hand, the track is traversing soft ground, the pressure profile applied to the midrollers will tend towards an irregular and dampened pressure profile.
- a soil moisture level of the ground, in which case the sensor $84_x$ is a moisture sensor (e.g., a set of moisture-sensing probes may protrude from a given one of the traction projections $61_1$-$61_M$ to penetrate the ground and measure the soil moisture level by sensing the electrical resistance of the soil);
- a profile (e.g., a slope or steepness or a levelness) of the ground, in which case the sensor $84_x$ may be an inclinometer;
- a chemical parameter (e.g., a soil pH, composition, presence of a particular element or ion, concentration, etc.) of the ground, in which case the sensor $84_x$ may be a chemical sensor to sense that chemical parameter (e.g., a chemical-sensing probe may protrude from a given one of the traction projections $61_1$-$61_M$ to penetrate the ground and measure the chemical parameter);
- etc.

Figure 11:
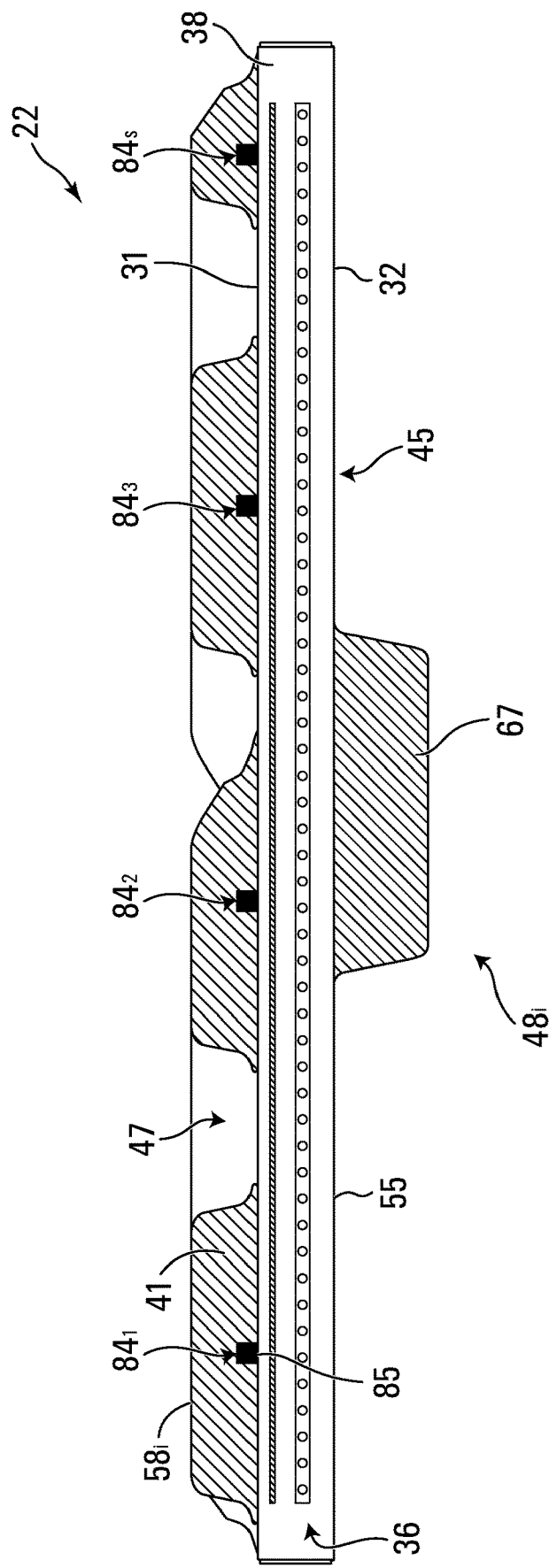
FIGS. 11 to 13 show examples of embodiments in which the track comprises the sensor.
Figure 12:
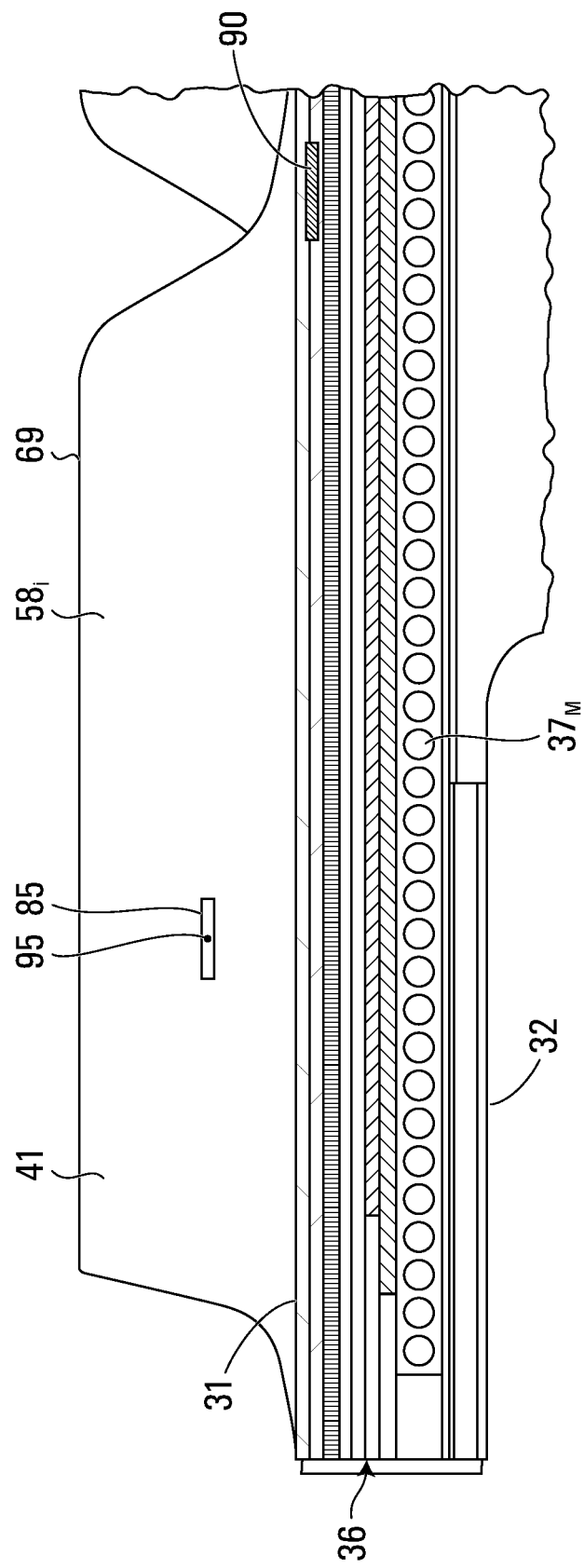

In this embodiment, with additional reference to FIG. 11, a sensor $84_x$ may be part of the track 41 of a track system $16_i$. For instance, in this embodiment, the sensor $84_x$ is embedded within the elastomeric material of the track 41. This may allow the physical aspect sensed by the sensor $84_x$ (e.g., the temperature) to be measured inside the track 41 where it may be more meaningful (e.g., likely to be greater) than on a periphery of the track 41. For example, in embodiments where the sensor $84_x$ is to sense the temperature of the track 41, the sensor $84_x$ may be located to sense the temperature at a high heat area within the track 41, such as at or near a hottest area within the track 41, which is an area expected to be hottest in use.

More particularly, in this embodiment, the sensor $84_x$ is disposed within the elastomeric material 41 of a traction lug $58_i$. This allows sensing the physical aspect (e.g., the temperature) at an internal (e.g., an inmost) area of the traction lug $58_i$ (e.g., which is susceptible to generating high heat that could lead to blowout of the traction lug $58_i$).

In this example, respective ones of the sensors $84_1$-$84_s$ are disposed in the elastomeric material 69 of respective ones of the traction lugs $58_1$-$58_T$. As such, the physical aspect (e.g., the temperature) sensed by the sensor $84_i$ may be assessed by the processing entity 88 based on readings at one or more of the respective ones of the traction lugs $58_1$-$58_T$ (e.g., the physical aspect may be deemed to be a maximal one or an average of the readings at one or more of the respective ones of the traction lugs $58_1$-$58_T$). Although it is possible to have a sensor $84_x$ within each traction lug $58_i$, this may not be the case in some embodiments. For example, in this embodiment, data collected by three or four of the sensors $84_1$-$84_s$ provided within respective ones of the traction lugs $58_1$-$58_T$ may enable assessment of the physical aspect being sensed In other cases, the track 22 may include only a single sensor $84_x$ (e.g., in only a single one of the traction lugs $58_1$-$58_T$).

The sensor $84_x$ may be provided and retained within the elastomeric material 69 of the traction lug $58_i$ in various ways. For instance, in some embodiments, the sensor $84_x$ is placed in a mold used for molding of the track 22 (including the carcass 36, the drive/guide lugs $48_1$-$48_N$ and the traction lugs $58_1$-$58_T$) and the elastomeric material 69 is molded over the sensor $84_x$. For example, this may involve disposing a first layer of elastomeric material (e.g., destined to form part of the elastomeric material 38 of the carcass 36 or the elastomeric material 69 of the traction lugs $58_1$-$58_T$) within the mold, positioning the sensor $84_x$ on the first layer of elastomeric material, and disposing a second layer of elastomeric material (e.g., destined to form part of the elastomeric material 69 of the traction lugs $58_1$-$58_T$) on top of the first layer of elastomeric material such as to effectively sandwich the sensor $84_x$ between the first and second layers of elastomeric material.

In some embodiments, an adhesive may be used to help retention of the sensor $84_x$ in elastomeric material (e.g., in the elastomeric material 69 of the traction projection $58_i$ and/or in the elastomeric material 38 of the carcass 36). For example, the adhesive may be a metal-to-elastomer adhesive such as Chemlok™ or any other suitable metal-to-elastomer adhesive.

In some cases, the sensor $84_x$ may be inserted into the elastomeric material 69 of the traction lug $58_i$ after molding of the elastomeric material 69 of the traction lug $58_i$. For example, in a post-molding operation, the traction lug $58_i$ may be opened (e.g., via drilling a hole or making an incision) and the sensor $84_x$ inserted into the elastomeric material 69 of the traction lug $58_x$. The traction lug $58_i$ may be sealed thereafter. In such cases, the sensor $84_x$ may be retained in the traction lug $58_i$ by overmolding (i.e., molding a layer of elastomeric material on top of an already molded layer of elastomeric material), by friction (e.g., a press-fit), by an adhesive, or by a fastener.

The sensor $84_x$ comprises an interface 105 comprising a transmitter 90 for issuing the sensor signal indicative of the physical aspect of the track 22 that it senses. In this embodiment, the transmitter 90 is configured for transmitting the sensor signal to the processing entity 88, which comprises a receiver 104 to receive the sensor signal from the sensor $84_x$.

The transmitter 90 of the sensor $84_x$ and the receiver 104 of the processing entity 88 may be connected in any suitable way. In this embodiment, the sensor $84_x$ and the processing entity 88 are connected wirelessly. Thus, in this embodiment, the transmitter 90 of the sensor $84_x$ is a wireless transmitter that can wirelessly transmit the sensor signal and the receiver 104 of the processing entity 88 is a wireless receiver that can wirelessly receive the sensor signal.

The sensor $84_x$ may be disposed such that the sensor signal issued by the sensor $84_x$ has a signal strength sufficient to overcome a thickness of elastomeric material of the track 41 along a path of the sensor signal. More particularly, in this embodiment, the transmitter 90 of the sensor $84_x$ is spaced from the sensing device 85 of the sensor $84_x$ and located beneath less elastomeric material than the sensing device 85.

Figure 13:
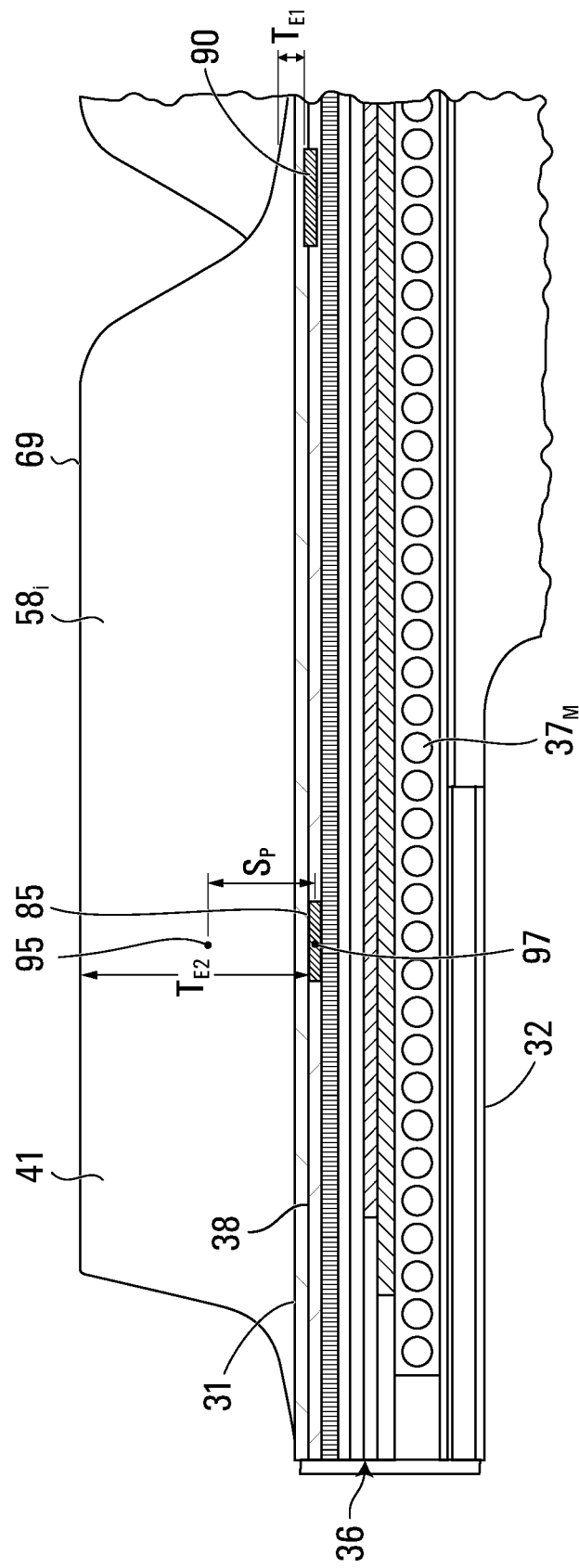

For example, in this embodiment, as shown in FIG. 13, a thickness $T_{E1}$ of elastomeric material of the track 41 between the transmitter 90 and the periphery 69 of the traction lug $58_i$ is less than a thickness $T_{E2}$ of elastomeric material of the track 41 between the sensing device 85 and the periphery 69 of the traction lug $58_i$. For example, in some cases, a ratio $T_{E1}/T_{E2}$ of the thickness $T_{E1}$ of elastomeric material of the track 41 between the transmitter 90 and the periphery 69 of the traction lug $58_i$ over the thickness $T_{E2}$ of elastomeric material of the track 41 between the sensing device 85 and the periphery 69 of the traction lug $58_i$ may be no more than 0.5, in some cases no more than 0.4, in some cases no more than 0.3, in some cases no more than 0.2, in some cases no more than 0.1, and in some cases even less. This ratio may have any other suitable value in other embodiments.

Moreover, in this embodiment, a thickness of elastomeric material of the track 41 between the transmitter 90 and the ground-engaging outer surface 31 of the carcass 36 may be less than the thickness $T_{E2}$ of elastomeric material of the track 22 between the sensing device 85 and the periphery 69 of the traction lug $58_i$. For instance, in some cases, a ratio of the thickness of elastomeric material of the track 41 between the transmitter 90 and the ground-engaging outer surface 31 of the carcass 36 over the thickness $T_{E2}$ of elastomeric material of the track 41 between the sensing device 85 and the periphery 69 of the traction lug $58_i$ may be no more than 0.4, in some cases no more than 0.3, in some cases no more than 0.2, in some cases no more than 0.1, and in some cases even less. This ratio may have any other suitable value in other embodiments. In some embodiments, the transmitter 90 may be positioned such that the traction lug $58_i$ does not overlap the transmitter 90 (i.e., such that the transmitter 90 has a different longitudinal and widthwise position in the track 22 than the traction lug $58_i$).

The sensor signal may be issued by the sensor $84_x$ in any suitable manner in various embodiments.

Figure 16:
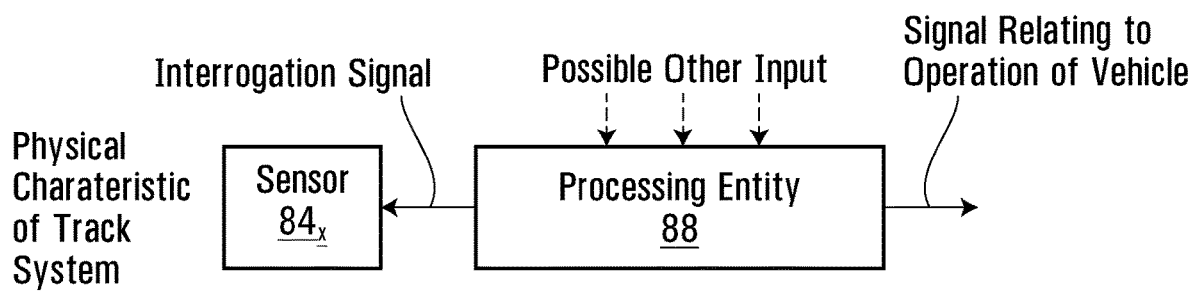

For example, in this embodiment, as shown in FIG. 16, the processing entity 88 is configured to issue an interrogation signal directed to the sensor $84_x$, which is configured to issue the sensor signal to the processing entity 88 in response to the interrogation signal. Thus, in this embodiment, the processing entity 88 comprises a transmitter 106 to transmit the interrogation signal to the sensor $84_x$, the interface 105 of which comprises a receiver 92 to receive the interrogation signal. In this case, the transmitter 106 of the processing entity 88 is a wireless transmitter to wirelessly transmit the interrogation signal and the receiver 92 of the interface 105 of sensor $84_x$ is a wireless receiver to wirelessly receive the interrogation signal. In some examples of implementation, the transmitter 90 and the receiver 92 of the sensor $84_x$ may be implemented by a transceiver and/or the transmitter 106 and the receiver 104 of the processing entity 88 may be implemented by a transceiver.

More particularly, in this embodiment, the sensor $84_x$ and the processing entity 88 implement radio-frequency identification (RFID) technology to communicate, including to wirelessly transmit the sensor signal from the sensor $84_x$ to the processing entity 88. In this case, the transmitter 90 and the receiver 92 of the sensor $84_x$ implement an RFID element (e.g., an RFID tag) and the transmitter 106 and the receiver 104 of the processing entity 88 implement an RFID element (e.g., an RFID reader).

The RFID element implemented by the transmitter 90 and the receiver 92 of the sensor $84_x$ may be a passive RFID tag that is powered by the interrogation signal of the RFID element implemented by the transmitter 106 and the receiver 104 of the processing entity 88, which may be an active RFID reader. That is, the RFID tag implemented by the transmitter 90 and the receiver 92 of the sensor $84_x$ is electromagnetically powered by the interrogation signal of the RFID reader implemented by the transmitter 106 and the receiver 104 of the processing entity 88. The power generated through this interaction may then be used by the RFID tag to issue the sensor signal.

In this example of implementation, the RFID tag implemented by the transmitter 90 and the receiver 92 of the sensor $84_x$ enables the sensing device 85 of the sensor $84_x$ to make a reading of the physical aspect (e.g., the temperature) of the track 41 that is sensed by the sensor $84_x$. More specifically, when the RFID tag is powered by the interrogation signal of the RFID reader, at least part of the power is routed to the sensing device 85 in order for the sensing device 85 to make a reading. The transmitter 90 then issues the sensor signal (as recorded by the sensing device 85) to the RFID reader implemented by the transmitter 106 and the receiver 104 of the processing entity 88.

Figure 15:
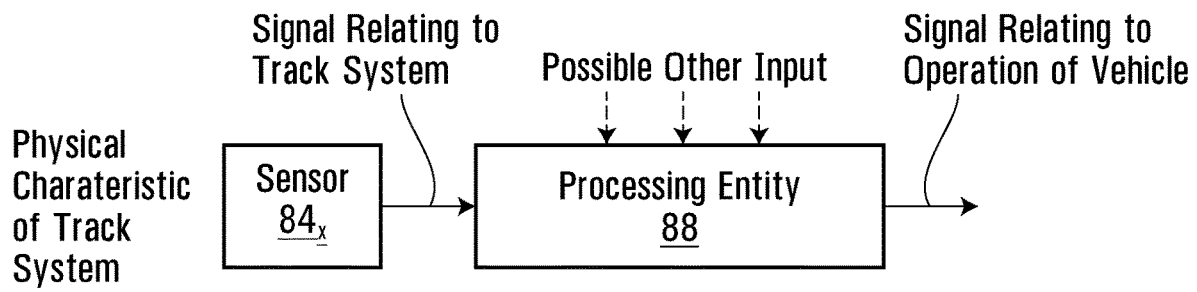
FIGS. 15 and 16 show examples of the sensor communicating with the processing entity of the monitoring system.

In other embodiments, the sensor $84_x$ may be configured to issue the sensor signal to the processing entity 88 autonomously (i.e., without receiving any interrogation signal), as shown in FIG. 15. For instance, in some embodiments, the transmitter 94 of the sensor $84_x$ may issue the sensor signal to the processing entity 88 repeatedly (e.g., periodically or at some other predetermined instants).

For instance, in other embodiments, the RFID element implemented by the transmitter 90 and the receiver 92 of the sensor $84_x$ may be an active RFID tag or a battery-assisted passive (BAP) RFID tag. As will be appreciated by the skilled reader, other wireless technologies can readily be used instead of RFID, such as, but not limited to, Weightless, Wi-Fi or other wireless communication technology standards.

For example, an active RFID tag implemented by the transmitter 90 and the receiver 92 of the sensor $84_x$ has its own power source (e.g., a battery) to enable the entire functionality of the active RFID tag. That is, the active RFID tag's power source enables the sensing device 85 to make a reading of the physical aspect (e.g., the temperature) of the track 41 that is sensed by the sensor 84$_x$ and also enables the transmitter 94 to issue the sensor signal to the RFID reader (i.e., the processing entity 88). Thus, in this case, the active RFID tag can implement its functions independently of the RFID reader. In such a case, the power source (i.e., the battery) of the active RFID tag may be configured to provide power to the RFID tag for an amount of time at least as great, and in some cases greater, than a lifetime of the track 41 (i.e., a span of time that the track 41 is expected to last).

Conversely, a BAP RFID tag's power source (e.g., a battery) only enables part of the BAP RFID tag's functions. For instance, the power source may enable the sensing device 85 to record a reading of the physical aspect (e.g., the temperature) of the track 41 that is sensed by the sensor 84$_x$. However the BAP RFID tag is dependent on the interrogation signal of the RFID reader (i.e., the processing entity 88) to power the transmitter 94 to issue the sensor signal to the processing entity 88.

Therefore, in various embodiments, the sensor 84$_x$ may comprise a power source for its operation and/or may harvest energy from its environment (e.g., inductively from an interrogation signal; by a piezoelectric effect; etc.) for its operation.

In this embodiment, the sensor 84$_x$ comprises a housing 96 that houses components of the sensor 84$_x$ and is configured to protect the sensor 84$_x$ (e.g., by preventing intrusion of particles that may be damaging to the sensor 84$_x$, protecting against heat, preventing excessive deformation, etc.).

Figure 17:
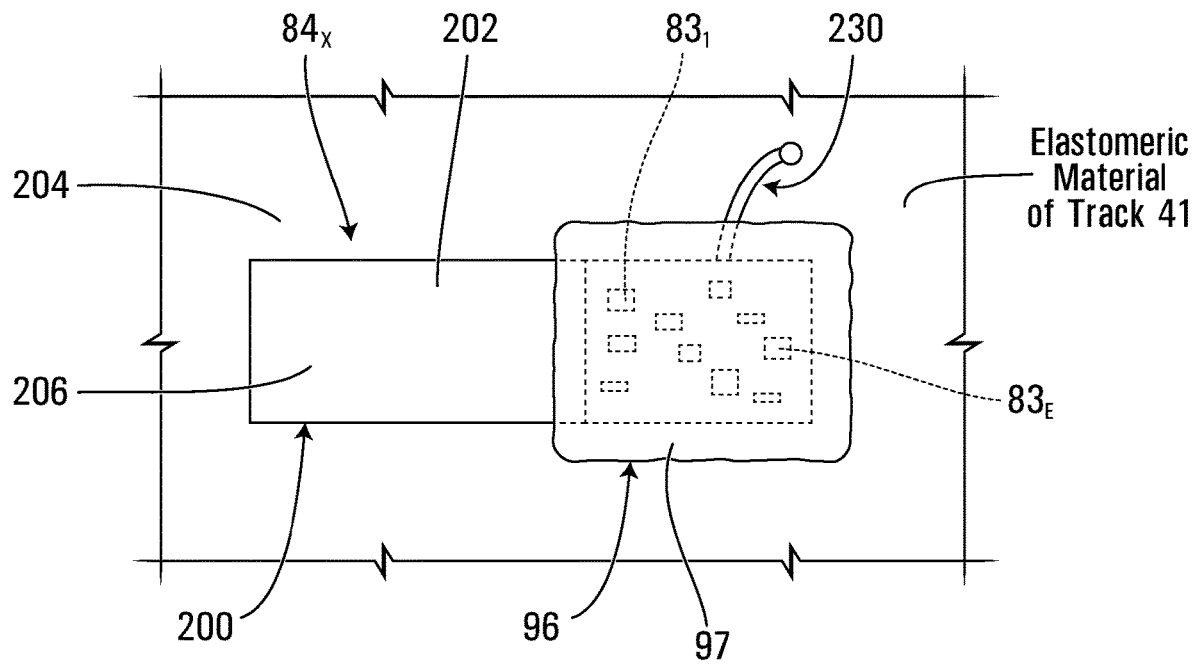
FIGS. 17 to 19 show an example of an embodiment of the sensor comprising a power generator.
Figure 18:
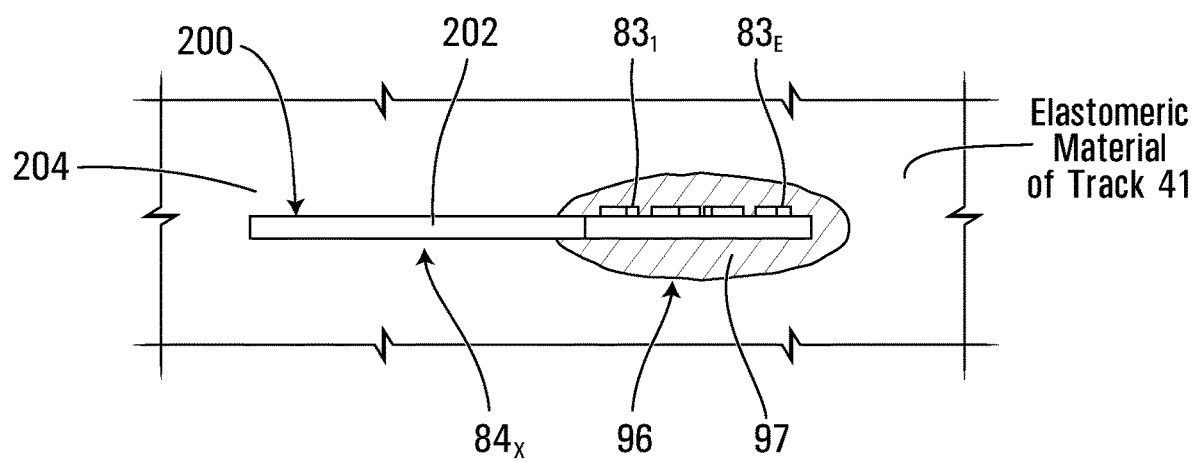

For example, in some embodiments, as shown in FIGS. 17 and 18, the housing 96 may comprise a protective substance 97 encapsulating components of the sensor 84$_x$ and allowing the sensing device 85 of the sensor 84$_x$ to make a reading. In some embodiments, the protective substance 97 may be malleable at least during application of the protective substance 97 onto the components of the sensor 84$_x$. That is, it may be malleable during its application and then rigidify or it may remain malleable even after its application during use of the track 41. For instance, in some embodiments, the protective substance 97 may be a putty-like substance that is applied over components of the sensor 84$_x$ so as to enclose them.

Figure 20:
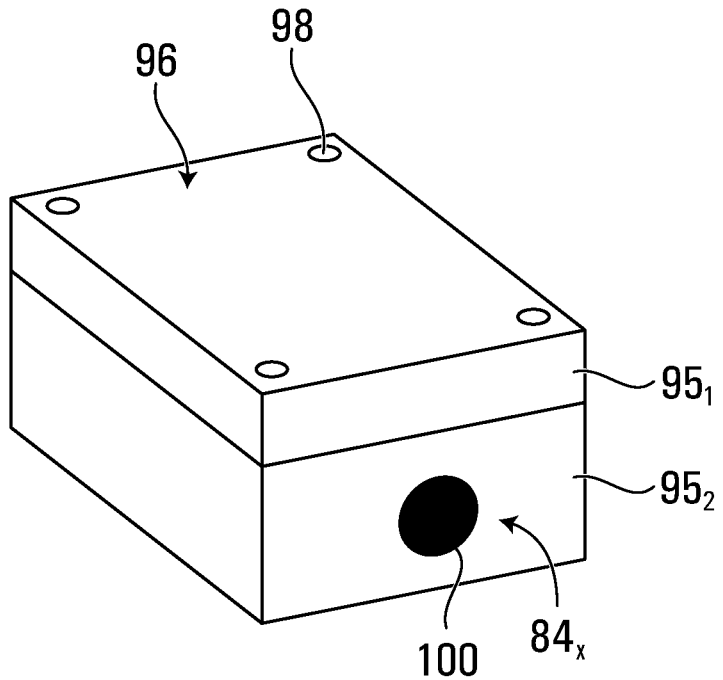
FIGS. 20 and 21 show an example of another embodiment of the sensor.
Figure 21:
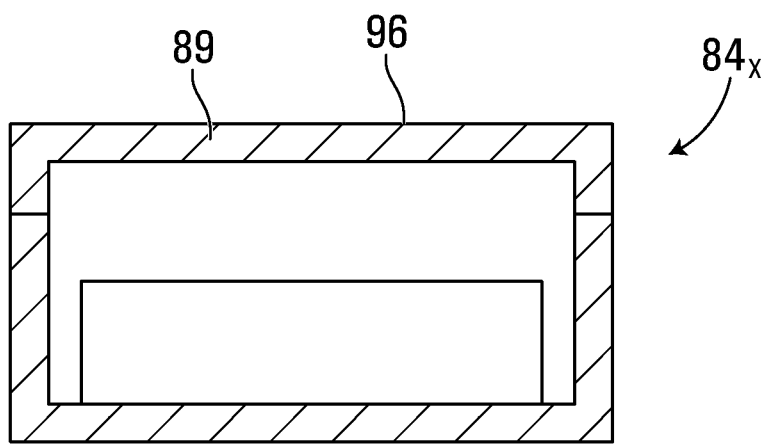

As another example, in some embodiments, as shown in FIGS. 20 and 21, the housing 96 may comprise separate parts 95$_1$, 95$_2$ which are secured to one another via fasteners 98, define an internal space containing components of the sensor 84$_x$, and an opening 100 for allowing the sensing device 85 of the sensor 84$_x$ to make a reading. A periphery of the opening 100 may be provided with a sealing element for preventing the intrusion of particles into the housing 96. A material of the housing 96 thus imparts strength and protective qualities to the housing 96. For instance, in some embodiments, each of the separate parts 95$_1$, 95$_2$ of the housing 96 may comprise a thermoplastic polymer (e.g., acrylonitrile butadiene styrene (ABS) or a polycarbonate), etc.

Figure 22:
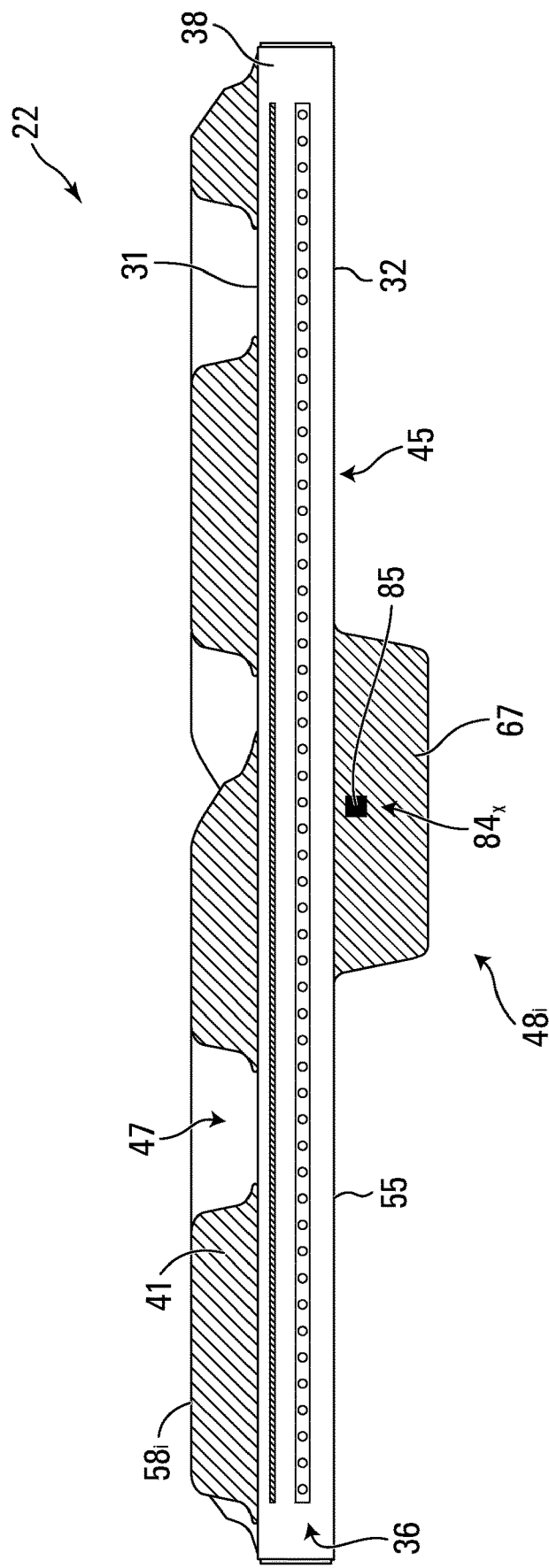
FIGS. 22 and 23 show other examples of embodiments of the track.
Figure 23:
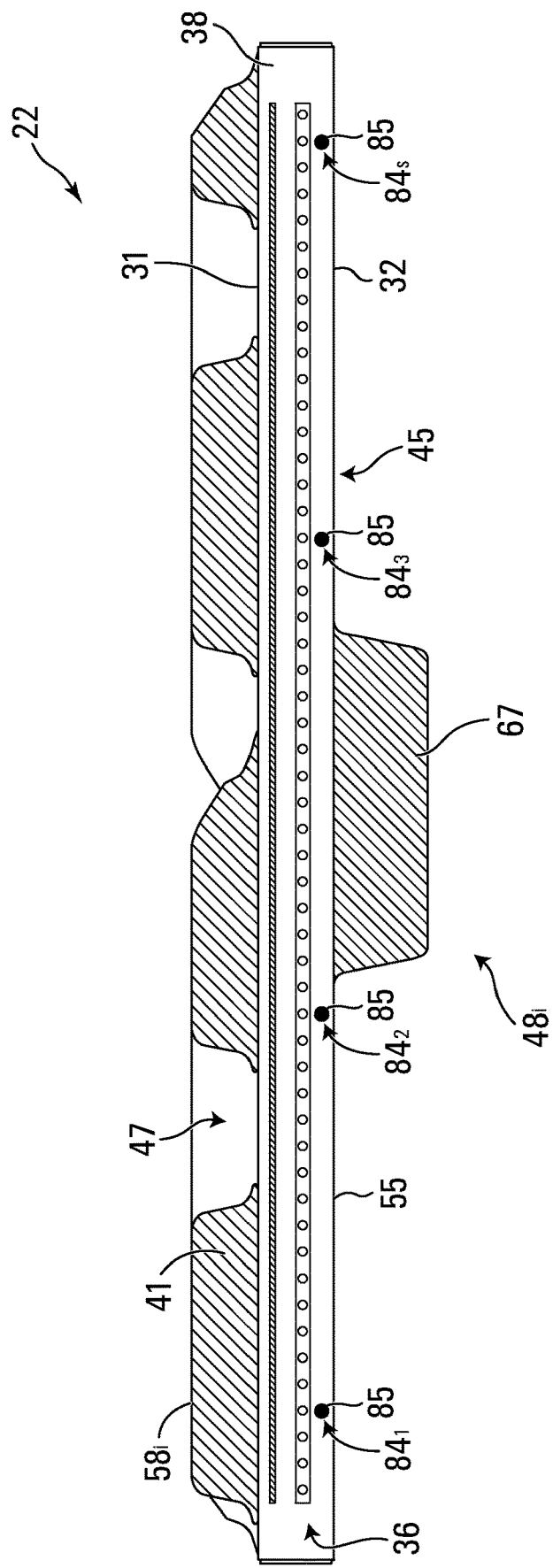

The sensor 84$_x$ may be disposed elsewhere on the track 22. For example, in some embodiments, as shown in FIG. 22, the sensor 84$_x$ may be disposed in the elastomeric material 67 or one or more of the drive/guide lugs 48$_1$-48$_N$. In other embodiments, as shown in FIG. 23, the sensor 84$_x$ may be disposed in the elastomeric material 38 of the carcass 36. This may be useful to shield the sensing device 85 from the elevated heat that is generated at the traction lugs 58$_1$-58$_T$ and/or to prevent or otherwise minimize a risk of delamination of the traction lugs 58$_1$-58$_T$ at an interface between the traction lugs 58$_1$-58$_T$ and the carcass 36.

Figure 19:
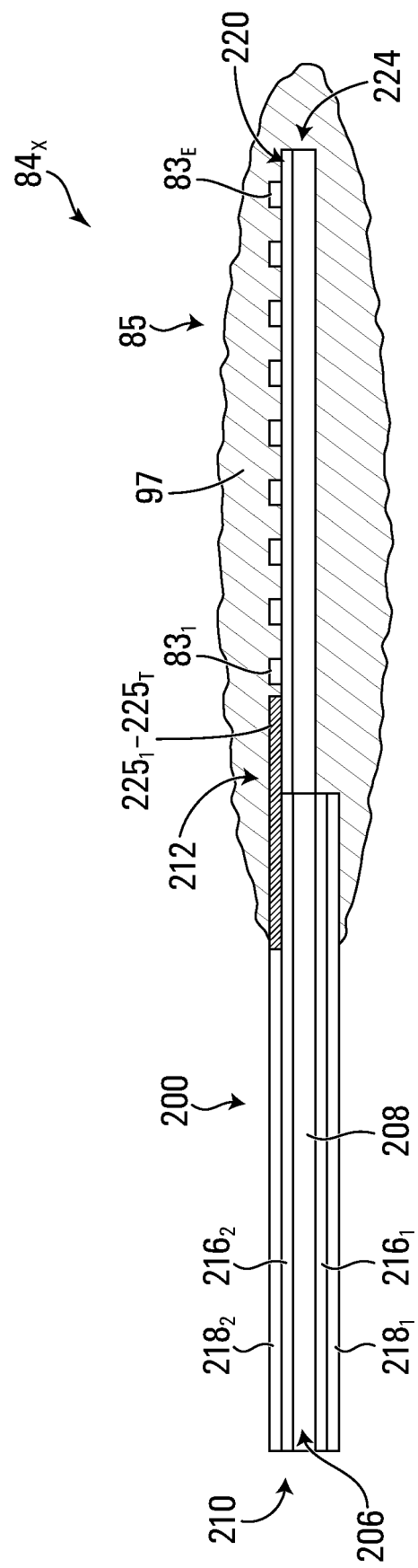

FIGS. 17 to 19 show an example of an embodiment in which the sensor 84$_x$ comprises a piezoelectric generator 200 configured to power the sensor 84$_x$.

In this embodiment, the piezoelectric generator 200 is configured to generate power for powering the sensor 84$_x$ in response to deformation of a portion 204 of the elastomeric material of the track 41 adjacent to the piezoelectric generator 200. More particularly, in this embodiment, the piezoelectric generator 200 comprises a piezoelectric element 202 that is deformable (e.g., changeable in shape) when the portion 204 of the elastomeric material of the track 41 deforms in use and that is configured to generate power for powering the sensor 84$_x$ in response to its deformation.

In this example, the piezoelectric element 202 is bendable when the portion 204 of the elastomeric material of the track 41 bends in use in order to generate power for powering the sensor 84$_x$ in response to its bending. More particularly, in this example, the piezoelectric element 202 comprises a piezoelectric film 206. The piezoelectric film 206 comprises a thin layer of piezoelectric material 208 exhibiting piezoelectric properties to general an electrical effect (e.g., voltage or charge) in response to dynamic strain. For instance, in this embodiment, the piezoelectric material 208 may be a piezoelectric polymeric material (e.g., polyvinylidene fluoride (PVDF), copolymer of vinylidene fluoride & trifluoroethylene (P(VDF/TrFE)), etc.). In some embodiments, the piezoelectric material 208 is a product utilizing Piezo Protection Advantage™ (PPA) technology, manufactured by Midé Technology™.

In this embodiment, the piezoelectric generator 200 comprises a substrate 210 supporting the piezoelectric film 206 and an electrical conductor 212 electrically interconnecting the piezoelectric film 206 and the sensing device 85 of the sensor 84$_x$. The substrate 210 comprises an electrically-conductive portion 214 electrically interconnecting the piezoelectric film 206 and the electrical conductor 212. In this example, the electrically-conductive portion 214 of the substrate 210 comprises electrically-conductive layers 216$_1$, 216$_2$ (e.g., metallized layers) between which the piezoelectric film 206 is disposed. Also, in this example, the substrate 210 comprise protective layers 218$_1$, 218$_2$ (e.g., coatings) covering the electrically-conductive layers 216$_1$, 216$_2$.

The piezoelectric generator 200 may be implemented in any other suitable way in other embodiments.

In this example of implementation, the sensing device 85 of the sensor 84$_x$ comprises electronic components 83$_1$-83$_E$ that are configured to enable the sensing device 85 to sense the physical aspect (e.g., the temperature) sensed by the sensor 84$_x$ and are powered by the piezoelectric generator 200 via the electrical conductor 212. The electronic components 83$_1$-83$_E$ may include semiconductors such as transistors, integrated circuits, etc.; resistors; capacitors; antennas; and/or any other suitable electronic components.

In this embodiment, the sensing device 85 of the sensor 84$_x$ comprises a substrate 220 supporting respective ones of its electronic components 83$_1$-83$_E$. More particularly, in this embodiment, the sensing device 85 of the sensor 84$_x$ comprises a printed circuit board (PCB) 224 that includes the substrate 220 and the respective ones of the electronic components 83$_1$-83$_E$.

In this example, the substrate 210 of the piezoelectric generator 200 is contiguous to the substrate 220 of the PCB 224 of the sensing device 85 such that the piezoelectric generator 200 and the sensing device 85 constitute a continuous planar structure. In this case, the electrical conductor 212 may include conductive (e.g., metallic) traces 225$_1$-225$_T$ etched or otherwise formed from thin conductive material laminated or otherwise applied onto the substrate 210 of the piezoelectric generator 200 and the substrate 220 of the PCB 224.

In this embodiment, the substance 97 encapsulates the PCB 224, while a sensing element 230 (e.g. a thermocouple) of the sensor $84_x$ is connected to the PCB 224 and extends outside of the substance 97 to make readings of the physical aspect (e.g., the temperature) sensed by the sensor $84_x$, and the piezoelectric film 206 and the substrate 210 of the piezoelectric generator 200 are disposed outside of the substance 97 to deform and generate power. More particularly, in this embodiment, the substance 97 may be a putty-like substance that is applied over the substrate 220 and the respective ones of the electronic components $83_1$-$83_E$ of the sensor $84_x$ so as to enclose them. The substance 97 may protect the electronic components $83_1$-$83_E$ of the sensor $84_x$, such as against deformation, heat, intrusion of particles, etc., while allowing signaling between the sensor $84_x$ and the processing entity 88. In some embodiments, the substance 97 may be a high-temperature epoxy, such as for example Duralco 4525™ manufactured by Cotronics™. In this example, respective ones of the conductive traces $225_1$-$225_T$ may also be covered by the substance 97.

Figure 24:
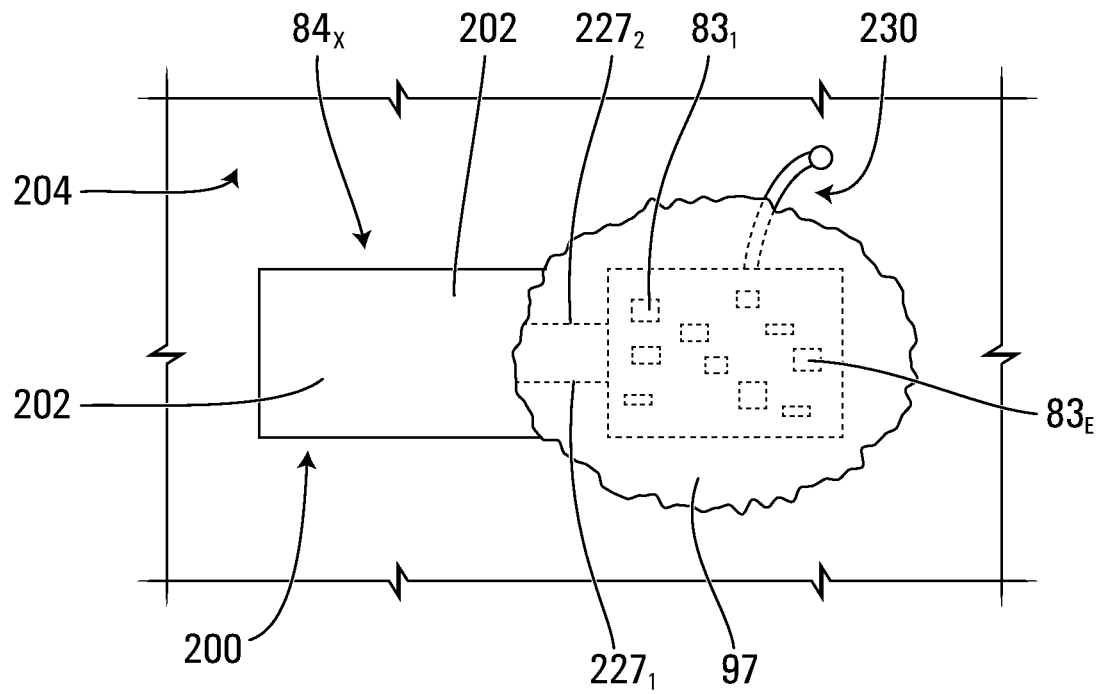
FIGS. 24 and 25 show an example of another embodiment of the sensor comprising the power generator.
Figure 25:
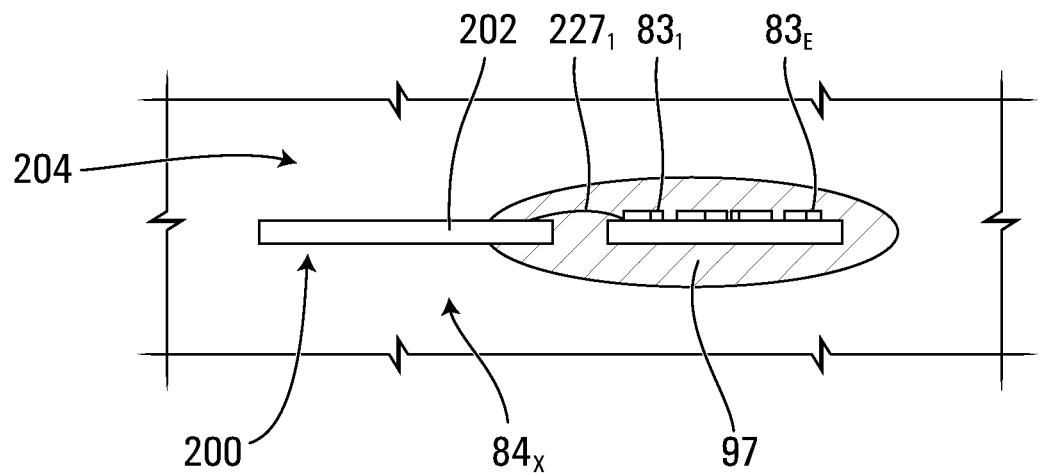

FIGS. 24 and 25 show a variant in which the substrate 210 of the piezoelectric generator 200 is spaced apart from the substrate 220 of the PCB 224 of the sensing device 85. In this case, the electrical conductor 212 may include conductive (e.g., metallic) wires $227_1$, $227_2$ extending from the substrate 210 of the piezoelectric generator 200 to the substrate 220 of the PCB 224. In this embodiment, the substance 97 encapsulates the PCB 224, while the sensing element 230 (e.g. a thermocouple) of the sensor $84_x$ is connected to the PCB 224 and extends outside of the substance 97 to make readings of the physical aspect (e.g., the temperature) sensed by the sensor $84_x$, and the piezoelectric film 206 and the substrate 210 of the piezoelectric generator 200 are disposed outside of the substance 97 to deform and generate power. In this example, wires $227_1$, $227_2$ may also be covered by the substance 97.

The sensors $84_1$-$84_s$ may be implemented in any other suitable way in other embodiments. For example, in other examples, multiple sensing elements 230 may be connected to a single PCB 224.

Figure 26:
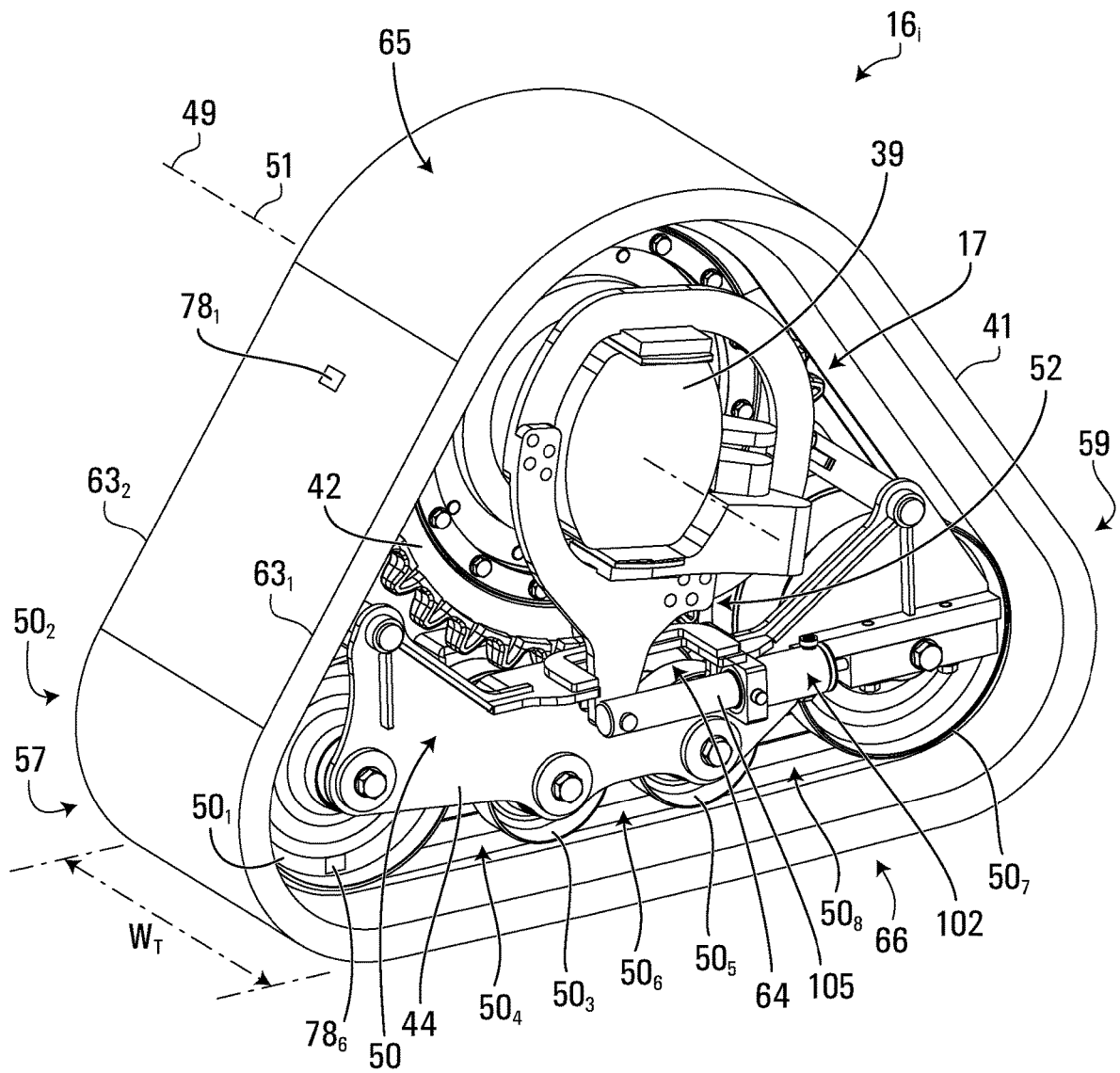
FIGS. 26 to 28 show an example of an embodiment in which a given one of the track systems comprises tags for identifying components of the given one of the track systems, such as its track.
Figure 27:
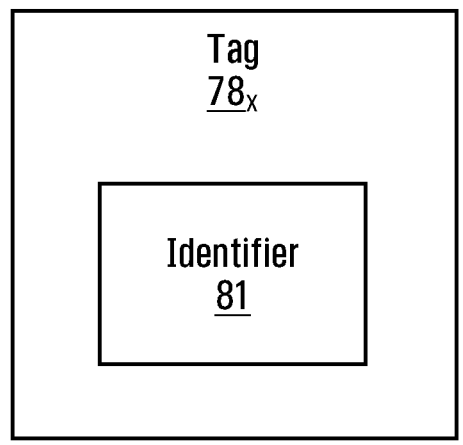

With additional reference to FIGS. 26 and 27, in some embodiments, the track systems $16_1$-$16_4$ may comprise the tags $78_1$-$78_G$ configured to identify components of the track systems $16_1$-$16_4$ (e.g., the track 41, one or more of the wheels 42, $50_1$-$50_8$, etc., or each of the track systems $16_1$-$16_4$). For example, in some embodiments, as further discussed below, the processing entity 88 of the monitoring system 82 may perform certain actions in respect of the agricultural vehicle 10 based on identification of components of the track systems $16_1$-$16_4$ using the tags $78_1$-$78_G$, such as controlling the agricultural vehicle 10 (e.g., the speed of the agricultural vehicle 10, etc.) based on what is identified and/or conveying information relating to what is identified to a remote party (e.g., a provider such as a manufacturer or distributor of the track systems $16_1$-$16_4$ and/or of the agricultural vehicle 10) who can act based on what is identified (e.g., manage a warranty, prepare for maintenance of the agricultural vehicle 10, etc.).

Each of the tags $78_1$-$78_G$ is an identification element that is part of a component (e.g., the track 41, one of the wheels 42, $50_1$-$50_8$, etc.) of a track system $16_i$ and configured to convey an identifier 81 of that component of the track system 16—such as a serial number, a make, a model, a type, and/or any other information identifying (i.e., indicating an identity of) that component of the track system $16_i$, to allow identification of that component of the track system $16_i$.

The tags $78_1$-$78_G$ may be implemented in any suitable way in various embodiments. For example, in some embodiments, a tag $78_x$ may be an RFID tag configured to wirelessly transmit an identification signal conveying the identifier 81 to the processing entity 88 of the monitoring system 82, in which case the processing entity 88 comprises an RFID reader. As another example, in some embodiments, a tag $78_x$ may be an optical tag configured to allow the identifier 81 to be optically determined by the processing entity 88 of the monitoring system 82, in which case the processing entity 88 comprises an optical device (e.g., an infrared reader, a camera, etc.) to optically read the identifier 81 from the tag $78_x$. As yet another example, in some embodiments, a tag $78_x$ may be a magnetic tag configured to allow the identifier 81 to be magnetically determined by the processing entity 88 of the monitoring system 82, in which case the processing entity 88 comprises a magnetic reader.

Figure 28:
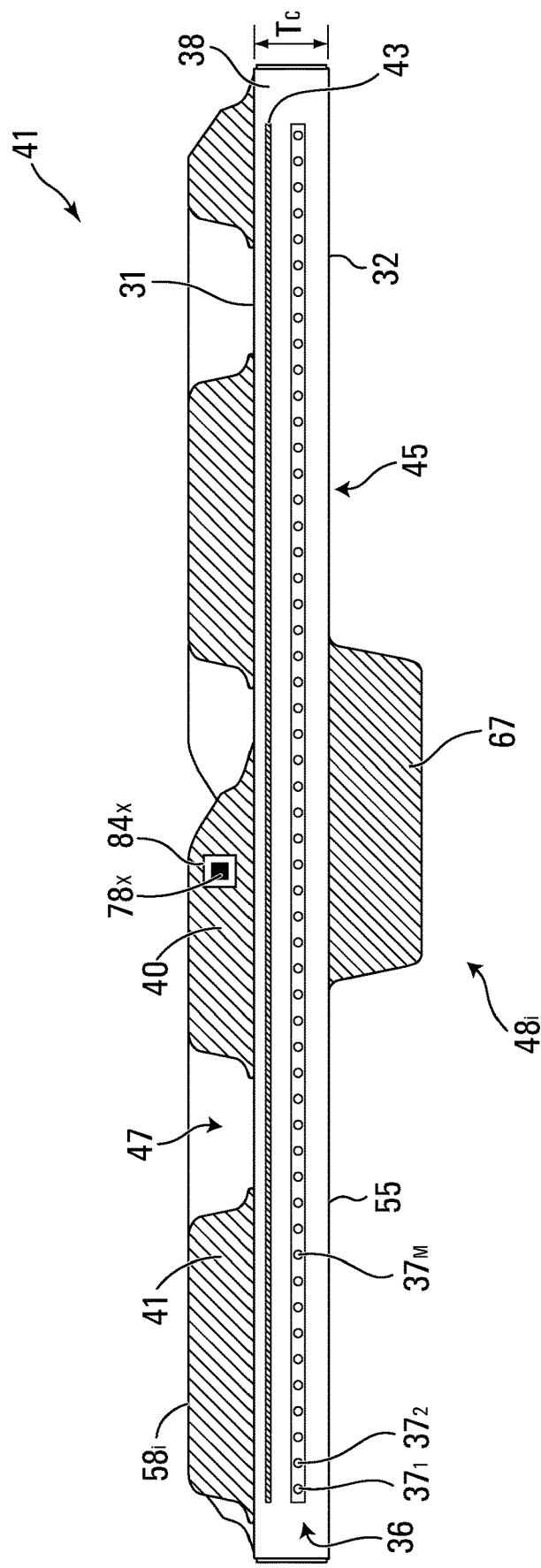

For instance, in this embodiment, with additional reference to FIG. 28, a tag $78_x$ is part of the track 41 of a track system $16_i$ to convey the identifier 81 of the track 41. More particularly, in this embodiment, the tag $78_x$ is an RFID tag configured to wirelessly transmit an identification signal conveying the identifier 81 to the processing entity 88 of the monitoring system 82, in which case the processing entity 88 comprises an RFID reader. In this example, a sensor $84_x$ of the track 41 also implements RFID and thus may include the tag $78_x$ (i.e., the sensor $84_x$ and the tag $78_x$ constitute a common element sharing a common transmitter to transmit the identification signal and the sensor signal, which may both be part of a common signal). In other examples, the tag $78_x$ may be physically distinct from any sensor $84_x$ of the track 41 (e.g., the tag $78_x$ and the sensor $84_x$ may comprise respective transmitters to transmitting the identification signal and the sensor signal).

The processing entity 88 of the monitoring system 82 is configured to perform actions based on signals from the sensors $84_1$-$84_s$ and/or the tags $78_1$-$78_G$ and possibly based on other input and/or information.

Figure 29:
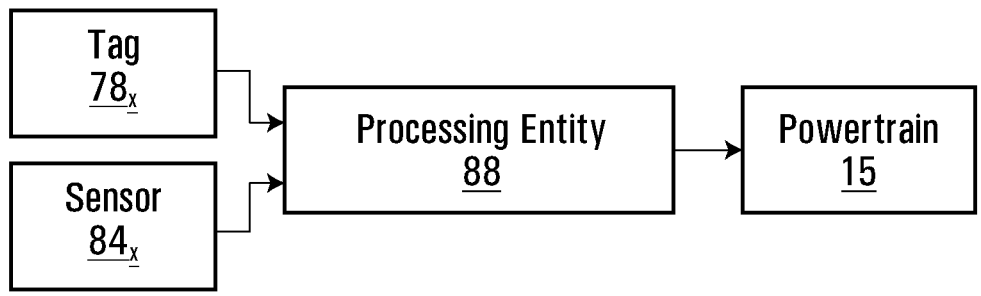
FIGS. 29 and 30 show examples of embodiments of the processing entity of the monitoring system interacting with a powertrain of the vehicle and a communication device.

For example, in some embodiments, the processing entity 88 may issue an output signal relating to the operation of the agricultural vehicle 10 based on the sensor signal from a sensor $84_x$ of the track 41 of a track system $16_i$ and/or the identification signal from a tag $78_x$ of the track 41 of the track system $16_i$. For instance, in some embodiments, as shown in FIG. 29, the output signal issued by the processing entity 88 may be directed to the powertrain 15 of the agricultural vehicle 10 to control the operation (e.g., the speed) of the agricultural vehicle 10 based on the physical aspect (e.g., the temperature) of the track 41 sensed by the sensor $84_x$ and/or the identity of the track 41. In other embodiments, the output signal issued by the processing entity 88 may be directed to a communication device (e.g., comprising a display) for outputting information regarding the operation of the agricultural vehicle 10 to the operator of the agricultural vehicle 10. As another example, in some embodiments, the processing entity 88 may issue an output signal conveying information about the track system $16_i$ (e.g., the temperature of the track 41, the identifier 81 of the track 41, etc.). As another example in some embodiments, the processing entity 88 may store information about the track system $16_i$ in memory (e.g., for future reference), such as the temperature of the track 41, the identity of the track 41, etc. at a given moment (e.g., date and time).

Figure 14:
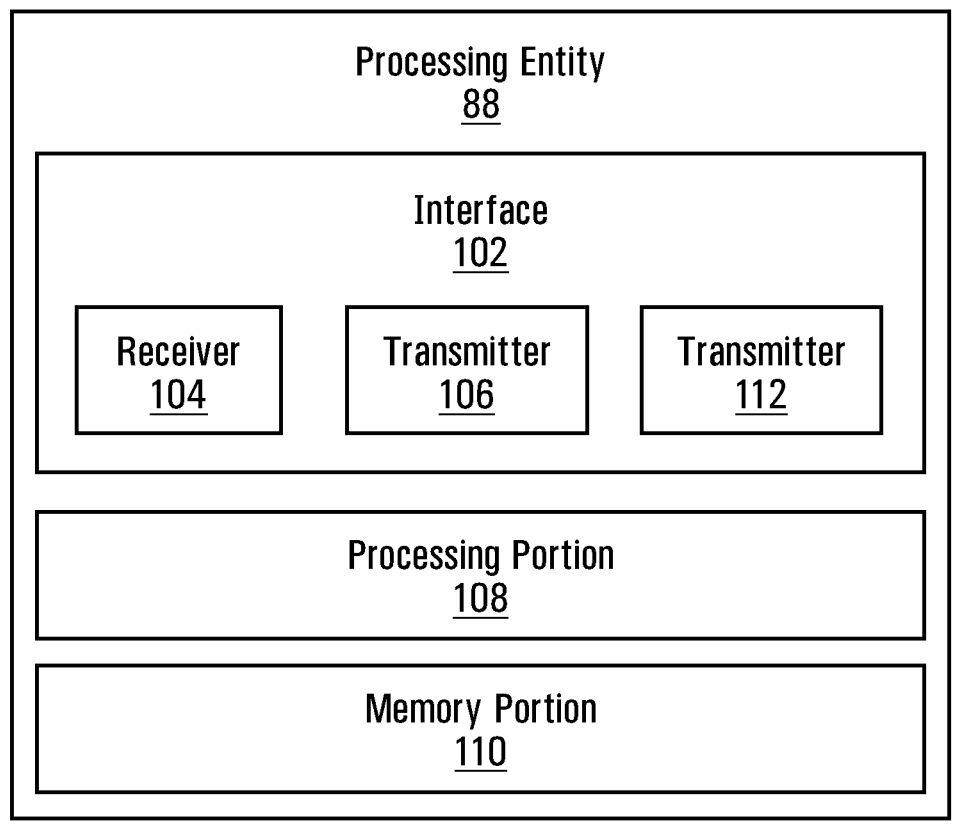
FIG. 14 shows an example of an embodiment of a processing entity of the monitoring system.

To that end, in this embodiment, and as shown in FIG. 14, the processing entity 88 comprises an interface 102, a processing portion 108, and a memory portion 110, which are implemented by suitable hardware and/or software.

The interface 102 comprises one or more inputs and outputs allowing the processing entity 88 to receive input signals from and send output signals to other components to which the processing entity 88 is connected (i.e., directly or indirectly connected), including, in this embodiment, the sensors $84_1$-$84_s$ and the tags $78_1$-$78_G$. For example, in this embodiment, an input of the interface 102 is implemented by the wireless receiver 104 to receive the sensor signal from a sensor $84_x$ and the identification signal from a tag $78_x$. An output of the interface 102 is implemented by a transmitter 112 to transmit the output signal relating to the operation of the agricultural vehicle 10. Another output of the interface 102 is implemented by the wireless transmitter 106 to transmit the interrogation signal to a sensor $84_x$ and/or a tag $78_x$.

The processing portion 108 comprises one or more processors for performing processing operations that implement functionality of the processing entity 88. A processor of the processing portion 108 may be a general-purpose processor executing program code stored in the memory portion 110. Alternatively, a processor of the processing portion 108 may be a specific-purpose processor comprising one or more preprogrammed hardware or firmware elements (e.g., application-specific integrated circuits (ASICs), electrically erasable programmable read-only memories (EEPROMs), etc.) or other related elements.

The memory portion 110 comprises one or more memories for storing program code executed by the processing portion 108 and/or data used during operation of the processing portion 108. The memory portion 110 could also be used for storing data, such as temperature and pressure readings. A memory of the memory portion 110 may be a semiconductor medium (including, e.g., a solid-state memory), a magnetic storage medium, an optical storage medium, and/or any other suitable type of memory. A memory of the memory portion 110 may be read-only memory (ROM) and/or random-access memory (RAM), for example.

In some embodiments, two or more elements of the processing entity 88 may be implemented by devices that are physically distinct from one another and may be connected to one another via a bus (e.g., one or more electrical conductors or any other suitable bus) or via a communication link which may be wired, wireless, or both. In other embodiments, two or more elements of the processing entity 88 may be implemented by a single integrated device.

In some embodiments, the processing entity 88 is integrated into the vehicle itself during original manufacturing of the vehicle. For example, in some embodiments, the processing entity 88 is built-in to the communication and control system of the vehicle itself.

Figure 44:
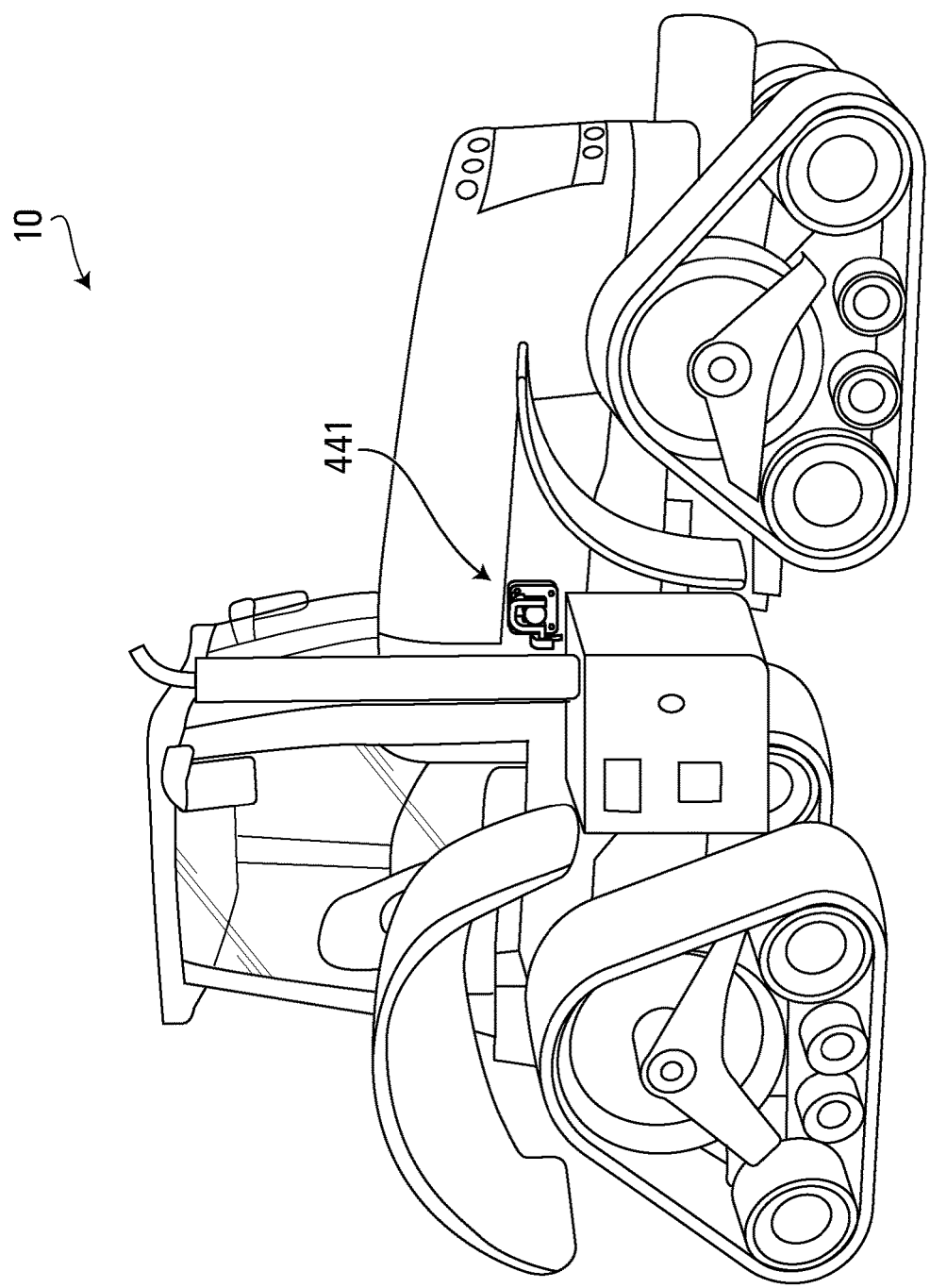
FIG. 44 shows an example of another embodiment in which the processing entity is retrofit into a vehicle.

In other embodiments however, as shown in FIG. 44, the processing entity 88 is retrofitted to an existing vehicle 440 by way of a communication interface 441 that allows data communication between an external processing entity 88 and the internal communication and control system of the vehicle 440. Examples of such communication interfaces include, but are not limited to, Tractors and Machinery for Agricultural and Forestry-Serial Control and Communications Data Network, also known as "ISOBUS", (i.e. International Organization for Standardization standard ISO 11783). This embodiment allows the same functionality as the aforementioned built-in (or integrated) embodiment, including communication with sensors $84_x$ and with other communication devices internal and external to the vehicle 440, as well as control of the vehicle 440 itself.

The processing entity 88 may be implemented in any other suitable way in other embodiments.

In some embodiments, the processing entity 88 may issue the output signal relating to the operation of the agricultural vehicle 10 based on the sensor signal from a sensor $84_x$ of the track 41 of a track system $16_i$ and/or the identification signal from a tag $78_x$ of the track 41 of the track system $16_i$.

For example, with additional reference to FIG. 29, in some embodiments, the output signal issued by the processing entity 88 may be directed to the powertrain 15 of the agricultural vehicle 10 to control the operation of the vehicle based on the physical aspect (e.g., the temperature) of the track 41 sensed by the sensor $84_x$ and/or the identity of the track 41 derived from the tag $78_x$. For instance, the output signal issued by the processing entity 88 may be directed to the powertrain 15 of the agricultural vehicle 10 to control the speed of the agricultural vehicle 10, such as by limiting and/or reducing the speed of the vehicle 10 or by allowing the speed of the vehicle 10 to be increased, based on the physical aspect (e.g., the temperature) of the track 41 and/or the identity of the track 41.

Figure 31:
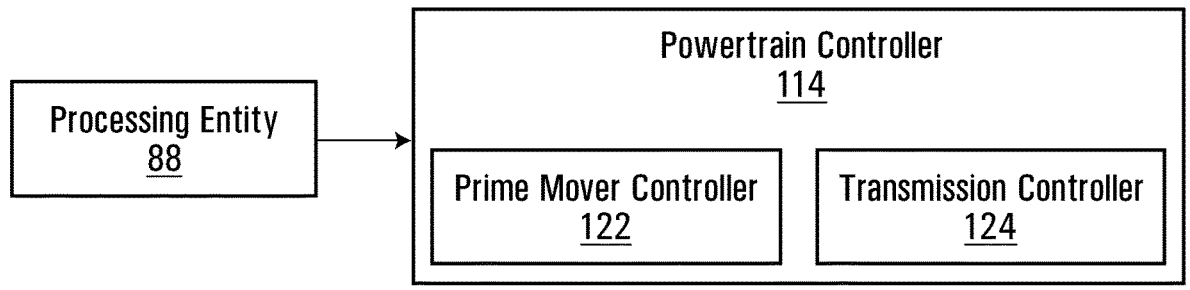
FIGS. 31 and 32 show an example of an embodiment of the processing entity of the monitoring system interacting with a powertrain controller of the vehicle.
Figure 32:
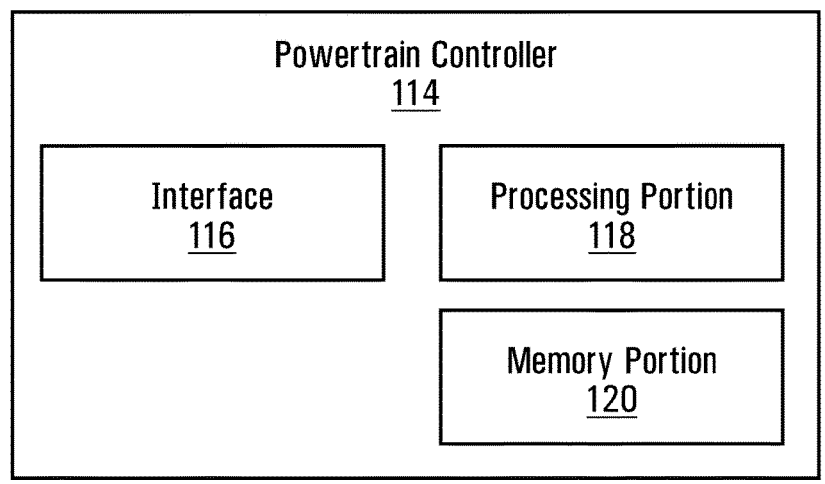

In some embodiments, as shown in FIGS. 31 and 32, the output signal issued by the processing entity 88 may be directed to a powertrain controller 114 of the powertrain 15. The powertrain controller 114 is configured for controlling operation of the powertrain 15.

More particularly, in this embodiment, the powertrain controller 114 is an electronic controller that comprises suitable hardware and/or software (e.g., firmware) configured to implement its functionality. The powertrain controller 114 comprises an interface 116, a processing portion 118 and a memory portion 120.

The interface 116 allows the powertrain controller 114 to receive inputs from and release outputs to other components of the agricultural vehicle 10 to which the powertrain controller 114 is connected (i.e., directly or indirectly connected to), including, in this embodiment, the power source 14, a transmission, an accelerator and/or other components of the user interface 70, and one or more sensors (e.g., a throttle position sensor; a motor speed sensor, i.e., a sensor sensing a speed of a motor of the power source 14; a vehicle speed sensor, i.e., a sensor sensing a speed of the agricultural vehicle 10 on the ground; a motor temperature sensor; an outside environment temperature sensor; etc.). In this example, the interface 116 of the powertrain controller 114 allows the powertrain controller 114 to receive the output signal of the processing entity 88.

The processing portion 118 comprises one or more processors for performing processing operations that implement functionality of the powertrain controller 114. A processor of the processing portion 118 may be a general-purpose processor executing program code stored in the memory portion 120. Alternatively, a processor of the processing portion 118 may be a specific-purpose processor comprising one or more preprogrammed hardware or firmware elements (e.g., application-specific integrated circuits (ASICs), electrically erasable programmable read-only memories (EEPROMs), etc.) or other related elements.

The memory portion 120 comprises one or more memories for storing program code executed by the processing portion 118 and/or data used during operation of the processing portion 118. A memory of the memory portion 120 may be a semiconductor memory (e.g., read-only memory (ROM) and/or random-access memory (RAM)), a magnetic storage medium, an optical storage medium, and/or any other suitable type of memory.

More particularly, in this embodiment, the powertrain controller 114 comprises a prime mover controller 122 and a transmission controller 124. For instance, in embodiments in which the power source 14 comprises an internal combustion engine and the transmission is an automatic transmission, the prime mover controller 122 may be an engine control unit (ECU) and the transmission controller 124 may be a transmission control unit (TCU). Such ECUs and TCUs are well understood by those skilled in the art. In some cases, the powertrain controller 114 may be a distributed controller in which the prime mover controller 122 and the transmission controller 124 are physically distinct from one another and may be connected to one another via a bus (e.g., a controller-area network (CAN) bus or other suitable bus). In other cases, the prime mover controller 122 and the transmission controller 124 may be functional entities of a single physical control module (e.g., a powertrain control module (PCM)).

The prime mover controller 122 is configured to control operation of the power source 14. Specifically, the prime mover controller 122 is configured to control one or more prime mover characteristics.

For example, in this embodiment, one prime mover characteristic controlled by the prime mover controller 122 is a power output of the power source 14. The power output of the power source 14 refers to the power currently generated by the power source 14. It can be evaluated as a torque produced by the power source 14 multiplied by a speed (i.e., a rotational speed) of the power source 14 (e.g., revolutions per minute (RPM)) at a given instant.

The prime mover controller 122 controls the power output of the power source 14 based on inputs from various entities, such as: the accelerator and/or one or more other components of the user interface 70; one or more sensors (e.g., a throttle position sensor, an air-fuel ratio sensor, a prime mover speed sensor, a vehicle speed sensor, a temperature sensor, a pressure sensor, etc.); one or more other controllers (e.g., the transmission controller 124); and/or other entities. In this example, the prime mover controller 122 may control the power output of the power source 14 based on the output signal issued by the processing entity 88.

To control prime mover characteristics such as the power output of the power source 14, in this embodiment, the prime mover controller 122 comprises a program stored in the memory portion 120 and executed by the processing portion 118. For example, the program may determine the power output of the power source 14 by performing computations based on inputs from a throttle position sensor, an air-fuel ratio sensor, a prime mover speed sensor, the accelerator, and/or the transmission controller 124. In this example, the program may determine the power output of the power source 14 based on the output signal issued by the processing entity 88. In some cases, certain operations of the program may refer to reference data stored in the memory portion 120. This reference data comprises data representative of one or more maps, tables, curves or other sets of reference values that are used during execution of the program of the prime mover controller 122. For instance, the reference data may associate different values of certain parameters of the power source 14 (e.g., the speed, temperature, air-fuel ratio, pressure, etc. of the prime mover 14) to corresponding values of fuel injection, ignition timing, valve timing, and/or other parameters of the power source 14 (e.g., a fuel map, an injection map, a boost map, and/or other performance map). Such programs and reference data are well-understood by those skilled in the art and will therefore not be discussed in further detail.

The transmission controller 124 is configured to control operation of the transmission. Specifically, the transmission controller 124 is configured to control one or more transmission characteristics. For example, in this embodiment, the transmission controller 124 controls a transmission state of the transmission. The transmission state of the transmission can be defined in terms of (i) a transmission ratio of the transmission, which is the ratio that the transmission currently applies between its input and its output, and/or (ii) an output direction of the transmission, which refers to a direction of motion (i.e., forward or reverse) of the output of the transmission that allows the agricultural vehicle 10 to advance or back up. At a given instant, the transmission state of the transmission is one of a set of available transmission states. The set of available transmission states can comprise a number of available transmission ratios that can be applied by the transmission. This number may be a finite number (e.g., two, three, four or any other finite number) of available transmission ratios, or an infinite number of available transmission ratios (e.g., in embodiments where the transmission comprises a CVT).

The transmission controller 124 controls the transmission state of the transmission based on inputs from various entities, such as: the accelerator and/or one or more other components (e.g., a gear shift stick or pedal) of the user interface 70; one or more sensors (e.g., a throttle position sensor, a shift lever sensor, a prime mover speed sensor, a vehicle speed sensor, a temperature sensor, etc.); one or more other controllers (e.g., the prime mover controller 122); and/or other entities. In this example, the transmission controller 124 may control the transmission state of the transmission based on the output signal issued by the processing entity 88.

To control the state of the transmission, in this embodiment, the transmission controller 124 comprises a program stored in the memory portion 120 and executed by the processing portion 118. For example, the program may determine when and how to shift between different transmission ratios of the transmission by performing certain computations based on inputs from a throttle position sensor, a prime mover speed sensor, a vehicle speed sensor, the accelerator and/or other components of the user interface 70, and/or the prime mover controller 122. In this example, the program may determine the state of the transmission based on the output signal issued by the processing entity 88. In some cases, certain operations of the program may refer to reference data stored in the memory portion 120. This reference data comprises data representative of one or more maps, tables, curves or other sets of reference values that are used during execution of the program of the transmission controller 124. For instance, the reference data may associate different values of the speed of the power source 14 and of the speed of the agricultural vehicle 10 to corresponding transmission ratios of the transmission. Such programs are well-understood by those skilled in the art and will therefore not be discussed in further detail.

For example, in some embodiments, a sensor $84_x$ of the track 41 of a track system $16_i$ may be a temperature sensor to sense the temperature of the track 41, and the powertrain controller 114 may control the speed of the agricultural vehicle 10 based on the temperature of the track 41. That is, the powertrain controller 114 controls the speed of the agricultural vehicle 10 based on the output signal issued by the processing entity 88 to the powertrain controller 114.

Monitoring of the temperature of the track 41 may be used by the processing entity 88 to perform certain actions, such as to convey the temperature of the track 41 to a user (e.g., the operator), to store the temperature of the track 41 in memory (e.g., for future consultation), to limit and/or reduce the speed of the agricultural vehicle 10 and/or notify the operator of the agricultural vehicle 10 if the temperature of the track 41 becomes high enough (e.g., in order to prevent blowout or other accelerated wear of the track 41), and/or to allow the speed of the agricultural vehicle 10 to be increased if the temperature of the track 41 drops or remains low enough.

More particularly, in this embodiment, the powertrain controller 114 is operable to limit the speed of the agricultural vehicle 10 based on the temperature of the track 41. For instance, in response to the output signal issued by the processing entity 88, the powertrain controller 114 may control the power source 14 and/or the transmission to limit the speed of the agricultural vehicle 10 in order to regulate the temperature of the track 41. For example, when the sensor signal indicates that the temperature of the track 41 is close to a threshold temperature at which continued operation or further increase of the temperature of the track 41 may damage or otherwise cause deterioration of the track 41, the output signal issued by the processing entity 88 may cause the powertrain controller 114 to limit the speed of the agricultural vehicle 10 to a certain speed by limiting the power output of the power source 14 through the prime mover controller 122 and/or by controlling the transmission state of the transmission through the transmission controller 124. The threshold temperature may have any suitable value and may vary according to the construction of the track 41. For example, in some cases, the threshold temperature may be at least 130° C., in some cases at least 140° C., in some cases at least 150° C., in some cases at least 160° C., in some cases at least 170° C., in some cases at least 180° C. and in some cases even greater than 180° C. (e.g., 190° C.).

In some embodiments, the powertrain controller 114 may be operable to reduce the speed of the agricultural vehicle 10 based on the temperature of the track 41. For instance, in response to the output signal issued by the processing entity 88, the powertrain controller 114 may control the power source 14 and/or the transmission to reduce the speed of the agricultural vehicle 10 in order to regulate the temperature of the track 41. For example, when the sensor signal indicates that the temperature of the track 41 is close to or higher than the threshold temperature of the track 41, the output signal issued by the processing entity 88 may cause the powertrain controller 114 to reduce the speed of the agricultural vehicle 10 to a certain lower speed by reducing the power output of the power source 14 through the prime mover controller 122 and/or by modifying the transmission state of the transmission through the transmission controller 124 (e.g., reducing a transmission ratio thereof). The lower speed at which the agricultural vehicle 10 is reduced may have any suitable value and may depend on the temperature of the track 41. For instance, if the temperature is higher than the threshold temperature of the track 41, the reduction in speed may be more significant (i.e., the speed may be reduced to a significantly lower value) than if the temperature of the track 41 is close to but not above the threshold temperature of the track 41. In some cases, the temperature of the track 41 at which the powertrain controller 114 causes a reduction in the speed of the agricultural vehicle 10 may be at least 130° C., in some cases at least 140° C., in some cases at least 150° C., in some cases at least 160° C., in some cases at least 170° C., in some cases at least 180° C. and in some cases even greater than 180° C. (e.g., 190° C.).

Moreover, in some embodiments, the powertrain controller 114 may be operable to determine whether to allow the speed of the agricultural vehicle 10 to be increased based on the temperature of the track 41. For instance, when the operator of the agricultural vehicle 10 acts upon the accelerator in order to increase the speed of the agricultural vehicle 10, the powertrain controller 114 may determine whether or not to allow the speed of the agricultural vehicle 10 to be increased based on the output signal of the processing entity 88. For example, when the sensor signal indicates that the temperature of the track 41 is close to or higher than the threshold temperature of the track 41, the output signal issued by the processing entity 88 may cause the powertrain controller 114 to not allow (i.e., to prevent) the speed of the agricultural vehicle 10 to be increased in accordance to the operator input at the accelerator. Conversely, when the sensor signal indicates that the temperature of the track 41 is lower than the threshold temperature of the track 41 and does not pose a risk of deterioration of the track 41, the output signal issued by the processing entity 88 may cause the powertrain controller 114 to allow the speed of the agricultural vehicle 10 to be increased in accordance to the operator input at the accelerator. For example, in some cases, the temperature of the track 41 at which the powertrain controller 114 may determine to allow the speed of the track 41 to be increased may be up to 110° C., in some cases up to 120° C., in some cases up to 130° C., in some cases up to 140° C., in some cases up to 150° C. and in some cases even more than 150° C. (e.g., 155° C.). In some cases, the temperature of the track 41 above which the powertrain controller 114 may determine not to allow the speed of the track 41 to be increased may be between 130° C. to 190° C., in some cases between 140° C. to 180° C., in some cases between 150° C. to 170° C. and in some cases between 155° C. to 165° C.

In this embodiment, the output signal of the processing entity 88 is determined through a control loop feedback mechanism. For instance, in this embodiment, the processing entity 88 implements a proportional-integral-derivative (PID) controller to determine the output signal. For example, the PID controller may cause the output signal directed to the powertrain controller 114 to adjust the speed of the agricultural vehicle 10 based on iterative readings of the temperature of the track 41 to obtain a desired temperature of the track 41 (e.g., a temperature below the threshold temperature of the track 41). More specifically, in some embodiments, the PID controller causes the output signal to adjust the speed of the agricultural vehicle 10 by iteratively minimizing an error between the iterative readings of the temperature of the track 41 and the desired temperature of the track 41. To that end, the PID controller may be tuned to have an overdamped response (i.e., a response characterized by an exponential decay towards a set point value (e.g., the desired temperature of the track 41) without oscillation) such as to prevent or reduce overshoot of the temperature of the track 41. This may be useful to prevent the temperature of the track 41 from reaching or exceeding the threshold temperature of the track 41 above which the track 41 is susceptible to damage or deterioration. Such PID processes are generally known and thus will not be further discussed here.

Figure 30:
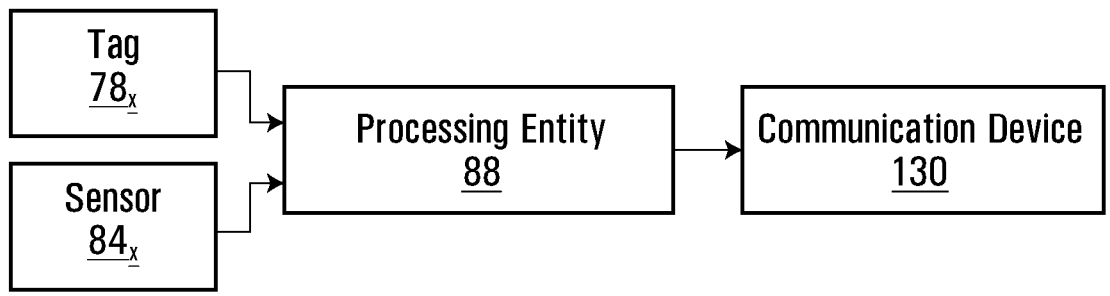

In other embodiments, as shown in FIG. 30, the output signal issued by the processing entity 88 may be directed to a communication device 130 for communicating information regarding the operation of the agricultural vehicle 10 to a user, such as the operator of the agricultural vehicle 10.

The communication device 130 may be implemented in various ways in various embodiments.

Figure 33:
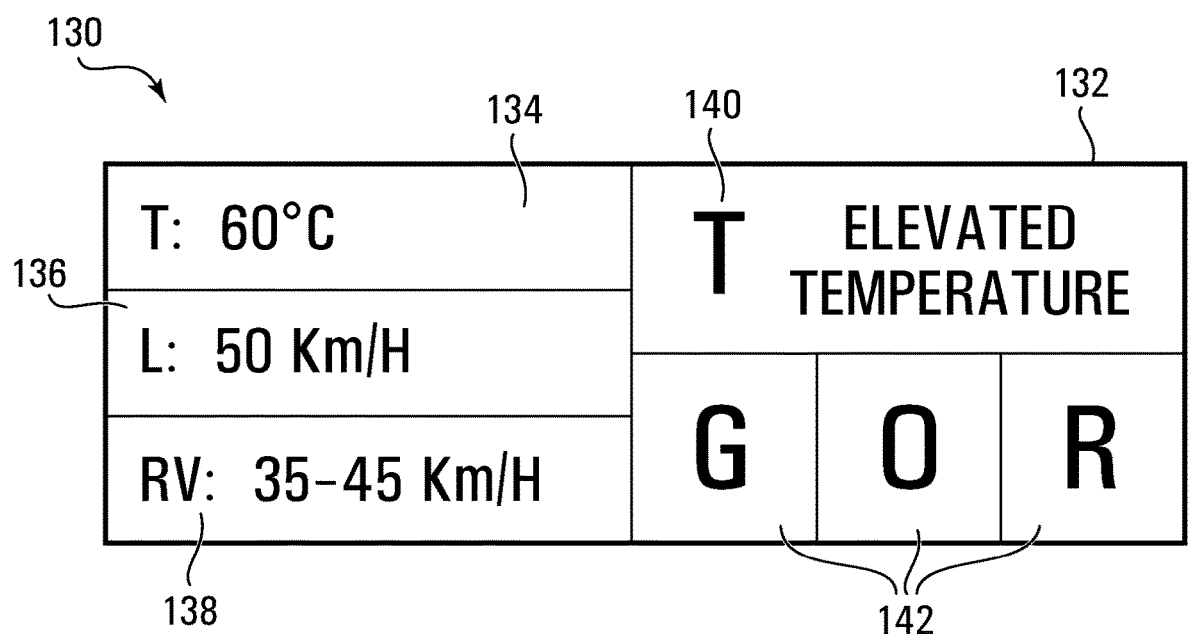
FIGS. 33 and 34 show examples of embodiments of outputs of the monitoring system via a user interface of the vehicle.

For example, with additional reference to FIG. 33, in some embodiments, the communication device 130 may be part of the user interface 70 of the operator cabin 20 in order to convey information to the operator. For instance, the communication device 130 may comprise a display 132 that is part of the user interface 70 of the operator cabin 20. The information regarding the operation of the agricultural vehicle 10 may thus be outputted as visual information on the display 132.

In some embodiments, the display 132 may comprise visual information that is continually provided. For instance, the display 132 may comprise a parameter reading 134 for indicating a physical quantity related to the operation of the agricultural vehicle 10. The parameter reading 134 is continually provided in that it is repeatedly updated to reflect a new parameter reading. In this example, the parameter reading 134 is a temperature reading 134 which indicates a temperature of the track 41. The temperature reading 134 may alternatively or additionally indicate a temperature of respective ones of the traction lugs $58_1$-$58_T$.

Moreover, in some embodiments, the display 132 may be operable to display a speed limit reading 136 comprising an indication of a limit of the speed of the agricultural vehicle 10. For example, the speed limit reading 136 may correspond to the speed at which the powertrain controller 114 may limit the agricultural vehicle 10 based on the temperature of the track 41 as described above. In addition, in some embodiments, the display 132 may be operable to display a recommended speed variation 138 corresponding to a speed of the agricultural vehicle 10 at which the agricultural vehicle 10 may be operated without elevating the temperature of the track 41 to levels that are detrimental to the track 41.

Furthermore, in some embodiments, the display 132 may be operable to display a notification 140 to notify the operator of information regarding the operation of the agricultural vehicle 10. For instance, in this embodiment, the notification 140 is configured to notify the operator when the temperature of the track 41 has reached or is reaching levels that are detrimental to the track 41. In some embodiments, the display 132 may also be operable to display textual information to inform the operator that the temperature of the track 41 is elevated.

In some embodiments, the display 132 may also convey graphical information 142 for notifying the operator of the status of the temperature of the track 41. For instance, the graphical information 142 may include a color coded indicator with different colors attributed different meanings. For instance, the graphical information 142 may be capable of displaying a green color, an orange color and a red color, each of which is indicative of the temperature of the track 41. In this case, the green color indicates that the temperature of the track 41 is at an acceptable level, the orange color indicates that the temperature of the track 41 is reaching elevated levels and the red color indicates that the temperature of the track 41 has reached a level that is detrimental to the track 41.

Figure 34:
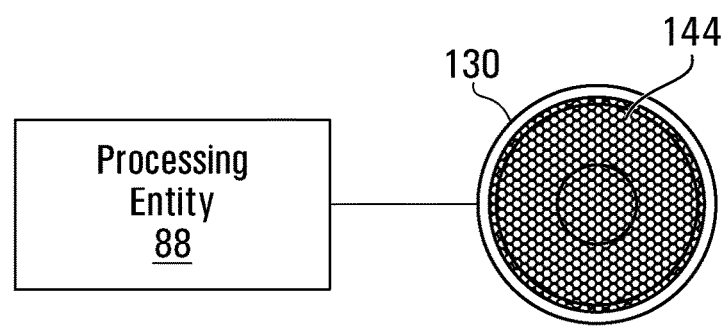
Figure 35:
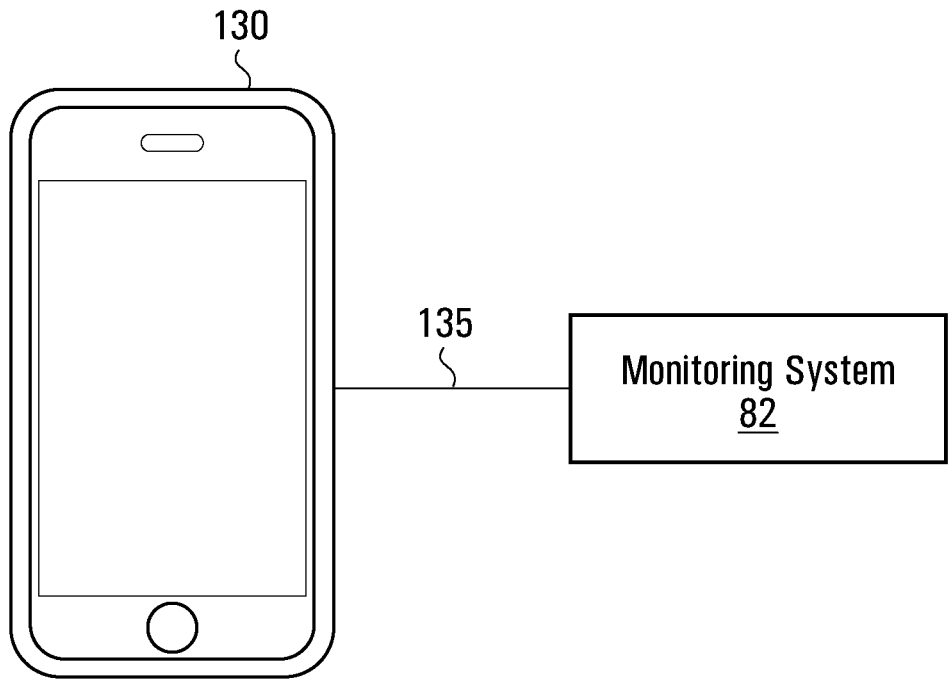
FIGS. 35 to 38 shows an example of an embodiment of the communication device.

In addition or alternatively to providing visual information, in some embodiments, the communication device 130 may be operable to provide audible information to the operator of the agricultural vehicle 10. For instance, with additional reference to FIG. 34, in some embodiments, the communication device 130 may comprise a speaker 144 for emitting sound (e.g., an alarm, an utterance, etc.) indicative of information regarding the operation of the agricultural vehicle 10. For example, the speaker 144 may sound an alarm indicative of the temperature of the track 41 is elevated to levels that are detrimental to the track 41.

Figure 36:
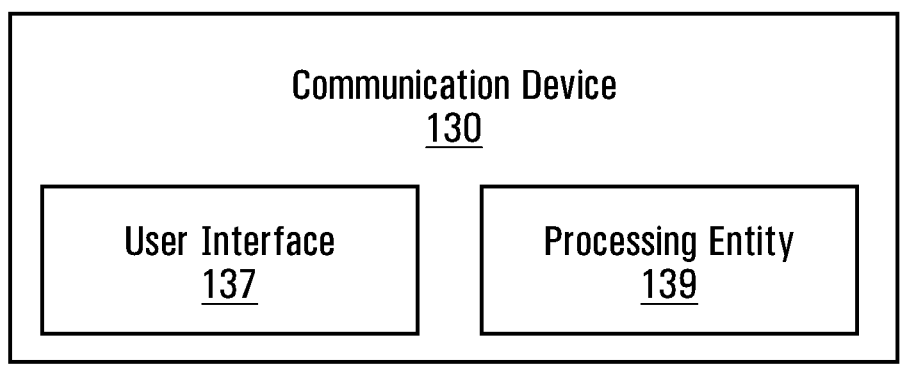

As another example, in some embodiments, as shown in FIG. 36, the communication device 130 may be a personal communication device (e.g., a smartphone, a computer, etc.) or other device that is usable by a user (e.g., the operator) and distinct from and not built into the user interface 70 of the operator cabin 20 of the vehicle 10. This may be useful, for instance, in situations where the vehicle 10 was not originally manufactured with the track system $16_i$ and/or is not readily modifiable to allow interaction between the monitoring system 82 and the user interface 70 and/or other original components of the vehicle 10.

The communication device 130 may interact with the monitoring system 82 over a communication link 135, which may be wireless, wired, or partly wireless and partly wired (e.g., Bluetooth or other short-range or near-field wireless connection, WiFi or other wireless LAN, WiMAX or other wireless WAN, cellular, Universal Serial Bus (USB), etc.). For example, in some embodiments, the communication device 130 may be:
  a smartphone or other wireless phone; a tablet computer; a head-mounted display, smartwatch or other wearable device; or any other communication device carried, worn or otherwise associated with the user (e.g., the operator);
  a server or other computing entity (e.g., implementing a website) associated with: the user (e.g., the operator); an organization associated with the user (e.g., the operator); a manufacturer of the track 41, the track system $16_i$, and/or of the vehicle 10; a retailer, distributor, or other vendor of the track 41, the track system $16_i$, and/or of the vehicle 10; or any other party who may have an interest in the track 41, the track system $16_i$, and/or of the vehicle 10;
  etc.

In some cases, such as where the communication device 130 is a smartphone, tablet, head-mounted display, smartwatch, or other communication device carried or worn by the user (e.g., the operator), communication between the communication device 130 and the monitoring system 82 may be direct, i.e., without any intermediate device. For instance, in some embodiments, this can be achieved by pairing (e.g., Bluetooth pairing) the communication device 130 and the monitoring system 82.

In other cases, such as where the communication device 130 is remote from the monitoring system 82, communication between the communication device 130 and the monitoring system 82 may be indirect, e.g., through one or more networks and/or one or more additional communication devices. For example, in some embodiments, the monitoring system 82 may communicate (e.g., via the transmitter 112 and/or the receiver 104 of the processing entity 88 or the transmitter 90 and/or the receiver 92 of the sensor $84_x$) with a WiFi hotspot or cellular base station, which may provide access to a service provider and ultimately the Internet or another network, thereby allowing the monitoring system 82 and the communication device 130 to communicate. As another example, in some embodiments, communication between the communication device 130 and the monitoring system 82 may take place through a smartphone, tablet, head-mounted display, smartwatch, or other communication device which is carried or worn by the user of the communication device 130 and which itself may have established communication with a WiFi hotspot or cellular base station.

For example: in some embodiments, the communication device 130 may be a smartphone or other mobile phone, a tablet, a smart watch, head-mounted display or other wearable device, or any other communication device that may be carried by the user, and the communication link 135 may be a short-range wireless link (e.g., Bluetooth) or a wired link (e.g., USB); in other embodiments, the communication device 130 may be a server or other computing entity or a smartphone or other mobile phone, a tablet, a smart watch, head-mounted display or other wearable device, or any other communication device that may be carried by the user and the communication link 135 may be implemented by a data network such as the Internet over a wired connection and/or a wireless connection (e.g., WiFi, WiMAX, cellular, etc.); and, in other embodiments, the communication device 130 may be a server or other computing entity and the communication link 135 may be implemented over a wireless connection using, for instance, dedicated short-range communication (DSRC), IEEE 802.11, Bluetooth and CALM (Communications Access for Land Mobiles), RFID, etc.

In some embodiments, an application ("app", i.e., software) may be installed on the communication device 130 to interact with the monitoring system 82 of the vehicle 10. For example, in some embodiments, such as where the communication device 130 is a smartphone, a tablet, a computer, etc., the user (e.g., the operator) may download the app from a repository (e.g., Apple's App Store, iTunes, Google Play, Android Market, etc.) or any other website onto the communication device 130. Upon activation of the app on the communication device 130, the user may access certain features relating to the monitoring system 82 of the vehicle 10 locally on the communication device 130. In addition, a data connection can be established over the Internet with a server of which executes a complementary server-side application interacting with the app on the communication device 130.

For example, in some embodiments, the communication device 130 may be a smartphone of the operator of the vehicle 10, onto which an app to interact with the monitoring system 82 of the vehicle 10 has been installed (e.g., downloaded).

Figure 37:
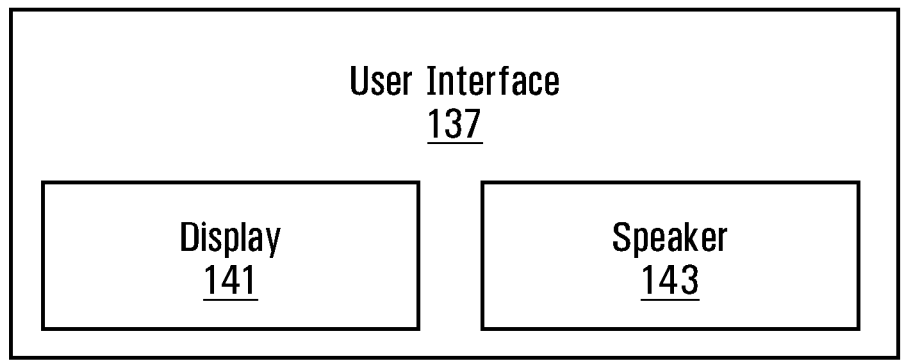
Figure 38:
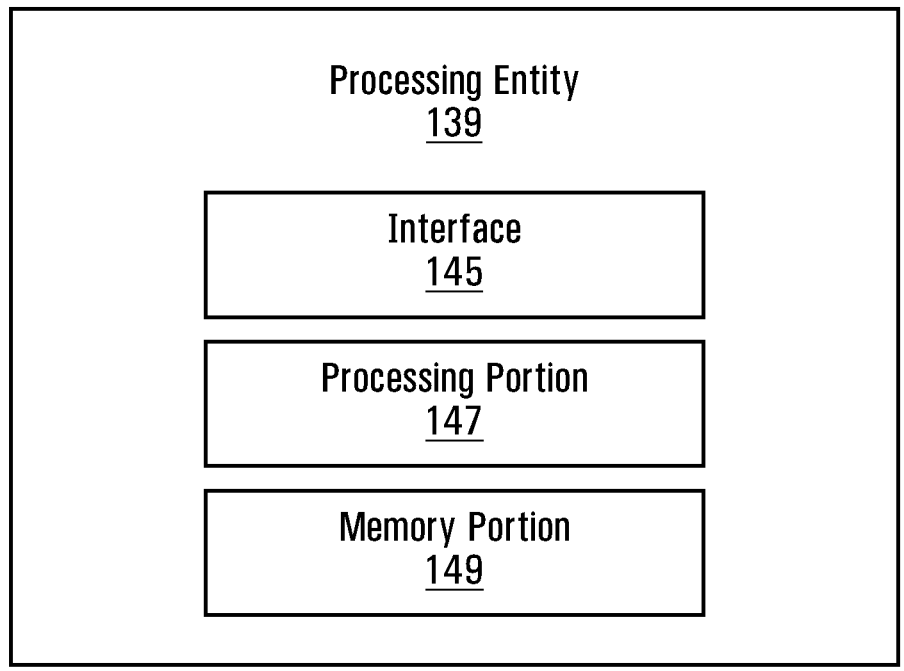

In various embodiments, as shown in FIGS. 36 to 38, the communication device 130 (e.g., whether part of the user interface 70 of the operator cabin 20, or a personal communication device such as a smartphone, tablet, computer, etc.) may comprise a user interface 137 and a processing entity 139. The user interface 137 may comprise a display 141, a speaker 143, and/or any other output device, such as the display 132 of the operator cabin 20, a display of a smartphone, etc. The processing entity 139 comprises an interface 145, a processing portion 147, and a memory portion 149, which are implemented by suitable hardware and/or software.

The interface 145 comprises one or more inputs and outputs allowing the processing entity 139 to receive input signals from and send output signals to other components to which the processing entity 139 is connected (i.e., directly or indirectly connected). For example, in this embodiment, an input of the interface 145 is implemented by a wireless receiver to receive a signal from the monitoring system 82. An output of the interface 145 is implemented by a transmitter.

The processing portion 147 comprises one or more processors for performing processing operations that implement functionality of the processing entity 139. A processor of the processing portion 147 may be a general-purpose processor executing program code stored in the memory portion 149. Alternatively, a processor of the processing portion 147 may be a specific-purpose processor comprising one or more preprogrammed hardware or firmware elements (e.g., application-specific integrated circuits (ASICs), electrically erasable programmable read-only memories (EEPROMs), etc.) or other related elements.

The memory portion 149 comprises one or more memories for storing program code executed by the processing portion 147 and/or data used during operation of the processing portion 147. A memory of the memory portion 149 may be a semiconductor medium (including, e.g., a solid-state memory), a magnetic storage medium, an optical storage medium, and/or any other suitable type of memory. A memory of the memory portion 149 may be read-only memory (ROM) and/or random-access memory (RAM), for example.

In some embodiments, two or more elements of the processing entity 139 may be implemented by devices that are physically distinct from one another and may be connected to one another via a bus (e.g., one or more electrical conductors or any other suitable bus) or via a communication link which may be wired. In other embodiments, two or more elements of the processing entity 139 may be implemented by a single integrated device.

The processing entity 139 may be implemented in any other suitable way in other embodiments.

Although the output signal issued by the processing entity 88 was described in embodiments considered above as being directed to the powertrain 15 of the agricultural vehicle 10 or the communication device 130, in some embodiments, both of these actions can be performed by the processing entity 88. That is, an output signal may be issued by the processing entity 88 and directed to the powertrain 15 of the agricultural vehicle 10 to control the powertrain 15 of the vehicle 10 and another output signal may be issued by the processing entity 88 and directed to the communication device 130 for communicating information regarding the operation of the vehicle 10 to a user such as the operator of the vehicle 10.

In some embodiments, a sensor $84_x$ may be external to the track 41 and in some cases external to the track system $16_i$. For example, in some embodiments, a temperature sensor $84_x$ may be an infrared sensor configured to measure infrared light radiating from the track 41 in order to sense the temperature of the track 1. For instance, in some examples of implementation, the infrared sensor $84_x$ may be installed on the track-engaging assembly 21 or on the frame 12 or another part of the agricultural vehicle 10 adjacent to the track system $16_i$ such that it is able to measure the infrared light, and thus heat energy, emitted by the track 41.

In some embodiments, instead of the physical aspect (e.g., the temperature) of the track 41, the physical aspect (e.g., the temperature) of the track system $16_i$ sensed by a sensor $84_x$ may be the physical aspect (e.g., the temperature) of another component of the track system $16_i$. For instance, in some embodiments, a sensor $84_x$ may be disposed to sense a temperature of a given one of the roller wheels $28_1$-$28_6$. For example, the sensor $84_x$ may be embedded in a covering (e.g., an elastomeric covering) of a roller wheel $28_1$ that contacts the inner side 45 of the track 41. This may be useful in cases where the covering of the roller wheels $28_1$-$28_6$ wears out more rapidly at certain temperatures. In other embodiments, a sensor $84_x$ may be disposed in the drive wheel 24 (e.g., in the drive members $52_1$-$52_B$).

The monitoring system 82 may be configured to provide other information and/or inputs depending on types of sensors that are used in the track system 16$_i$.

For example, in embodiments where a sensor 84$_x$ of the track 41 of a track system 16$_i$ is a pressure sensor, the monitoring system 82 may be configured to determine characteristics related to the ground on which the track system 16$_i$ travels (e.g., a compactness of the ground). More specifically, the pressure sensor 84$_x$ of the monitoring system 82 may send as an input signal to the processing entity 88 the pressure recorded by the pressure sensor 84$_x$ as the track system 16$_i$ travels on the ground. This may allow the processing entity 88 to calculate a trend of the pressure experienced at the pressure sensor 84$_x$ as the track 41 is driven by the track-engaging assembly 21 of the track system 16$_i$. As a peak pressure is expected to be recorded when the pressure sensor 84$_x$ is disposed between any of the drive wheel 24, the front idler wheel 26 and the roller wheels 28$_1$-28$_6$ and the ground, the pressure recorded at these points can be determinative of characteristics related to the ground on which the track system 16$_i$ travels. For example, when the peak pressure is recorded as being particularly elevated, the processing entity 88 of the monitoring system 82 may determine that the ground is hard (e.g., a compact soil, a paved road), whereas when the pressure is recorded as being particularly low, the processing entity 88 of the monitoring system 82 may determine that the ground is soft (e.g., loose soil). For instance, the memory portion 110 of the processing entity 88 may store a range of values of pressures that can be expected to be recorded and an associated characteristic of the ground (e.g., hard, soft, etc.). In such embodiments, the output signal of the processing entity 88 may thus be received by the powertrain 15, the powertrain controller 114 or the communication device 130 and used to control the operation of the agricultural vehicle 10 based on the recorded pressure and/or outputting information regarding the operation of the agricultural vehicle 10 to the operator of the agricultural vehicle 10.

As another example, in some embodiments where a sensor 84$_k$ of the track 41 of a track system 16$_i$ is a pressure sensor, the monitoring system 82 may be configured to determine a load distribution of the vehicle 10 and, optionally, propose an improved load distribution of the vehicle 10. For instance, in some embodiments, based on the pressure values recorded by the pressure sensor 84$_k$, the processing entity 88 of the monitoring system 82 may be configured to determine a load distribution on the track system 16$_i$. For example, if the pressure readings from the pressure sensor 84$_k$ indicate a significantly higher pressure when the pressure sensor 84$_k$ records the pressure at a front portion of the track system 16$_i$ (e.g., when the pressure sensor 84$_k$ is disposed between the front idler wheel 26 and the ground) than when the pressure sensor 84$_k$ records the pressure at a rear portion of the track system 16$_i$ (e.g., when the pressure sensor 84$_k$ is disposed between the drive wheel 24 and the ground), then the processing entity 88 may determine that the track system 16$_i$ is unevenly loaded. The pressure difference may be considered significant for example if the difference is greater than a certain percentage (e.g., 10%, 20%, 30%, 40%, etc.). In such embodiments, the output signal of the processing entity 88 may signal to the powertrain 15, to the powertrain controller 114 or to the communication device 130 that the track system 16$_i$ is unevenly loaded. Moreover, in some embodiments, the processing entity 88 may be configured to derive an improved load distribution of the vehicle 10. For instance, in some embodiments, based on its determination of whether or not the track system 16$_i$ is unevenly loaded, the processing entity 88 may derive a load distribution adjustment that can be implemented to the vehicle 10 and/or track system 16$_i$ to correct or otherwise minimize the unevenly loaded condition of the track system 16$_i$. In some cases, the processing entity 88 may derive the load distribution adjustment based in part on additional inputs such as the type of vehicle 10 and/or its use. For example, the processing entity 88 may derive a weight that can be applied at a front or rear of the vehicle 10 and/or track system 16$_i$ to improve the load distribution of the track system 16$_i$. This derived information may be contained in the output signal of the processing entity 88 to the communication device 130 or other entity of the vehicle 10. For example, the display 132 of the communication device 130 may display this information for the user to consider implementing the load distribution adjustment suggested by the processing entity 88. As a specific example of implementation, the information displayed by the display 132 of the communication device 130 may suggest adding or removing a certain amount of weight forwardly or rearwardly of a given point of the track system 16$_i$ (e.g., forwardly or rearwardly of a midpoint of the length of the track system 16$_i$).

In some embodiments, based on the determination of whether the track system 16$_i$ is unevenly loaded, the monitoring system 82 may be configured to issue a notification to the user of the vehicle 10. For instance, the notification 140 displayed on the display 132 may relate to a loading condition of the track system 16$_i$ such as to make the user of the vehicle 10 aware of the loading condition of the track system 16$_i$. For example, the notification 140 may convey that the track system 16$_i$ and/or vehicle 10 is overly loaded (e.g., a load carried by the vehicle 10 is too big), unevenly loaded, or that the load distribution of the track system 16$_i$ and/or vehicle 10 is adequate.

In some embodiments, the sensors 84$_1$-84$_S$ of the monitoring system 82 may include different types of sensors (e.g., temperature sensors, pressure sensors, strain sensors, etc.) such that the processing entity 88 of the monitoring system 82 is actionable on more than one type of parameter regarding the track 41 and/or other components of the track system 16$_i$ (e.g., the roller wheels 28$_1$-28$_6$) and/or of the agricultural vehicle 10. Using more than one variety of sensor may allow the monitoring system 82 to detect situations that may be more difficult to detect with a single type of sensor (e.g., solely temperature sensors). For instance, in some embodiments, the sensors 84$_1$-84$_S$ may include at least one pressure sensor and at least one temperature sensor. In one example of implementation, the pressure recorded by the pressure sensor 84$_x$ in combination with the temperature recorded by the temperature sensor 84$_x$ may allow the processing entity 88 of the monitoring system 82 to determine that the track 41 is misaligned. For example, the pressure sensor 84$_x$ and the temperature sensor 84$_x$ may be positioned in a drive/guide lug 48$_i$ and thus the input signals from the pressure sensor 84$_x$ and the temperature sensor 84$_x$ convey to the processing entity 84$x$ the pressure and the temperature recorded at the drive/guide lug 48$_i$. If the recorded pressure and temperature are higher than a threshold value of each of the pressure and temperature, then the processing entity 88 may determine that the track 41 is misaligned. Similarly, the pressure and temperature sensors may be provided in the roller wheels 28$_1$-28$_6$ to determine if the track 41 is misaligned. Thus the notification 140 issued to the user may relate to the alignment of the track 41.

In other embodiments, a sensor 84$_x$ and the processing entity 88 may be connected by a wire (e.g., the sensor 84$_x$ and the processing entity 88 may be separate devices connected by a cable or other wire or may be components of a common device connected by a wire within the common device).

In some embodiments, a sensor $84_x$ and the processing entity 88 may be integrated together into the track 41 of a track system $16_i$ is. As such, in these embodiments, the track 41 can communicate directly with the powertrain 15 or user interface of the agricultural vehicle 10 and/or with the communication device 130.

Although in embodiments considered above the monitoring system 82 is used to monitor the track system $16_i$ during the operation of the vehicle 10, in other embodiments, the monitoring system 82 may be used for monitoring the track system $16_i$ or a component thereof such as the track 41 outside of the operation of the vehicle 10.

For instance, in some embodiments, the monitoring system 82 may be used to assess a use of the track system $16_i$. That is, the monitoring system 82 may be configured to assess parameters that relate to a usage of the track system $16_i$.

This may be useful to obtain general information regarding the use of the track system $16_i$ such as, for example, a level of usage of the track system $16_i$ (i.e., its progress in its overall life cycle) and/or conditions under which the track system $16_i$ has been used.

In accordance with an example of implementation, the monitoring system 82 may assess an amount of time (e.g., hours) in which the track system $16_i$ has been in use. For instance, information provided by a sensor $84_x$ of the track 41 of a track system $16_i$ is may be used to gauge when the track 41 is in driving contact with the ground. For example, in cases where the sensor $84_x$ is a temperature sensor, the monitoring system 82 may determine that the track 41 is in driving contact with the ground when the temperature recorded by the temperature sensor $84_x$ is greater than a certain value. By calculating the amount of time that the temperature sensed by the temperature sensor $84_x$ is greater than the certain value, the monitoring system 82 may thus calculate the amount of time that the track 41 or track system $16_i$ has been in use.

Additionally or alternatively, the monitoring system 82 may assess a usage condition associated with the track system $16_i$. For instance, this may include the temperatures at which the track 41 has operated over a period of time. For example, the monitoring system 82 may be configured to assess a temperature trend over time during use of the track system $16_i$. This may allow the user or any other person to assess, for example, whether the track system $16_i$ or track 41 has been operated at an elevated temperature for extended amounts of time or whether the track system $16_i$ or track 41 has been operated at an adequate temperature most of the time during its use.

Additionally or alternatively, the monitoring system 82 system may assess a geographical location at which a track system $16_i$ has been used. This may be a general geographical location (e.g., a city, a province/state, a country, etc.) and/or a more precise geographical location (e.g., an agricultural field, a road, etc.). The assessment of the geographical location may be useful in various ways. For example, it may be useful for warranty considerations, such as in cases where a warranty covers use of the track system $16_i$ in certain territories (e.g., a province/state), or in certain terrains (e.g., agricultural fields) but only a limited amount of use on other terrains (e.g., paved roads). The assessment of the geographical location by the monitoring system 82 may thus allow to gauge whether the track system $16_i$ meets certain conditions of the warranty, such as, for example, limited travel over paved roads. As another example, this may be useful to keep a travel log of the vehicle 10 to which the track system $16_i$ is mounted and enable the user to gauge the efficiency of the vehicle's displacements and adjust its travelling patterns accordingly.

Additionally or alternatively, the monitoring system 82 system may be configured to predict an end-of-life of the track 41 of a track system $16_i$ is. For instance, in some embodiments, the sensors $84_1$-$84_S$ of the monitoring system 82 may include at least one accelerometer and at least one tread wear sensor which provides the processing entity 88 with an amount of cycles (e.g., rotations) of the track 41 (provided by the accelerometer) and the height H of the traction lug $58_i$ to which the tread wear sensor is installed (provided by the tread wear sensor). Thus, the processing entity 88 may derive, based on data collected by the accelerometer and the tread wear sensor, an estimated an amount of time in which the track 41 may need to be replaced and/or repaired. For example, the processing entity 88 may establish a pattern of use of the track 41 during certain time periods (e.g., during a week, during a month, during a season) based on a previous year's use of the track 41. Based on the pattern of use of the track 41, the processing entity 88 may thus derive the estimated amount of in which the track 41 may need to be replaced and/or repaired.

In some embodiments, in addition to or instead of issuing an output signal to the powertrain 15 of the agricultural vehicle 10 to control the operation (e.g., the speed) of the agricultural vehicle 10, the processing entity 88 of the monitoring system 82 may issue one or more output signals to other components of the agricultural vehicle 10 (e.g., the track systems $16_1$-$16_4$, the steering mechanism 18, the suspension 24, etc.) to control their operation based on the physical aspect of the agricultural vehicle 10 or the environment of the agricultural vehicle 10 that is sensed by a sensor $84_x$ and/or based on the identity of a component identified by a tag $78_x$.

For instance, in some embodiments, the processing entity 88 may issue an output signal to a component (e.g., the tensioner 93, the anti-rotation device 52, etc.) of a track system $16_i$ to control operation of that component of the track system $16_i$ based on the physical aspect of the track 41 of the track system $16_i$ or the ground beneath the track 41 that is sensed by a sensor $84_x$ of the track 41 and/or based on the identity of the track 41.

Examples of other actions that can be performed by the processing entity 88 of the monitoring system 82 in various embodiments are discussed below.

1. Vision Systems a. Inspection (Connected Maintenance)

Some embodiments may use an imaging system to assess the state of a track 41 and/or track system $16_i$ in order to schedule and/or implement maintenance and/or servicing and/or replacement of the track 41 and/or track system $16_i$. The imaging system can be placed in the track system $16_i$, on the vehicle 10, or in the track 41 for assessing components of the track system 16*i* and/or components of the track 41.

The monitoring system 82 may include a number of imaging sensors, non-limiting examples of which are described below with reference to FIGS. 45 to 49.

Figure 45:
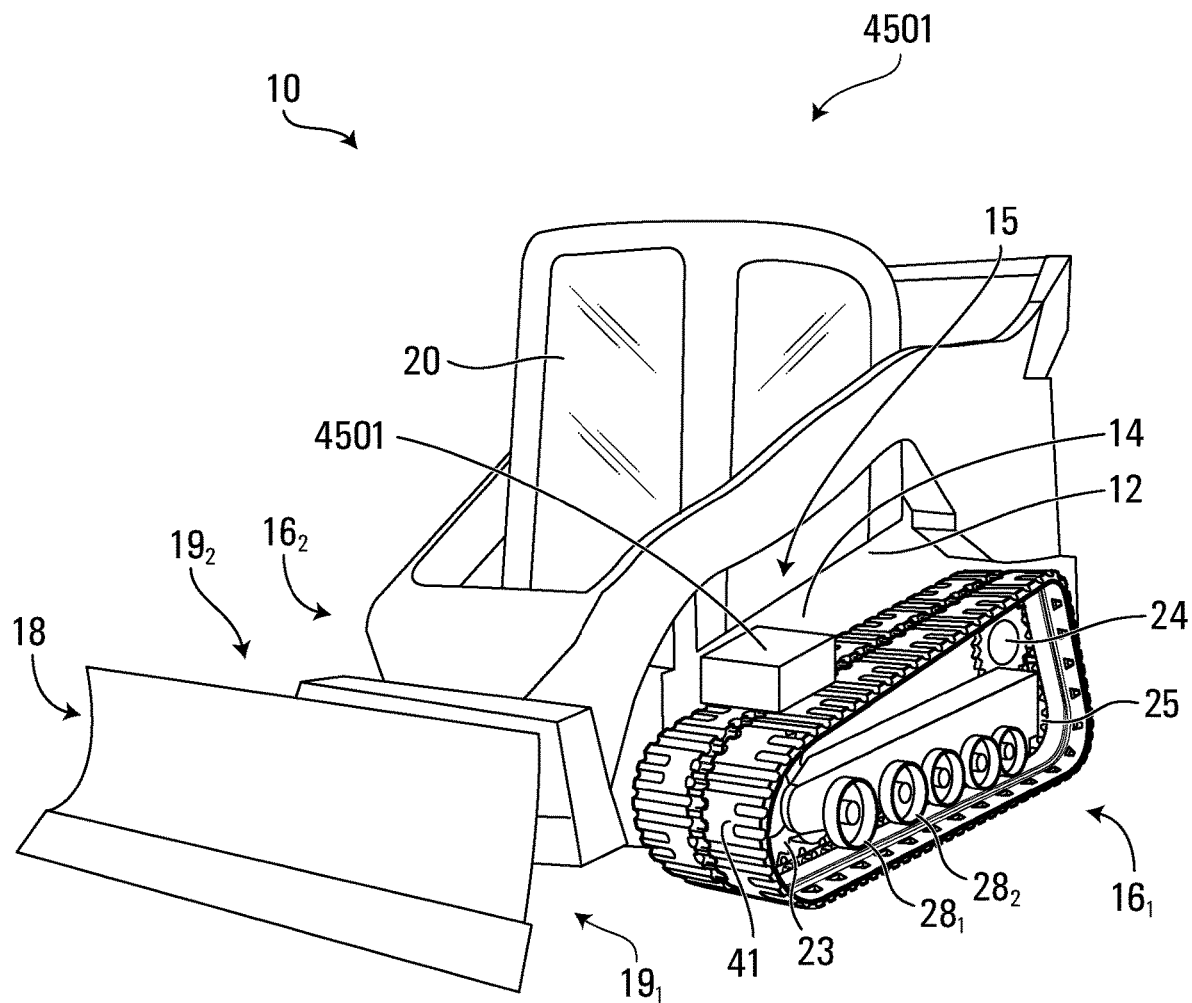
FIG. 45 shows an example of another embodiment of a vehicle-mounted imaging device for inspecting track systems.

In some embodiments, with additional reference to FIG. 45, in addition to or instead of the sensors $84_1$-$84_S$ of the track systems $16_1$, $16_2$, the monitoring system 82 may comprise a vehicle-mounted imaging device 4501 for inspecting the track systems $16_1$, $16_2$ of the vehicle 10. In particular, the monitoring system 82 may include one or more vehicle-mounted imaging devices 4501 for inspecting track systems 16$_1$, 16$_2$ of vehicles. In some embodiments, each track system 16$_1$ and 16$_2$ is provided with a vehicle-mounted imaging device 4501. In some embodiments, a plurality of vehicle-mounter imaging devices 4501 can be provided around the vehicle.

In some embodiments, the vehicle-mounted imaging device 4501 comprises a camera system arranged to capture images of the track system 16$_1$, 16$_2$ and its environment as the track 41 moves around the track-engaging assembly 21. The information generated by the camera system can then be optionally processed and analyzed locally or remotely. In some embodiments, the camera system generates image information for further processing by the image processor 505 of FIG. 50, as will be described in more detail below.

In some embodiments, the vehicle-mounted imaging device 4501 comprises an infrared imaging system configured to scan the track system 16$_1$, 16$_2$ and its environment as the track 41 moves around the track-engaging assembly 21. The information generated by the infrared imaging system can then be optionally processed and analyzed locally or remotely. In particular, images captured using imaging device 4501 can be sent to and processed by the image processor 505 of FIG. 50, as will be described in more detail below.

Figure 46:
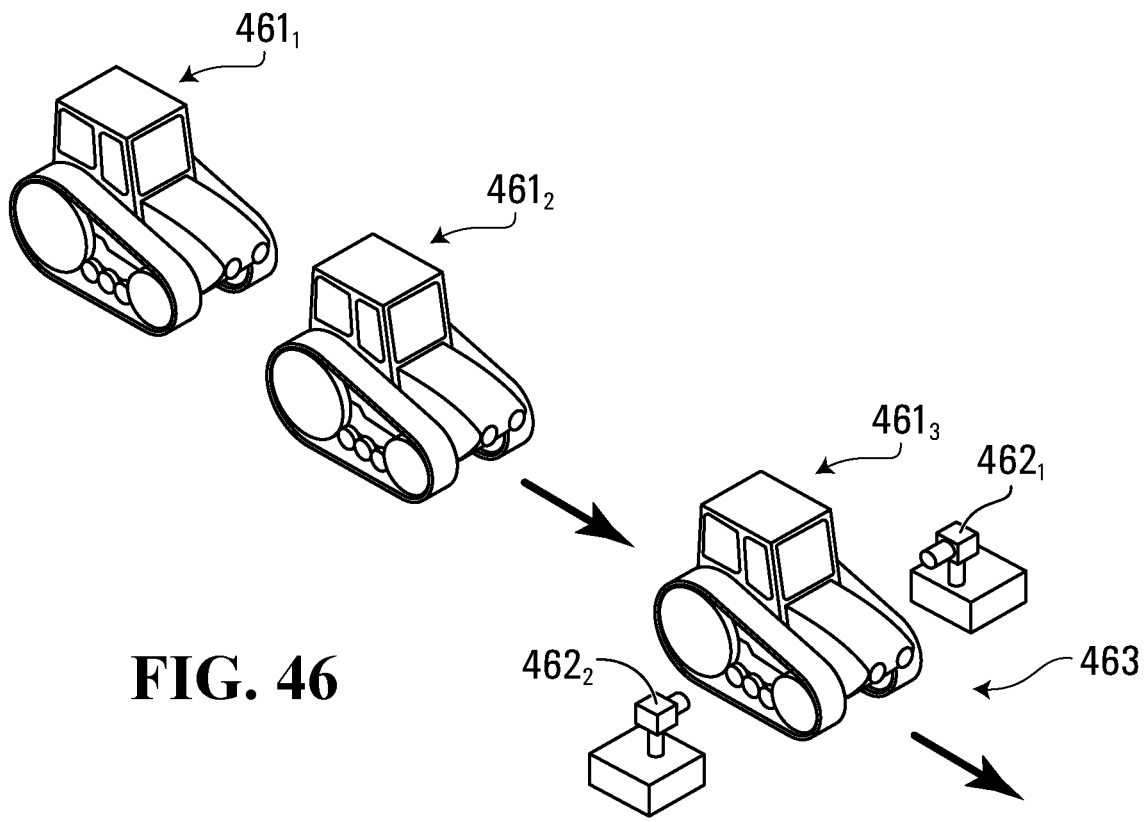
FIG. 46 shows an example of another embodiment an imaging station for inspecting track systems.
Figure 47:
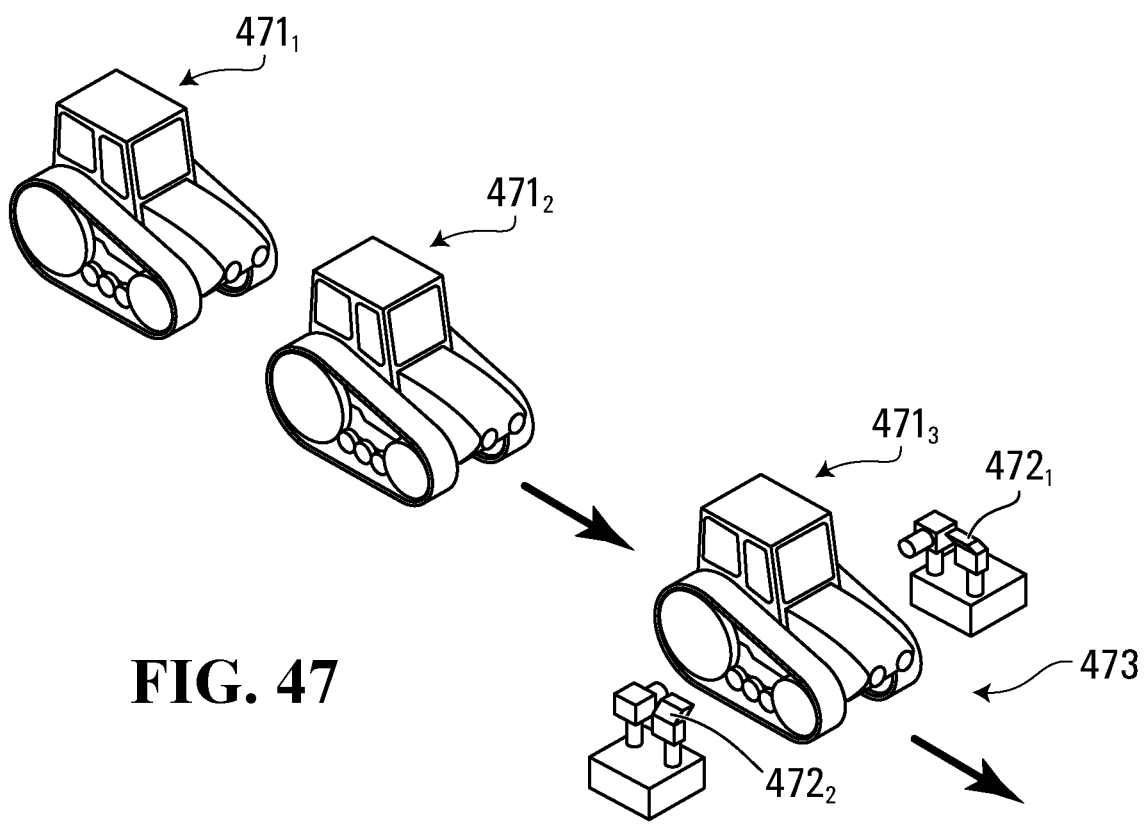
FIG. 47 shows another example of another embodiment of an imaging station for inspecting track systems.

In some embodiments, with additional reference to FIGS. 46 and 47, in addition to or instead of the sensors 84$_1$-84$_s$ of the track systems 16$_1$, 16$_2$, the monitoring system 82 may comprise an imaging station for inspecting vehicles such as the vehicle 10 when they are in proximity of the imaging station.

For example, in some embodiments, as shown in FIG. 46, the monitoring system 82 may include an imaging station 463 for inspecting track systems of vehicles 461$_x$. In some embodiments, the imaging station 463 comprises camera systems 462$_x$ arranged to capture images of each of the track systems 16$_1$, 16$_2$ and their environment. The captured images can then be optionally processed and analyzed locally or remotely. In particular, images captured using the imaging station 463 can be sent to and processed by the image processor 505 of FIG. 50, as will be described in more detail below. The camera systems 462$_x$ can include directional cameras having any configuration of lenses suitable for capturing images of the track systems 16$_1$, 16$_2$ and their environment.

In other embodiments, with additional reference to FIG. 47, the monitoring system 82 may include an infrared inspection station 473 for inspecting track systems of vehicles 471$_x$. In some embodiments, the inspection station 473 comprises an infrared camera system and/or a laser line scanner and/or laser area scanner systems 472$_x$ arranged to scan each of the track system 16$_1$, 16$_2$ and their environment as each vehicle 471$_x$ moves past the inspection station 473. The information generated by the infrared camera system, the laser line scanner and/or laser area scanner systems 472$_x$ can then be optionally processed and analyzed locally or remotely. In particular, information captured using the infrared camera system, the laser line scanner and/or laser area scanner systems 472$_x$ can be sent to and processed by the image processor 505 of FIG. 50, as will be described in more detail below.

Figure 48:
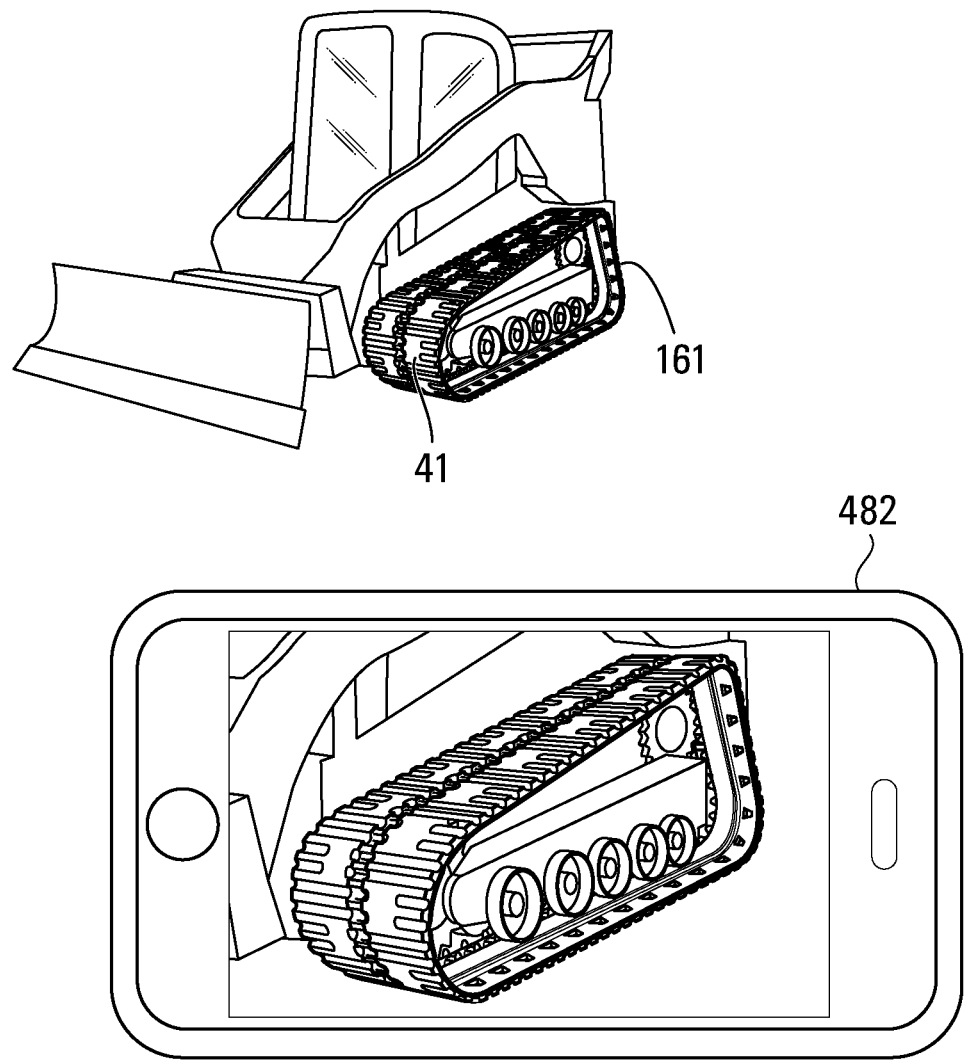
FIG. 48 shows an example of another embodiment of a mobile communication device having configured to capture images for inspecting track systems.

In some embodiments, with additional reference to FIG. 48, in addition to or instead of the sensors 84$_1$-84$_s$ of the track systems 16$_1$, 16$_2$, the monitoring system 82 may comprise a mobile image capture device 482 configured to allow a user to capture images of track systems 16$_1$, 16$_2$. The mobile image capture device 482 may also be configured to process the captured images locally or remotely. In some embodiments, the mobile image capture device 482 may be a smartphone or other mobile phone, a tablet, a smart watch, head-mounted display or other wearable device, or any other communication device that may be carried by the user. Moreover, the mobile image capture device 482 may be configured to communicate via short-range wireless link (e.g., Bluetooth) or a wired link (e.g., USB) or over a data network such as the Internet over a wired connection and/or a wireless connection (e.g., WiFi, WiMAX, cellular, etc.).

In some embodiments, an application ("app", i.e., software) may be installed on the mobile image capture device 482 to interact with the monitoring system 82 of the vehicle 10. In some embodiments, the application also interacts with the image processor 505 of FIG. 50, as will be described in more detail below.

For example, in some embodiments, such as where the mobile image capture device 482 is a smartphone, a tablet, a computer, etc., the user (e.g., the operator) may download the app from a repository (e.g., Apple's App Store, iTunes, Google Play, Android Market, etc.) or any other website onto the mobile image capture device 482. Upon activation of the app on the mobile image capture device 482, the user may access certain features relating to the monitoring system 82 of the vehicle 10 locally on the mobile image capture device 482. In addition, a data connection can be established over the Internet with the image processor 505 of FIG. 50, which executes a complementary server-side application interacting with the app on the mobile image capture device 482. For example, in some embodiments, the mobile image capture device 482 may be a smartphone of the operator of the vehicle 10, onto which an app to interact with the monitoring system 82 of the vehicle 10 has been installed (e.g., downloaded), and the app is configured to send image information to the image processor 505 for processing. In other embodiments, the mobile image capture device 482 performs the image processing (in full in or part) locally using its own computing resources.

In other embodiments, the mobile image capture device 482 does not make use of a dedicated app for communicating with the monitoring system 82 and/or the image processor 505. Instead, the image capture device 482 is simply configured to allow images to be captured, and subsequently sent to the image processor 505 via any suitable multipurpose data-communication means (e.g. any number of email protocols, File Transfer Protocol (FTP), Short Message Service (SMS), etc.).

Figure 49:
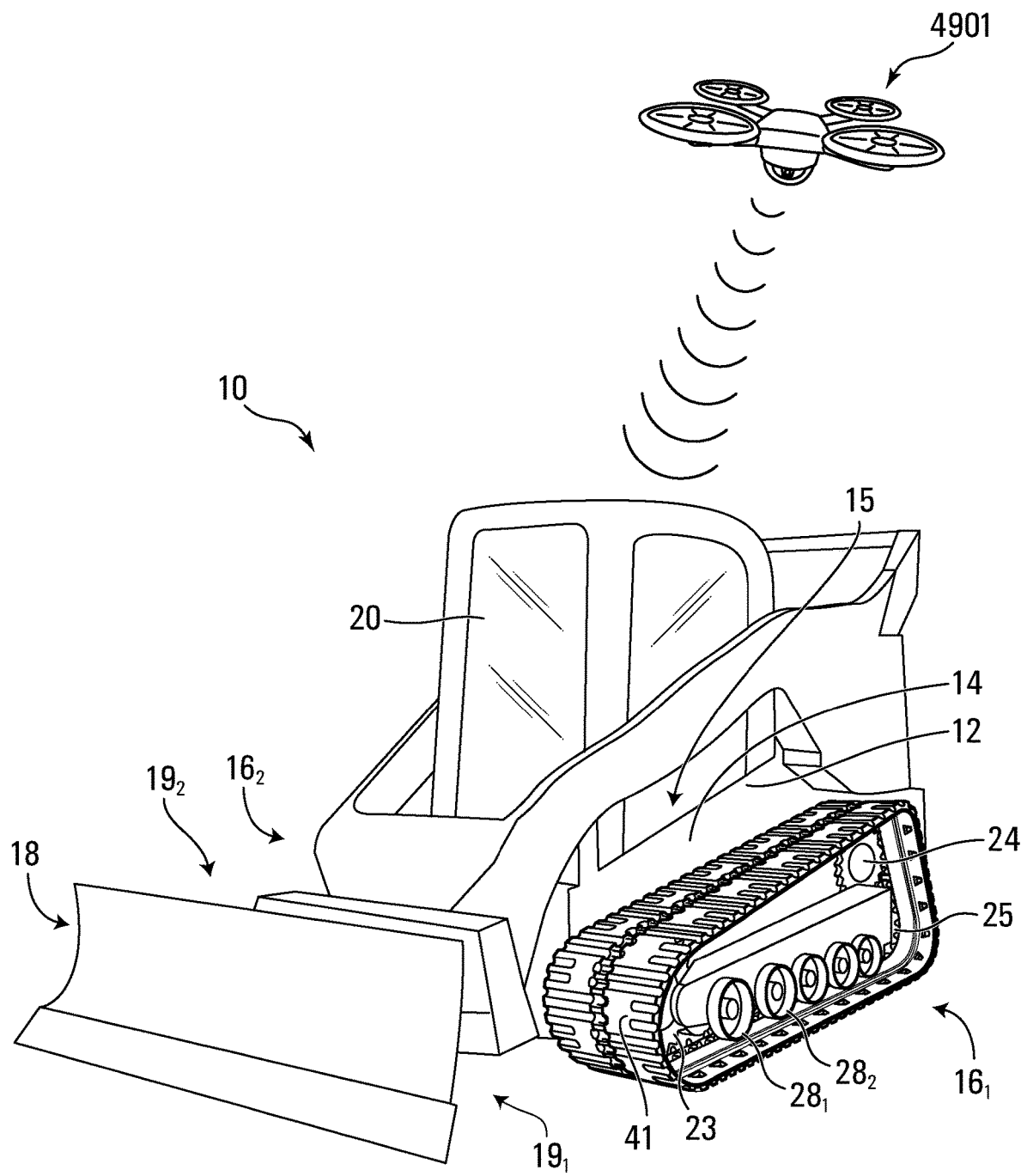
FIG. 49 shows an example of another embodiment of a drone device for inspecting the track system.

In some embodiments, with additional reference to FIG. 49, in addition to or instead of the sensors 84$_1$-84$_s$ of the track systems 16$_1$, 16$_2$, the monitoring system 82 may comprise a drone 4901 for inspecting the track 41 and/or other components of each of the track systems 16$_1$, 16$_2$ and/or their environment (e.g., detecting the presence of debris, etc.), so that images derived from the drone 4901 may be relayed to the operator of the vehicle 10 and/or another remote device or person. For example, the images captured using the drone 4901 can be sent to and processed by the image processor 505 of FIG. 50, as will be described in more detail below. In some embodiments, a plurality of drones 4901 can be provided.

In some embodiments, the drone 4901 is arranged to follow the vehicle 10, capture images of each of the track system 16$_1$, 16$_2$ and their environment. In other embodiments, the drone 4901 is equipped with an infrared camera for capturing images of the track system 16$_1$, 16$_2$ and their environment. Communication between the drone 4901 and the vehicle 10 (e.g., between the drone 4901 and the processing entity 88) can be provided for by any suitable means, including but not limited to any combination of Radio Frequency (RF) signals and/or Bluetooth signals.

In the example shown in FIG. 49, the drone 4901 is an aerial drone configured to fly about the vehicle 10. While the drone 4901 shown in FIG. 49 is a multi-rotor flying drone, other drones are possible, including, but not limited to, fixed-wing drones, or any other type of unmanned aerial vehicle. Also, in other embodiments, the drone 4901 may be a land drone configured to travel on the ground about the vehicle 10 (e.g., on wheels or on tracks).

Each of the image capture devices described with reference to FIGS. 45 to 49 can be combined with each other in any suitable way in order to provide embodiments comprising a plurality of different image capture devices.

Figure 50:
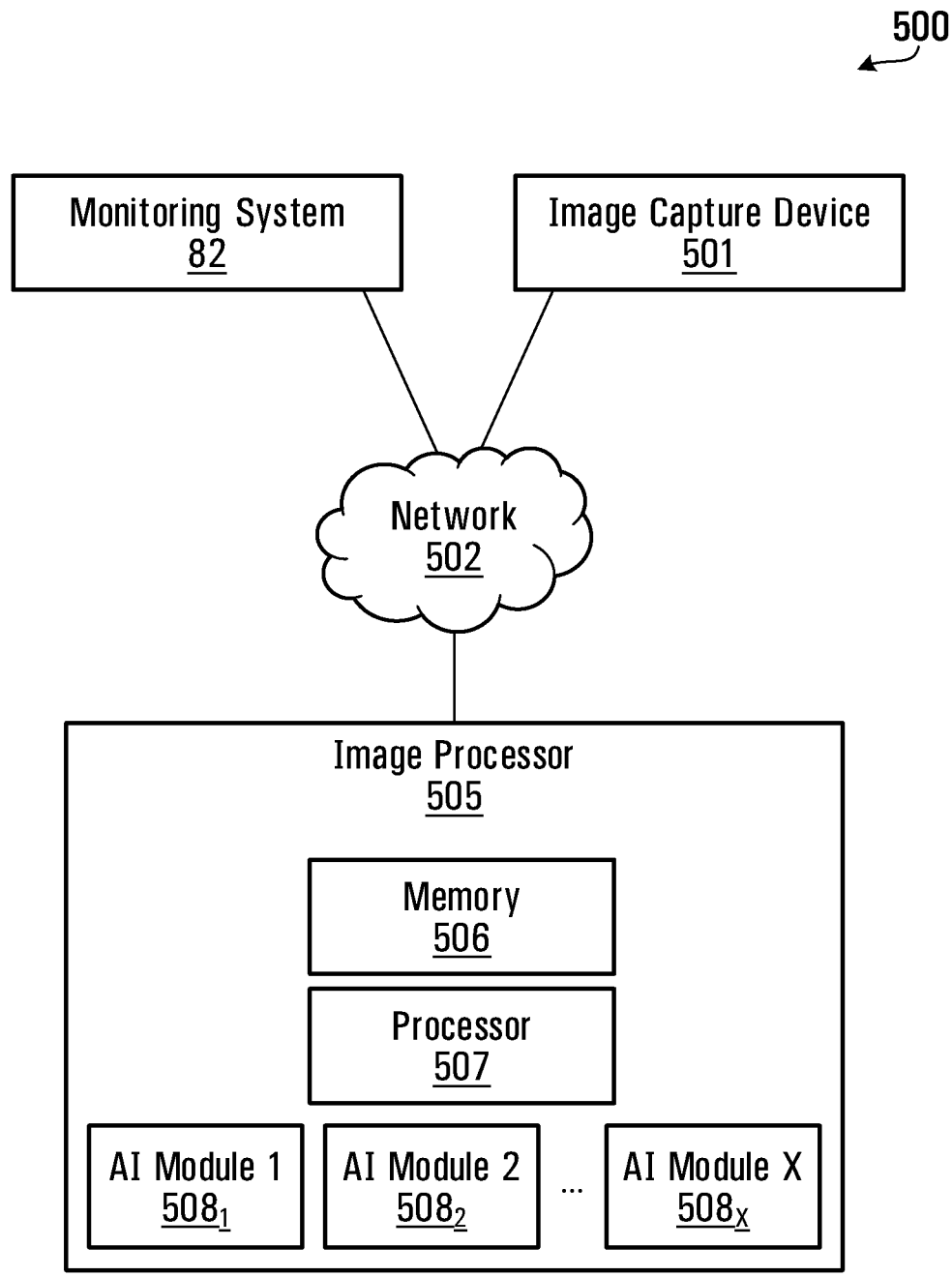
FIG. 50 shows an example of another embodiment of a functional block diagram of an image processing system for processing images captured with the image capture systems of FIGS. 45 to 49.

In some embodiments, and with reference to FIG. 50, the images captured by the image capture devices 501 described with reference to FIGS. 45 to 49 can be processed using the image processing system 500. For example, in some embodiments, the monitoring system 82 and/or an image capture device 501 may transmit image information relating to a track, through a communication network 502, to an image processor 505 over a communication link, which may be implemented over a cellular network, a WiFi network or other wireless LAN, a WiMAX network or other wireless WAN, etc.

In some embodiments, the image processor 505 can be an application running on a server. In other embodiments, the image processor 505 can be a dedicated network appliance. In the embodiment of FIG. 50, the image processor 505 comprises a memory 506 for storing image information and instructions for processing images, a processor 507, and a plurality of Artificial Intelligence (AI) modules $508_x$ for performing image recognition and pattern recognition in order to assess the level and nature of degradation and/or deterioration of the track 41 or other track system component.

In some embodiments, the AI modules $508_x$ are configured to assess a level of degradation and/or deterioration of the track 41 or other track system component. For example, an AI module $508_x$ can be configured to determine that the traction projections $61_1$-$61_M$ are deteriorated to 30% of the level of deterioration that would require replacement of the track. In some embodiments, the AI modules $508_x$ are configured to assess a nature of the deterioration of the track 41 or other track system component. For example, an AI module $508_x$ can be configured to determine that a midroller is damaged or missing.

In some embodiments, the AI modules $508_x$ are further configured to predict the cause of the degradation and/or deterioration of the track 41 or other track system component. In one specific example, an AI module $508_1$ is configured to predict whether a specific degradation pattern of the elastomeric material of a track 41 is caused by a misaligned drive wheel. In another specific example, an AI module $508_2$ is configured to predict whether a specific degradation pattern of the elastomeric material of a traction projections $61_1$-$61_M$ is caused by excessive roading (i.e. traversing a paved road). In another specific example, another AI module $508_3$ is configured to predict whether a specific deterioration pattern of the track (e.g. the abnormal relative position of two adjoining track links) is caused by a broken reinforcing cable $38_1$-$38_C$. As will be appreciated, each AI module $508_x$ can be implemented using a combination of deep learning, supervised or unsupervised machine learning, image recognition and/or machine vision.

Once the AI modules $508_x$ has determined the cause, level and/or nature of the degradation and/or deterioration of the track 41 or other track system component, the image processor 505 may send data relating to the cause, level and/or nature of the degradation and/or deterioration of the track 41 or other track system component back to monitoring system 82 and/or the image capture device 501 for further processing and/or notification to a user. By using this information and/or signals received from sensors $84_1$-$84_s$ of the track systems $16_1$, $16_2$, the monitoring system 82 may determine that an event arising from usage of a track system $16_i$, such as a usage threshold event (e.g. an amount of tread wear, an amount of time such as a number of hours the track 41 has been used), deterioration threshold event (e.g. the number of exposed reinforcing cables caused by chunking) and/or deterioration event (e.g. one or more severed reinforcing cables), has occurred.

Examples of further processing the information relating to the cause, level and/or nature of the degradation and/or deterioration of the track 41 or other track system component will now be described with reference to FIGS. 51 to 56. As will be appreciated, any feature of any embodiment discussed with reference to FIGS. 45 to 50 may be combined with any feature of any embodiment described with reference to FIGS. 51 to 56 in order to optimize vehicle downtime, track system component order/shipping times, vehicle maintenance scheduling, vehicle use schedules, vehicle dispatch schedules and dispatch locations and/or any other operational, logistical or organizational criteria relating to track system components, vehicles, fleets of vehicles, and/or maintenance facility operations.

Figure 51:
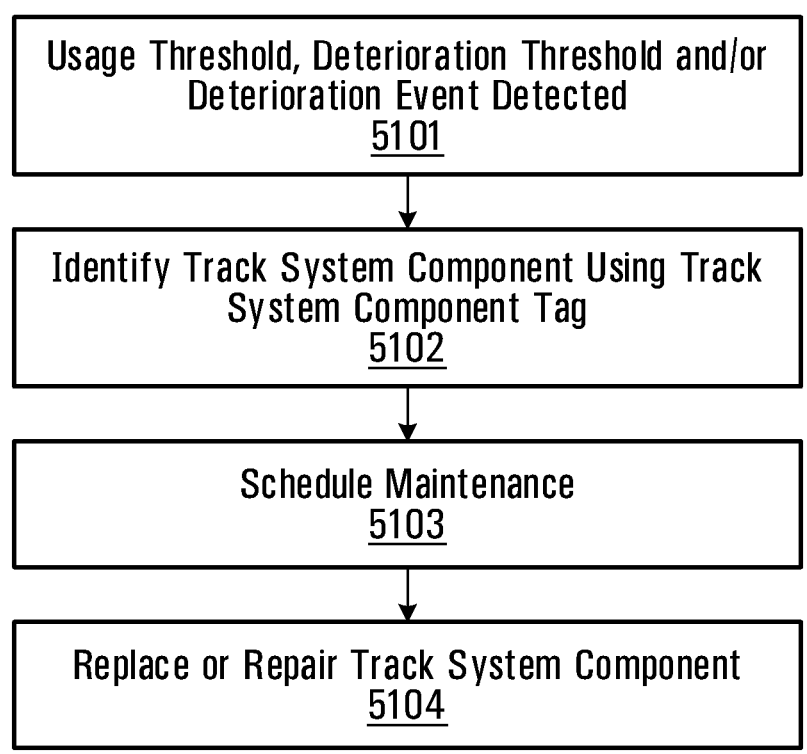
FIG. 51 shows a flow diagram of an embodiment of a method of repairing or replacing a track system component.

For example, with reference to FIG. 51, in some embodiments, the monitoring system 82 can be used in a rental market to monitor usage of track system components. At step 5101, the monitoring system 82 determines that an event arising from usage of a track system $16_x$, such as a usage threshold event (e.g. an amount of tread wear, an amount of time such as a number of hours the track 41 has been used), deterioration threshold event (e.g. the number of exposed reinforcing cables) and/or deterioration event (e.g. one or more severed reinforcing cables), has occurred. As described above, the monitoring system 82 can make these determinations by analysis of the signals produced by sensors $84_1$-$84_s$ of the track systems $16_1$, $16_2$ and/or by analysis of the images taken by the image capture devices described above with reference to FIGS. 45 to 49.

At step 5102, the monitoring system 82 identifies the track system component for which the usage threshold event, deterioration threshold event and/or deterioration event has occurred. In some embodiments, the track system component information and information relating to the usage threshold event, deterioration threshold event and/or deterioration event is conveyed to the operator of the vehicle by the monitoring system 82 in order to facilitate scheduling of track system component servicing and/or other maintenance.

Figure 54:
FIG. 54 shows an example of another embodiment of a schematic network diagram for a track monitoring and ordering system.

For example, the monitoring system 82 may issue a notification conveying this information to the operator via the user interface of the operator cabin 20 of the vehicle 10 and/or the communication device 130. In other embodiments, the monitoring system 82 conveys the track system component information and information relating to the usage threshold event, deterioration threshold event and/or deterioration event to an organization providing maintenance services. For example, as shown in FIG. 54, the monitoring system 82 may issue a notification conveying this information to a server 541 associated with the organization via a network 542 (e.g. which may be implemented by the Internet, a cellular connection, and/or any other network infrastructure). Once the information is received, the organization can schedule maintenance of the vehicle at step 5103, and subsequently replace or repair the track system component. Accordingly, track system component maintenance operations can be initiated and scheduled without the need for input from the vehicle operator.

Moreover, multiple sensors $84_1$-$84_s$ can be embedded in the elastomeric material of the traction projections $58_1$-$58_T$, the wheel-contacting projections $48_1$-$48_N$, and/or the carcass 36 of the track, at different depths, thereby providing a simple and inexpensive solution for monitoring the progression of track wear. Alternatively, the progression of track or track system component can be determined using the imaging systems described above. In the vehicle rental market, for example, this can allow a pay-per-use model, in which vehicle rental costs are not based on the length of the rental period, but rather at least partly on the amount of use (i.e. wear on the track) that is incurred during the rental period.

Figure 52:
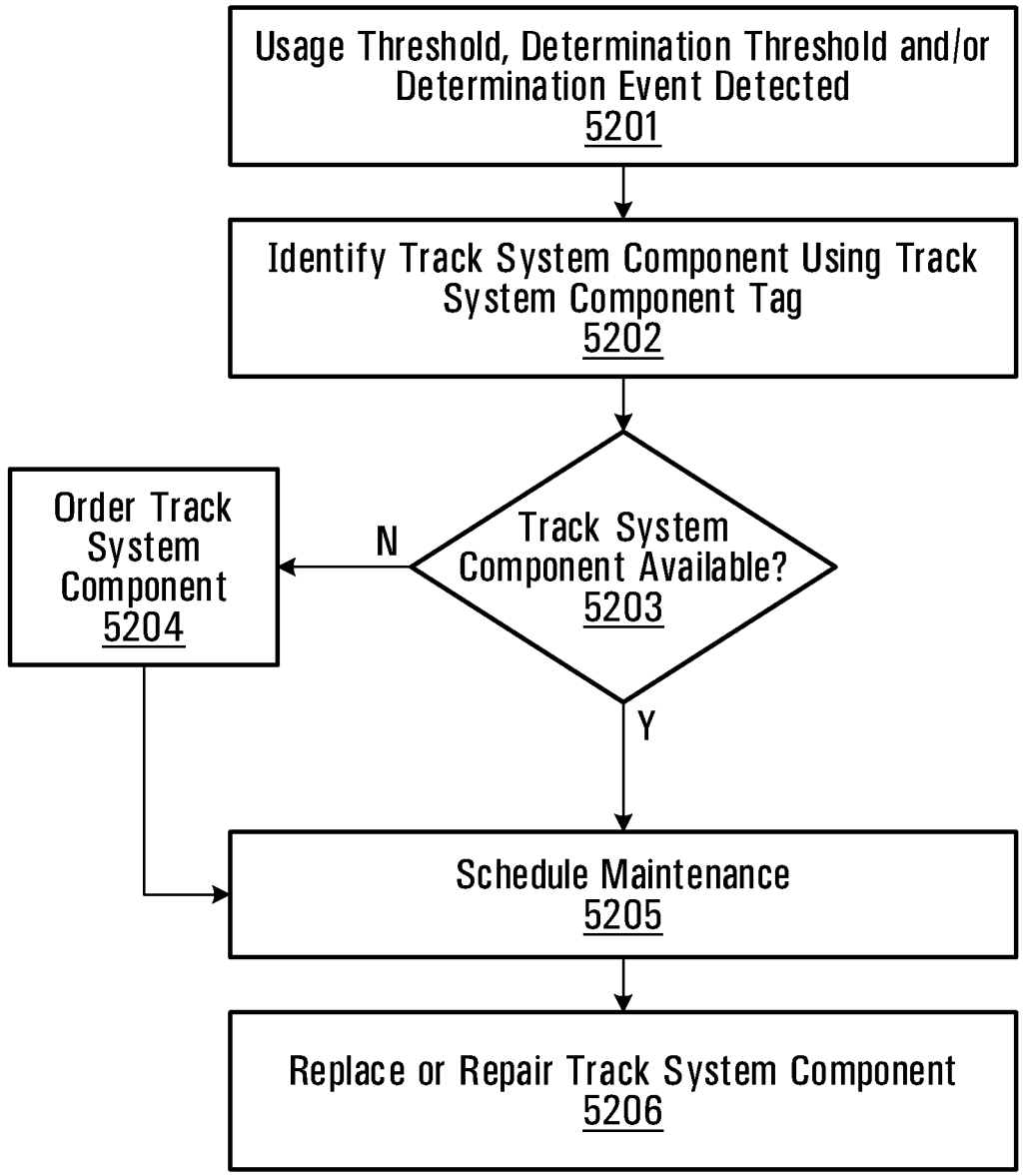
FIG. 52 shows a flow diagram of another embodiment of a method of repairing or replacing a track system component.

In some embodiments, and with reference to FIG. 52, the monitoring system 82 allows organizations managing large fleets (e.g. vehicle rental companies, construction companies, forestry companies, etc.) to ensure that maintenance operations can be scheduled and carried out effectively and efficiently. For example, by monitoring the wear of track system components, it is possible to more precisely predict when a track system component will fail and/or when a replacement track system component should be ordered and/or shipped.

Figure 55:
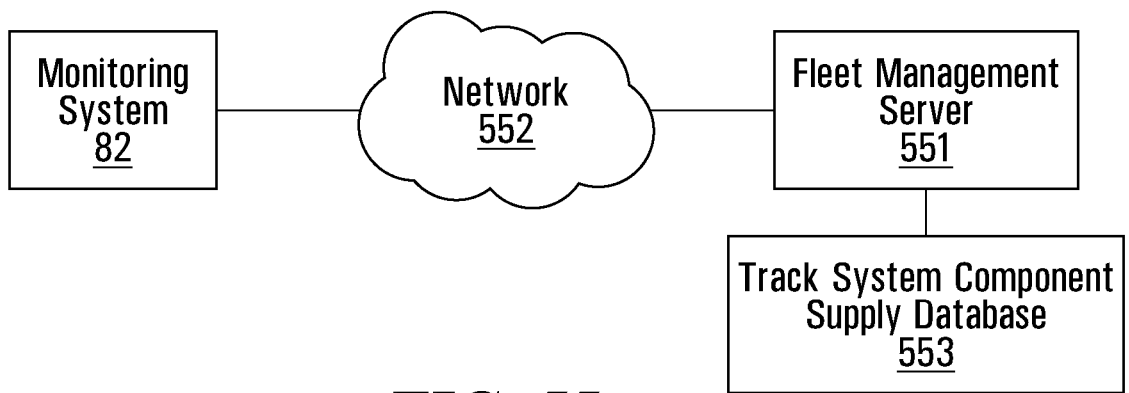
FIG. 55 shows an example of another embodiment of a schematic network diagram for a track monitoring fleet management system.

Moreover, for an organization managing a fleet of vehicles, knowing which vehicles will shortly require maintenance and/or replacement parts contributes to efficient and effective deployment of vehicles and maintenance resources. For example, at step 5201, the monitoring system 82 determines that an event arising from usage of a track system $16_x$, such as a usage threshold event (e.g. an amount of tread wear, an amount of time such as a number of hours the track 41 has been used), deterioration threshold event (e.g. the number of exposed reinforcing cables) and/or deterioration event (e.g. one or more snapped or broken reinforcing cables), has occurred. At step 5202, the monitoring system 82 identifies the track system component for which the usage threshold event, deterioration threshold event and/or deterioration event has occurred. In some embodiments, as shown in FIG. 55, the monitoring system 82 conveys the track system component information and information relating to the usage threshold event, deterioration threshold event and/or deterioration event to an automated fleet management system comprising a server 551. The monitoring system 82 may communicate with the server 551 of the automated fleet management system over a network 552 (e.g. which may be implemented by the Internet, a cellular connection, and/or any other network infrastructure). At step 5203, the server 551 of the automated feet management system queries a track system component supply database 553 to determine whether the identified track system component is available or needs to be ordered.

The track system component supply database can be managed by the fleet management system, or can be managed by a third-party track system component supplier. If the identified track system component is available, the vehicle can be scheduled for maintenance. If, on the other hand, the track system component is not available, the fleet management system can cause the track system component to be ordered at step 5204, before scheduling maintenance of the vehicle at step 5205.

In some embodiments, the scheduling of the vehicle maintenance is at least in part based on the estimated delivery time for an ordered track system component. In order embodiments, the dispatching of the vehicle relating to the identified track system component can, at least partially, be based on the scheduled maintenance. Finally, at step 5206, the maintenance operation is carried out and the track system component is replaced or repaired.

Figure 53:
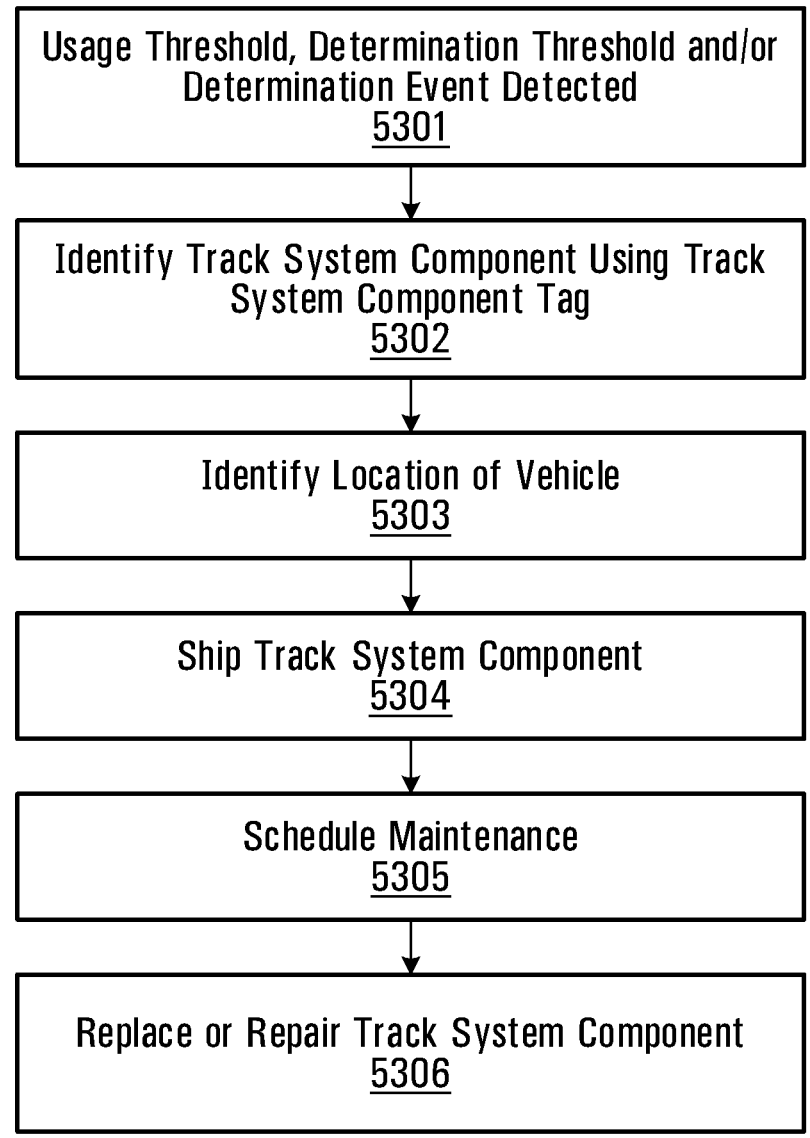
FIG. 53 shows a flow diagram of yet another embodiment of a method of repairing or replacing a track system component.

In some embodiments, as shown in FIG. 53, the monitoring system 82 allows organizations to provide track-as-a-service type payment/usage models, in which tracks are not purchased, but are rather provided as a service to vehicle operators in exchange for a subscription fee. For example, for a monthly fee, an organization could provide vehicle operators with tracks, as well as the monitoring system 82 which will allow the organization to ensure that the vehicle operator is never without an operable/functional track, regardless of how much and how (i.e. under what circumstances) the vehicle operator uses the track.

This can lead to significant savings in term of vehicle downtime and logistics. For example, at step 5301, the monitoring system 82 determines that an event arising from usage of a track system $16_x$, such as a usage threshold event (e.g. an amount of tread wear, an amount of time such as a number of hours the track 41 has been used), deterioration threshold event (e.g. the number of exposed reinforcing cables) and/or deterioration event (e.g. one or more severed reinforcing cables), has occurred. At step 5302, the monitoring system 82 identifies the track system component for which the usage threshold event, deterioration threshold event and/or deterioration event has occurred. At step 5303, vehicle location information relating to the geographic location of the vehicle is determined. This can be achieved by any suitable means including, but not limited to, Global Positioning System (GPS) receivers. In some embodiment, the monitoring system 82 conveys the track system component information, vehicle location information and information relating to the usage threshold event, deterioration threshold event and/or deterioration event to the track-as-a-service organization.

Figure 56:
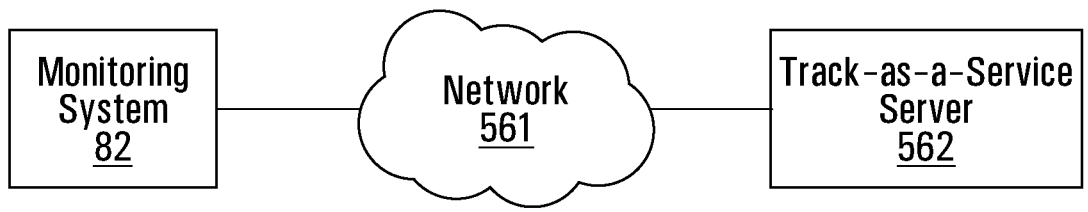
FIG. 56 shows an example of another embodiment of a schematic network diagram for a track monitoring and track-as-a-service system.

As shown in FIG. 56, the monitoring system 82 may communicate with the server 562 of the track-as-a-service organization over a network 561 (e.g. which may be implemented by the Internet, a cellular connection, and/or any other network infrastructure). Then, at step 5304, the track-as-a-service organization ships a replacement track system component to a location related to the geographic location of the vehicle. For example, the track-as-a-service location could ship the replacement track system component to the nearest maintenance service dispatch location or third party maintenance organization. At step 5305, the track-as-a-service organization can schedule a maintenance of the track system. In some embodiments, the track-as-a-service organization schedules a third party mobile maintenance team to perform onsite maintenance based on the geographic location of the vehicle. Finally, at step 5306, the track-as-a-service organization, or an agent thereof, replaces the track system component. In some embodiments, this can be performed onsite, based at least in part on the vehicle location information received from the track-as-a-service organization.

b. Heat Monitoring

Some embodiments may use the above imaging system (e.g. an infrared imaging system, or other suitable imaging system) to measure heat generated at different locations on a track 41 and/or track system $16_i$. The imaging system can be placed in the track system $16_i$, on the vehicle 10, or in the track 41 in order to monitor heat generated by components of the track system 16$_i$ and/or components of the track 41.

c. On-the-go Field Mapping i. Smart Camera System to Evaluate Plant Size and Generate a Map Some embodiments may use an imaging system and image processor to collect and evaluate plant size/type/colour information in situ, and to generate a plant size/type/colour map of a field. The imaging system can comprise a Light Detection and Raging (LIDAR) system, and/or an optical system for performing spectral analysis of the plants' colours, and can be placed on the track system 16$_i$ and/or the vehicle 10. The image processor can also perform pattern recognition of leaf and stem types and patterns using data received from the optical system. The resulting map and/or plant size/type/colour information can be passed through a classifier to recommend appropriate farming implements, irrigation patterns, fertilizers, pesticides, herbicides and/or fungicides. Data from multiple imaging systems can be combined to produce aggregate area maps.

ii. Pressure Sensing in Track to Map Soil Compaction

Some embodiments may use at least one pressure sensor 84$_1$-84$_S$ in a track 41 of a vehicle, or information derived from the above-described imaging systems, to measure soil compaction and send soil compaction information to the processing entity 88 for generation of a map of soil compaction over a traversed area. The processing entity 88 can be located in the vehicle 10, or can be located remotely. The map can be generated for viewing by a user of the vehicle 10 and/or transmitted to another location for viewing. The resulting map and/or soil compaction information can be passed through a classifier to recommend appropriate farming implements, irrigation patterns, fertilizers, pesticides, herbicides and/or fungicides. Data from multiple sensors 84$_1$-84$_S$ in multiple vehicles can be combined to produce aggregate area maps.

Figure 60:
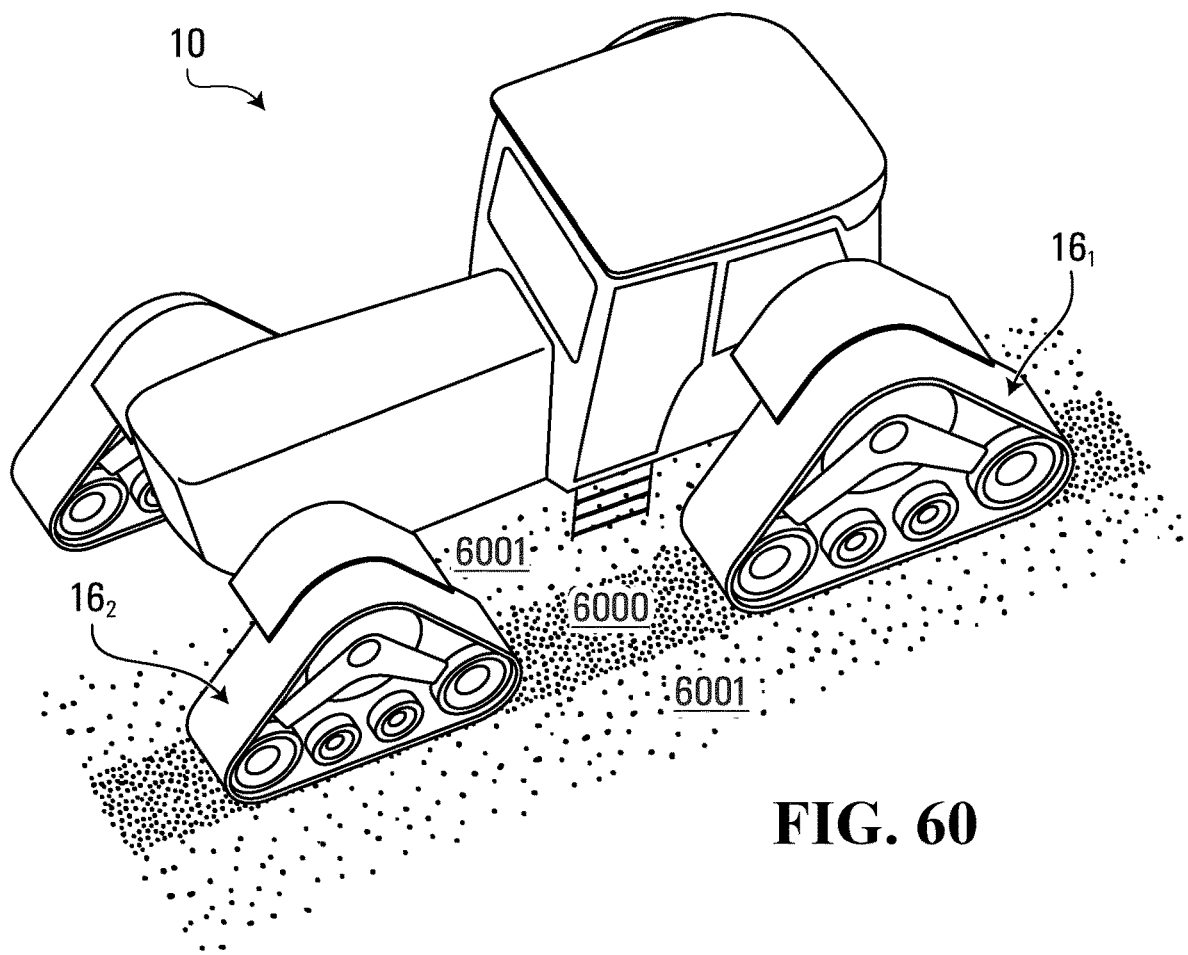
FIG. 60 shows an example of another embodiment of a tracked vehicle traversing a row of compacted soil.
Figure 61:
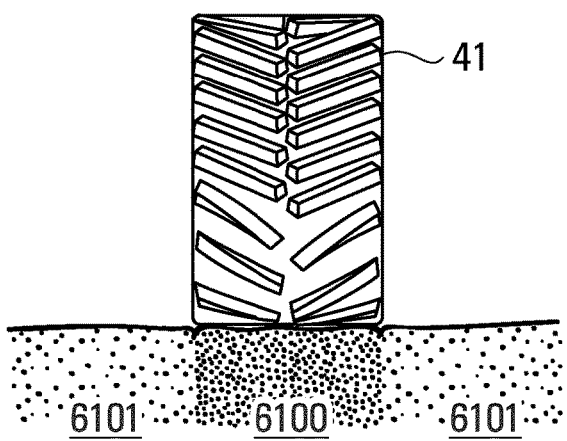
FIG. 61 shows another view of a track of the tracked vehicle of FIG. 60.

In some embodiments, and with particular reference to FIGS. 60 to 64, the monitoring system 82 can be configured to detect when a track 41 of the vehicle 10 is straddling the edge of a row of compacted ground being traversed by the track 41 (referred to herein as a row edge straddling condition). When a tracked vehicle 10 traverses a field, rows appear where the tracks 41 have passed. In order to avoid unnecessary damage to crops (in the case of an agricultural vehicle 10), operators typically try to traverse the field using preexisting rows. As shown in FIG. 60, over time, the ground 6000 under which the tracks of the tracked vehicle 10 repeatedly traverse, becomes compacted.

Figure 62:
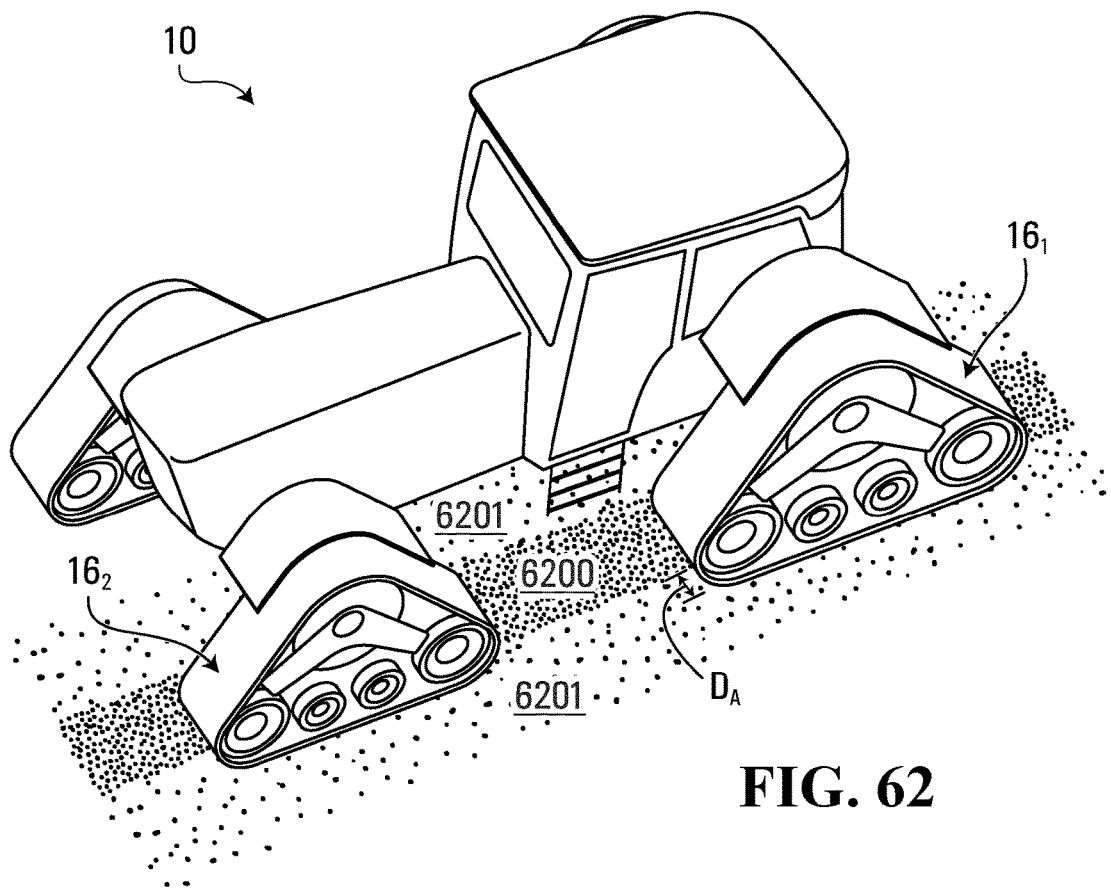
FIG. 62 shows an example of another embodiment of a tracked vehicle partially traversing a row of compacted soil.
Figure 63:
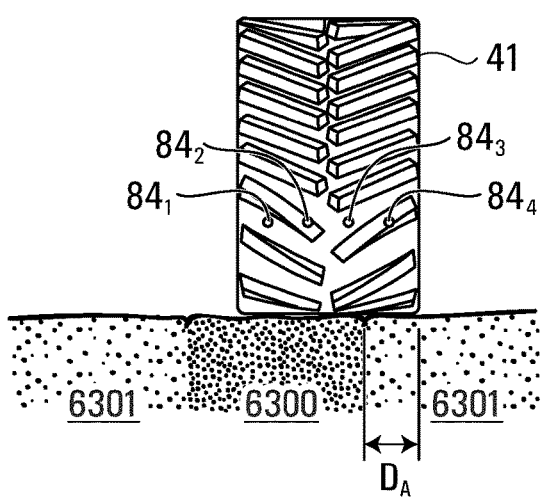
FIG. 63 shows an example of another embodiment of a sensor array configured to detect when the track of a tracked vehicle is only partially traversing a row of compacted soil.
Figure 64:
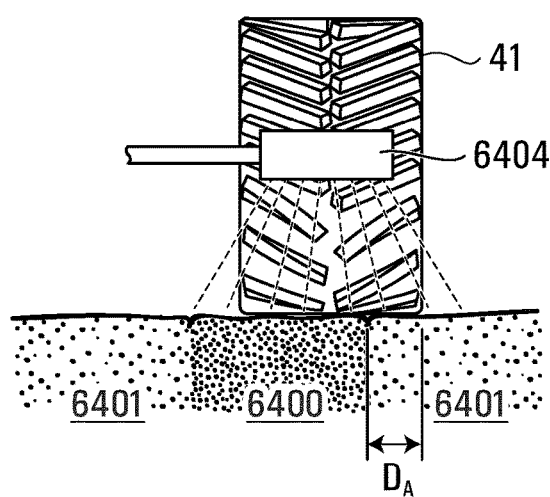
FIG. 64 shows an example of another embodiment of an imaging system configured to detect when the track of a tracked vehicle is only partially traversing a row of compacted soil.

When in a row edge straddling condition, as shown in FIGS. 62 to 64, a portion of the track 41 traverses a compacted row 6200, and another portion of the track traverses a softer non-compacted portion 6201 of the ground. This can results in an enlargement of the row, and ultimately in unnecessary damage to crops. As shown in FIGS. 62 to 64, a misalignment between the trajectory of the track 41 and the compacted row 6200 can result in a widening of the compacted row 6200 by a specific distance D$_A$. It is therefore advantageous to detect this condition in order to avoid it or to minimize the amount of time that the track is used in this condition.

In some embodiments, and with reference to FIG. 64, the vehicle is equipped with an image capture device 6404 configured to acquire images of the area around which the track 41 is positioned in order to allow the monitoring system 82 to detect whether the track 41 is in a row edge straddling condition. For example, images of the ground surrounding the track 41 may be analyzed by the image processing system 500 of FIG. 50 (or by monitoring system 82 itself) and a determination may be made as to whether the track 41 is in a row edge straddling condition, or may be approaching a row edge straddling condition. Various aspects of the surfaces 6400 and 6401, such as colour, brightness, texture, etc. can be compared and analyzed in order to determine whether the track 41 is in a row edge straddling condition and by what distance D$_A$ the track 41 is misaligned with compacted row 6400.

In another embodiment, and with reference to FIG. 63, a plurality of sensors 84$_1$, 84$_2$, 84$_3$, 84$_4$ may be used by the monitoring system 82 to determine whether the track 41 is in a row edge straddling condition. For example, when the track 41 is in the row edge straddling condition shown in FIG. 63, the pressure and/or temperature sensed by sensors 84$_1$, 84$_2$ and 84$_3$ will be higher than the pressure and/or temperature sensed by sensors 84$_4$, because of the relative hardness of the ground at 6300 and the relative softness of the ground at 6301. This discrepancy may allow the monitoring system 82 to determine whether the track 41 is in a row edge straddling condition and by approximately what distance D$_A$ the track 41 is misaligned with compacted row 6300.

Figure 66:
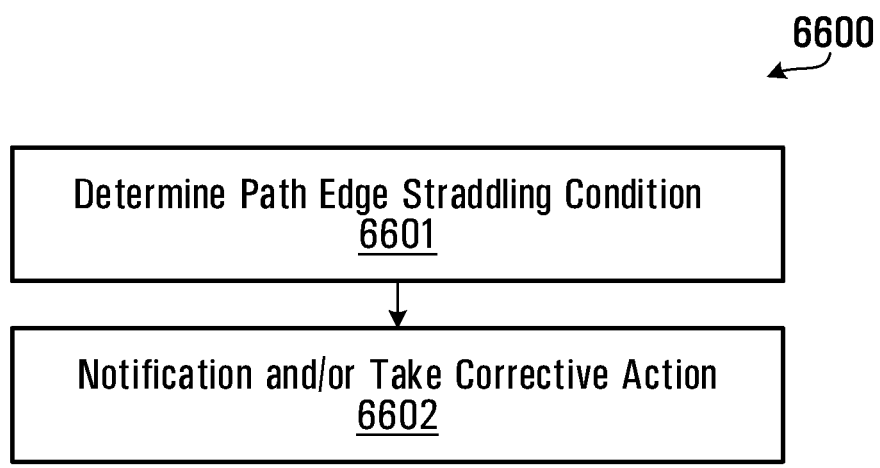
FIG. 66 shows an example of another embodiment of a flow diagram of a method of addressing a situation in which the track of a tracked vehicle is only partially traversing a row of compacted soil.

In some embodiments, and with reference to FIG. 66, when the monitoring system 82 determines that the track 41 is in a row edge straddling condition, at step 6601, as described above, it may then notify the operator of the vehicle of the row edge straddling condition and/or issue a signal that can be used to control the direction of the vehicle 10 in order to remove the track 41 from the row edge straddling condition at step 6602. Notifying the operator of the vehicle can be implemented in accordance with any of the embodiments described herein.

iii. Moisture Sensor in Tread to Map Top Soil Moisture

Some embodiments may use at least one moisture sensor 84$_x$ in a track of a vehicle, or information derived from the above-described imaging systems, to measure soil moisture and send soil moisture information to a processing entity 88 for generation of a map of soil moisture over a traversed area. The data processor can be located in the vehicle 10, or can be located remotely. The map can be generated for viewing by a user of the vehicle 10 and/or transmitted to another location for viewing. Data from multiple sensors 84$_1$-84$_S$ in multiple vehicles can be combined to produce aggregate area maps. Moreover, some sensors 84$_1$-84$_S$ can be moisture sensors and some sensors 84$_1$-84$_S$ can be pressure sensors. Thus, information from the above mentioned pressure sensors 84$_1$-84$_S$ can be combined with information from the moisture sensors 84$_1$-84$_S$ to make further determinations, such as when a track moisture sensor 84$_x$ is and is not in contact with the ground based on information received from the pressure sensors 84$_1$-84$_S$.

3. Health Monitoring a. Connected Maintenance i. Maintenance Related Signals

1. Prevent Damage

Some embodiments may process signals from temperature, pressure, chemical sensors 84$_1$-84$_S$ located in the track system 16$_i$ and tracks 41, or information derived from the above-described imaging systems, to control the operation of a vehicle 10 in order to prevent or mitigate damage to the track 41 and/or the track system 16$_i$. For example, temperature sensor signals can be used by a processing entity 88 in order to limit the speed at which a vehicle 10 can be driven.

2. Enhance Service

Some embodiments may process signals from temperature, pressure and or chemical sensors 84$_1$-84$_S$ located in the track system $16_i$ and/or tracks 41, or information derived from the above-described imaging systems, to inform actions taken by a service department or service provider in relation to maintenance of the track system $16_i$ and/or track 41. For example, a maintenance service provider can be deployed based on the likelihood of damage to a track system $16_i$ or track 41, which likelihood being based on temperature, pressure and/or chemical sensor signals generated by respective temperature, pressure and/or chemical sensors $84_1$-$84_S$ in the track system $16_i$ and/or track 41.

ii. Warranty

1. Usage Related Signals (Speed, Load, Etc.) to Reduce Warranty Exposure

Some embodiments may collect and process signals from temperature, pressure and/or chemical sensors $84_1$-$84_S$ located in the track system $16_i$ and/or tracks 41, or information derived from the above-described imaging systems, to determine usage statistics, specifically for the purpose of assessing warranty exposure based on usage statistics.

2. Detect Abuse

Some embodiments may collect and process signals from temperature, pressure and/or chemical sensors $84_1$-$84_S$ located in the track system $16_i$ and/or tracks 41, or information derived from the above-described imaging systems, to determine whether usage is outside the scope set out in a warranty agreement.

iii. System Integrity

1. Tread Bar/Drive Lug Count

Some embodiments may collect and process signals from temperature, pressure and/or chemical sensors $84x$ located in the track system $16_i$ and/or tracks 41, or information derived from the above-described imaging systems, to monitor tread bar and drive lug counts. A sensor $84_x$ can, for example, be imbedded into each tread bar and each drive lug in order to detect its presence.

iv. Debris Assessment Tool

Some embodiments may collect and process signals from temperature, pressure and/or chemical sensors $84_1$-$84_S$ located in the track system $16_i$ and/or tracks 41, or information derived from the above-described imaging systems, to detect the presence of debris in the track system $16_i$ and/or tracks 41 of a vehicle 10.

v. Cost Control

Some embodiments may collect and process signals from temperature, pressure and/or chemical sensors $84_1$-$84_S$ located in the track system $16_i$ and/or tracks 41, or information derived from the above-described imaging systems, to calculate the likelihood of track failure leading to vehicle inoperability, with a view to minimizing vehicle downtime and/or unnecessary replacement.

b. Sensing Components i. Axle

1. Load/Ballast

Some embodiments may collect and process signals received from pressure and/or strain sensors $84_1$-$84_S$ in an axle to determine whether the load placed on an axle is within specified parameters, and taking action based in this determination. Examples of actions taken include notifying a driver of the vehicle 10 that a specific axle load has been reached or exceeded and disabling certain vehicle functions when the load is outside specified parameters. Another example is increasing the rear ballast in a situation in which the front axle is under an amount of pressure that is above a certain threshold caused by use of a specific implement (e.g. a front end loader).

2. Pressure

Some embodiments may collect and process signals received from pressure and/or strain sensors $84_1$-$84_S$ in an axle to determine whether the local pressure applied to a given section of the axle is within specified parameters, and taking action based in this determination. Examples of actions taken include notifying a driver of the vehicle that a section of the axle is under a given pressure and disabling certain vehicle functions when a section of the axle is determined to be outside specified parameters.

3. Temperature

Some embodiments may collect and process signals received from temperature sensors $84_1$-$84_S$ in an axle to determine whether the axle is within specified temperature parameters, and taking action based in this determination. Examples of actions taken include notifying a driver of the vehicle that a specific axle temperature has been reached or exceeded and disabling certain vehicle functions when the temperature of the axle is outside specified parameters.

4. Feedback for Safety

Some embodiments may use load/ballast, pressure and/or temperature sensors $84_1$-$84_S$ to generate signals that can be used by the processing entity 88 to determine whether a vehicle 10 is operating within safe parameters (e.g. speed, load, load balance). Advantageously, signals from multiple sensors $84x$ and multiple types of sensors can be combined to make further determinations. Disabling functional aspects of a vehicle 10 and/or changing operational characteristics of the vehicle 10 based on the determination.

5. Preventive Maintenance

Some embodiments may use load/ballast, pressure and/or temperature sensors $84_1$-$84_S$ to generate signals that can be used by the processing entity 88 to predict when an axle may need maintenance and/or replacement, as described above. This information can be provided to the vehicle operator and/or the vehicle owner, as well as to maintenance and/or parts suppliers, as described above.

6. Axle Loading→Misalignment or Debris Build-Up

Some embodiments may use load/ballast, pressure and/or temperature sensors $84_1$-$84_S$ to generate signals that can be used by the processing entity 88 to determine whether the axle load is distributed appropriately. Further processing of the signals can be performed to determine whether an axle which is not loaded evenly is so because of track 41 misalignment or because of debris that has built up in the track system $16_i$.

ii. Track

1. Smart Tread Wear a. Cloud Communication to User/Dealer to Plan Replacement

Some embodiments may use pressure, temperature, chemical and/or strain/pressure sensors $84_1$-$84_S$ in the tread of a track 41, or information derived from the above-described imaging systems, to determine tread wear. Signals from sensors could be received and processed locally or remotely, with determination of wear being communicated to a user and/or to replacement parts supplier to anticipate replacement of the track, as described above. Location information of the vehicle can also be provided to the user and/or replacement parts supplier in order to facilitate repair/replacement, as described above.

b. Tread Wear from Component Acceleration Signature

Some embodiments may use acceleration sensors $84_1$-$84_S$ in various elements of the track system that engage with the track in order to measure their acceleration as they engage with individual tread bars. Tread wear can be identified by the presence of differences in the acceleration signature of the elements for engagement with different tread bars.

c. Tread Wear from Belt 1st Mode Shift in Frequency

Some embodiments may use acceleration sensors $84_1$-$84_S$ in an element of a track or track system in order to identify and monitor the element's resonant frequency. As the mass of the element decreases because of wear, its resonant frequency changes. By processing the signals received from the acceleration sensor $84_x$ over time, the presence of and amount of wear can be determined.

2. Soil Pressure Sensing

Some embodiments may use at least one pressure sensor $84_x$ in a track, or information derived from the above-described imaging systems, to measure soil compaction and send soil compaction information to a processing entity 88 for determination of soil compaction over a traversed area. The processing entity 88 can be located in the vehicle 10, or can be located remotely. A map can be generated for viewing by a user of the vehicle and/or transmitted to another location for viewing. The resulting map and/or soil compaction information can be passed through a classifier to recommend appropriate farming implements and/or irrigation patterns.

3. Soil Indicator a. Contact Surface for Soil Indication (Touch or not Between Tread Bars to Assess Hard or Soft Soil)

Some embodiments may use pressure, moisture or other sensors $84_1$-$84_S$ located in the carcass 36, between tread bars, in order to determine the hardness of the soil. In one example, the sensors are arranged to detect whether the carcass 36 between two tread bars makes contact with the ground. If, for example, the carcass 36 between two tread bars touch the ground, it is determined that the track is on relatively soft soil. If, on the other hand, the carcass 36 between two tread bars does not touch the ground, it is determined that the track is on a relatively hard surface.

4. Soil Moisture Sensing

Some embodiments may use at least one moisture sensor $84_x$ (e.g. hygrometer) in a track 41 to measure soil moisture and send soil moisture information to a processing entity 88 for determination of soil moisture over a traversed area. The processing entity 88 can be located in the vehicle 10, or can be located remotely. The map can be generated for viewing by a user of the vehicle 10 and/or transmitted to another location for viewing.

5. Tread Temperature Sensing

Monitoring the temperature in one or more locations of the tread using embedded temperature sensors $84_1$-$84_S$.

iii. Rollers

1. Heat Sensors on Rollers to Detect Misalignment

Some embodiments may use temperature sensors $84_1$-$84_S$ in the track system rollers in order to detect misalignment of the tracks 41. The signals from the temperature sensors $84_1$-$84_S$ could be used to automatically limit the speed of the vehicle 10 and/or to increase/decrease the tension of the track 41 (by way of, for example, the tensioner of the track system) in order to correct misalignment of the track 41.

2. PU/Rubber Temperature to Prevent Damage

Some embodiments may collect and process signals from temperature, pressure, chemical sensors $84_1$-$84_S$ located in the polyurethane layer or rubber layer of track system rollers to assess damage to the roller and/or to control the operation of a vehicle 10 in order to prevent or mitigate damage to the roller. For example, a temperature sensor signals can be used by a processing entity 88 in order to limit the speed at which a vehicle 10 can be driven.

3. Midroller Radial Acceleration Signature for Soil and/or Track Condition

Some embodiments may use signals received from acceleration sensors $84_1$-$84_S$ in the midrollers of the track system $16_i$ in order to measure their radial acceleration as they engage with the track 41. Tread wear can be identified by the change of the midrollers acceleration signature over time. The radial acceleration signatures of the midrollers can also be used to determine the relative density of the soil.

iv. Under Carriage

1. Wrong Implement Warning

Some embodiments may use temperature, acceleration and/or strain/pressure sensors $84_1$-$84_S$ in the track 41 and/or track system $16_i$ to determine whether the correct implement is being used for a particular vehicle 10, based on whether the track system $16_i$ and/or track 41 is operating within predefined temperature, acceleration, and/or strain/pressure parameters.

2. Total Corner Load

Some embodiments may use temperature, acceleration and/or strain/pressure sensors $84_1$-$84_S$ in the track 41 and/or track system $16_i$ to determine whether the vehicle 10 is bearing a corner load (i.e. a left-hand/right-hand imbalanced front or rear load) which is outside certain parameters, and therefore placing excessive pressure/strain on the axle and/or under carriage.

3. Ballast Monitoring

Some embodiments may use temperature, acceleration and/or strain/pressure sensors $84_1$-$84_S$ in the track 41 and/or track system $16_i$ to determine the suitability of a specific vehicle ballast in keeping axle or under carriage pressure/strain within specific parameters.

v. Power Transmission

1. Drive Lug Protected from Overload with Sensor Signal

Some embodiments may collect and process signals from temperature, pressure, chemical sensors $84_1$-$84_S$ located in the drive lugs of a track to assess damage to the drive lug and/or to control the operation of a vehicle 10 in order to prevent or mitigate damage to the drive lugs. For example, a temperature sensor signal can be used by a processing entity 88 in order to limit operation of the vehicle 10 when one or more drive lugs are determined to be overloaded.

2. Autonomous, On-Board Slip on Ground Measuring Device

Some embodiments may collect and process signals from temperature, pressure, chemical sensors $84_1$-$84_S$ located in the track 41 to determine whether a track 41 is slipping with respect to the surface which it is traversing, and to measure to what degree the track 41 is slipping. This measurement can be used as an input signal to a power transmission system for controlling the torque transmitted from the engine to the drive wheel. For example, pressure sensor signals can be used by a processing entity in order to progressively reduce the amount of torque provided from the engine of the vehicle 10 to the drive wheels of the track system until the slippage measured by the sensors $84_1$-$84_S$ is below a predetermined threshold.

3. Autonomous, On-Board Slip on Ground Measuring Device

Some embodiments implemented in either positive or negative drive track systems may collect and process signals from temperature, pressure, chemical sensors $84_1$-$84_S$ located in the track 41 to determine whether a track 41 is slipping with respect to the surface which it is traversing, and to measure to what degree the track 41 is slipping. This measurement can be used as an input signal to a power transmission system for controlling the torque transmitted from the engine to the drive wheel. For example, pressure sensor signals can be used by a processing entity 88 in order to progressively reduce the amount of torque provided from the engine of the vehicle to the drive wheels of the track system $16_i$ until the slippage measured by the sensors is below a predetermined threshold.

Similarly, some embodiments implemented in negative drive track systems may collect and process signals from temperature, pressure, chemical sensors $84_1$-$84_S$ located in the track 41 to determine whether a track 41 is slipping with respect to the drive wheel, and to measure to what degree the track 41 is slipping. This measurement can be used as an input signal to a power transmission system for controlling the torque transmitted from the engine to the drive wheel. For example, pressure sensor signals can be used by a processing entity 88 in order to progressively reduce the amount of torque provided from the engine of the vehicle to the drive wheels of the track system $16_i$ until the slippage measured by the sensors is below a predetermined threshold.

4. Monitor Intensity of Work

Some embodiments may collect and process signals from temperature, pressure, chemical sensors $84_1$-$84_S$ located in the track 41 to determine the amount and nature of the work being carried out by the vehicle 10. For example, the sensor signals $84_1$-$84_S$ can be used to calculate the length of time a track 41 is used for, and to determine the relative intensity of the work (i.e. with respect to the wear on the track components) being carried out during that time.

vi. Pay Per Use

1. Intensity/Usage Calculator

Some embodiments may collect and process signals from temperature, pressure, chemical sensors $84_1$-$84_S$ located in the track 41 to determine the amount and nature of the work being carried out by the vehicle. For example, the sensor signals can be used to calculate the length of time a track is used for, and to determine the relative intensity of the work (i.e. with respect to the wear on the track components) being carried out during that time. The length and intensity of the work carried out can be used to calculate a pay-per-use cost of a specific piece of work carried out by the vehicle 10.

4. Active Components a. Track i. Lateral and Longitudinal Stiffness Control

In some embodiments, when certain ground conditions are sensed by the monitoring system 82, the monitoring system 82 may issue a signal that will cause the lateral and longitudinal stiffness of the track to be modified. This can be accomplished, for example, by providing a track comprising a ground-engaging outer side, an inner side opposite to the ground-engaging outer side, elastomeric material allowing the track to flex around the track-engaging assembly; and an internal reinforcement (or core) disposed in the elastomeric material, where a stiffness of the internal reinforcement is variable during use of the track.

For example, in some embodiments, each core of the track 41 may have a variable stiffness structure such that the longitudinal stiffness of a given one of the wings of the core is variable during use of the track. For example, the longitudinal stiffness of the given one of the wings may decrease in response to the lateral part of the track contacting the curb or other object on the ground to allow flexion of the given one of the wings. Thus, the given one of the wings may normally be rigid to provide transversal rigidity and become more flexible when the lateral part of the track contacts the curb or other object. For example, in some embodiments, the core may comprise movable mechanical joints that are respectively associated with the wings such that a respective one of the movable mechanical joints is movable to allow flexion of the given one of the wings in response to the lateral part of track contacting the curb or other object on the ground. In this embodiment, the movable mechanical joint comprises a pivot to allow the wing to pivot relative to the wheel engager when the lateral part of track contacts the curb or other object on the ground. In other embodiments, the movable mechanical joint may comprise any other suitable mechanical connection that allows parts of the core to move relative to one another to permit the wing to deflect upwardly relative to the wheel engager when the lateral part of track contacts the curb or other object on the ground. Moreover, the movable mechanical joint may change between a locked position, in which it prevents the wing from flexing (e.g., by pivoting) relative to the wheel engager when the lateral part of track has not contacted the curb or other object on the ground, and an unlocked position, in which it allows the wing to flex (e.g., by pivoting) relative to the wheel engager when the lateral part of track contacts the curb or other object on the ground. The movable mechanical joint is unlocked, i.e., changes from its locked position to its unlocked position, in response to the lateral part of track contacting the curb or other object on the ground. To that end, the movable mechanical joint may comprise a locking mechanism to unlock and lock itself. Other examples of systems and methods for altering the stiffness of track are disclosed in U.S. Patent Application No. US 2017/0197677, filed on Jan. 6, 2017, and U.S. Provisional patent Application No. 62/617,765, filed on Jan. 16, 2018, the contents of which are incorporated herein by reference.

b. Sprocket i. Speed Vs Track

As mentioned above, some embodiments implemented in negative drive track systems may collect and process signals from temperature, pressure, chemical sensors $84_1$-$84_S$ located in the track 41 to determine whether a track 41 is slipping with respect to the drive wheel, and to measure to what degree the track 41 is slipping. This measurement can be used as an input signal to a power transmission system for controlling the torque transmitted from the engine to the drive wheel. For example, pressure sensor signals can be used by a processing entity 88 in order to progressively reduce the amount of torque provided from the engine of the vehicle to the drive wheels of the track system $16_i$ until the slippage measured by the sensors is below a predetermined threshold.

ii. Torque Limiter

Some embodiments may collect and process signals from temperature, strain and/or pressure sensors $84_1$-$84_S$ located in the sprockets to determine whether the amount of torque being provided to the sprocket is above a predetermined level, and by how much. This measurement can be used as an input signal to a power transmission system for dynamically controlling the torque transmitted from the engine to the sprocket.

iii. Mispitch

1. Under Load

Some embodiments may collect and process signals from temperature, pressure, chemical sensors $84_1$-$84_S$ located in the track 41, or elsewhere in the track system $16_i$, to monitor the amount of mispitch between the sprocket and the drive lugs in a situation where the track is under high load.

2. No Load/Roading

Some embodiments may collect and process signals from temperature, pressure, chemical sensors $84_1$-$84_S$ located in the track 41, or elsewhere in the track system $16_i$, to monitor the amount of mispitch between the sprocket and the drive lugs in a situation where the track 41 is under an amount of tension that is below a certain threshold because the vehicle 10 is carrying no load, or is traversing a paved road.

3. Variable Pitch (on Sprocket or on Track)

Some embodiments may collect and process signals from temperature, pressure, chemical sensors $84_1$-$84_S$ located in the track 41, or elsewhere in the track system $16_i$, to monitor the amount of mispitch between the sprocket and the drive lugs. Using the resulting assessment of mispitch to control sprocket or drive lug pitch variation means, with a view to mitigating the mispitch.

4. Variable Geometry Drive Lug

Some embodiments may collect and process signals from temperature, pressure, chemical sensors $84_1$-$84_S$ located in the track 41, or elsewhere in the track system $16_i$, to monitor the amount of mispitch between the sprocket and the drive lugs. Using the resulting assessment of mispitch to control drive lug geometry variation means, with a view to mitigating the mispitch.

c. Suspension i. Feedback for Load

Some embodiments may collect and process signals from pressure sensors or accelerometers $84_1$-$84_S$ located in the track 41 and/or track system $16_i$ to measure vibration in track 41 and/or track system $16_i$. Using the measurement in dynamically controlling an active suspension system, with a view to stiffening or loosening parts of the active suspension system in order to mitigate the effects of a particular load on a vehicle.

ii. Vibration Control

1. Variable Stiffness and Damping

Some embodiments may collect and process signals from pressure sensors $84_1$-$84_S$ or accelerometers $84_1$-$84_S$ located in the track 41 and/or track system $16_i$ to measure vibration in track 41 and/or track system $16_i$. Using the measurement in dynamically controlling an active suspension system, with a view to reducing vibration in the track 41, track system $16_i$ and/or vehicle.

2. Ride Quality a. Active Suspension for Roading and Field Work

Some embodiments may collect and process signals from pressure and/or temperature sensors $84_1$-$84_S$ or accelerometers $84_1$-$84_S$ located in the track 41 or track system $16_i$, or information derived from the above-described imaging systems, to measure to determine whether a vehicle 10 is being used in a field or on a paved road. Using the determination in dynamically controlling an active suspension system.

b. Active Sensing to Adjust Suspension

Some embodiments may collect and process signals from pressure sensors $84_1$-$84_S$ or accelerometers $84_1$-$84_S$ located in the track 41 and/or track system $16_i$ to, or information derived from the above-described imaging systems, measure vibration in track 41 and/or track system $16_i$. Using the measurement in dynamically controlling an active suspension system, with a view to reducing vibration in the track 41, track system $16_i$ and/or vehicle.

iii. Ground Pressure

Some embodiments may use at least one pressure sensor $84_x$ in a track to, or information derived from the above-described imaging systems, measure soil compaction and send soil compaction information to a processing entity 88 for measuring soil compaction over a traversed area. The processing entity 88 can be located in the vehicle, or can be located remotely. In some embodiments, the soil compaction measurement can be used in dynamically controlling an active suspension system, with a view to reducing soil compaction due to tractor weight.

iv. Ballast on Machine

Some embodiments may use temperature, acceleration and/or strain/pressure sensors $84_1$-$84_S$ in the track 41 and/or track system $16_i$ to determine the suitability of a specific vehicle ballast in keeping axle or under carriage pressure/strain within specific parameters. Using resulting determination in dynamically controlling an active suspension system, with a view to mitigating the effects of unsuitable vehicle ballast.

v. Feedback for Safety

Some embodiments may use temperature, acceleration and/or strain/pressure sensors $84_1$-$84_S$ in the track 41 and/or track system $16_i$, or information derived from the above-described imaging systems, to determine whether the operating condition of the active suspension system is within safe operating parameters and limiting functionality of the vehicle 10 in order to mitigate possible unsafe operation if the operating condition of the active suspension is outside safe operating parameters.

vi. Speed/Roading/Locking Travel Speed

Some embodiments may collect and process signals from pressure sensors or accelerometers $84_1$-$84_S$ located in the track 41 and/or track system $16_i$, or information derived from the above-described imaging systems, to measure vibration in track 41 and/or track system $16_i$. Using the measurement in dynamically controlling an active suspension system and vehicle speed limiting system, with a view to reducing vibration in the track and/or track system and optimizing vehicle speed.

vii. Self Leveling

Some embodiments may collect and process signals from pressure sensors or accelerometers $84_1$-$84_S$ located in the track 41 and/or track system $16_i$, or information derived from the above-described imaging systems, to measure the relative positions of the track 41 and/or track system $16_i$ with respect to the vehicle 10. Using the measurement in dynamically controlling an active suspension system, with a view to maintaining the vehicle in a substantially level position.

viii. Field, Roading, Sidehill Setup

Some embodiments may collect and process signals from pressure sensors or accelerometers $84_1$-$84_S$ located in the track 41 and/or track system $16_i$, or information derived from the above-described imaging systems, to measure the relative positions of the track 41 and/or track system $16_i$ with respect to the vehicle. Using the measurement in dynamically controlling an active suspension system, with a view to maintaining the vehicle 10 in a specific position that is suited for a particular task (e.g. low position for roading, high position for fielding and tilted position for sidehilling).

d. Tensioner i. Anti-Detracking

Some embodiments may collect and process signals from pressure sensors or accelerometers $84_1$-$84_S$ located in the track 41 and/or track system $16_i$, or information derived from the above-described imaging systems, to measure vibration in the track 41 and/or temperature and pressure/strain in the drive lugs or in other locations of the track 41 in order to determine the likelihood of detracking. In response to the detection, automatically controlling operational parameters of the vehicle 10 in order to prevent detracking (e.g. increasing track tension by way of tensioner and/or reducing speed of vehicle and/or turning vehicle toward the left or right, into or away from sloping ground).

ii. Emergency Braking

In some embodiments, when the monitoring system 82 detects emergency braking, it can send a signal to an active tensioner system to release tension in order to avoid damage to the drive lug and/or ratcheting. Emergency braking can be detected by, for example, when sensors $84_1$-$84_x$ sense very high amounts of strain in the drive lugs.

iii. For Sprocket Wear Control

Some embodiments may collect and process signals from temperature, strain and/or pressure sensors $84_1$-$84_S$ located in the sprockets and/or in the track 41, to determine whether the amount of pressure provided to the sprocket is above a predetermined level, and by how much. This measurement can be used as an input signal to a tensioner system for dynamically controlling the tension being maintained on a track 41, with a view to limiting sprocket wear.

iv. Track Tension

1. Monitor Track Tension (Already Done on Friction Drive, but Passive)

Some embodiments may collect and process signals from temperature, strain and/or pressure sensors $84_1$-$84_S$ located in the track 41, or information derived from the above-described imaging systems, to determine whether the tension in the track is above a predetermined level, and by how much. This information can be provided to a vehicle user and/or transmitted remotely.

2. Automatic Adjustment

Some embodiments may collect and process signals from temperature, strain and/or pressure sensors $84_1$-$84_S$ located in the track 41, or information derived from the above-described imaging systems, to determine whether the tension in the track is above a predetermined level, and by how much. This measurement can be used as an input signal to a tensioner system for dynamically controlling the tension being maintained on a track.

3. Active to Adapt to Draw Bar (Torque)

Some embodiments may use signals derived from pressure and/or strain sensors $84_1$-$84_S$ in a draw bar, in a track 41 and/or in other elements of the track system $16_i$ in controlling an active and dynamic tensioner in order to arrive at the appropriate track tension for the particular load being drawn, with a view to, for example, maximizing traction of the tracks on the ground, and/or avoiding slippage, and/or avoiding damage to the track 41 of the track system $16_i$.

4. Dual Phase (Pressure, Tension . . . ) Control

In some embodiments comprising a piston-cylinder track tensioner, magnetorheological fluid may be used in the piston-cylinder in order to dynamically adjust the track tension in response to a signal form the monitoring system 82.

5. Track Tension Measurement Tool a. Variable Track Tension for Optimal Crawling and Rolling Resistance In some embodiments, a dynamic track tensioner can be adjusted based on signals received from the monitoring system 82. For example, a certain track tension can be set when the monitoring system 82 determines that the track system is carrying out field work, and another, different, track tension can be set when the monitoring system 82 determines that the track system is carrying out high speed transportation work.

Optimize tension based on characteristics of the ground.

e. Under Carriage i. Self-Propelling System

In some embodiments, the monitoring system described above may be part of an electrically or hydraulically motorized track system. Such a self-propelled track system may be mounted on an implement to perform field work without the need of a tractor to pull the implement. Another example of a self-propelled track system can be found disclosed in International patent Application No. PCT/CA2018/051354, filed on Oct. 25, 2018, the contents of which are hereby incorporated by reference herein.

ii. Smart Vehicle Ballasting

Some embodiments may collect and process signals from temperature, strain and/or pressure sensors $84_1$-$84_S$ and/or acceleration sensors $84_1$-$84_S$ located in the track 41 and/or track system $16_i$, or information derived from the above-described imaging systems, to determine whether the track system $16_i$ is under pressure and/or strain because of particular load/ballast imbalance, and to measure by how much. This determination and measurement can be used to dynamically (e.g. by way of continual signal feedback) control an active ballasting system in order to establish a particular load/ballast positional relationship.

iv. Smart Belt Alignment

Some embodiments may collect and process signals from pressure and/or strain sensors and/or accelerometers $84_1$-$84_S$ located in the track 41 and/or track system $16_i$, or information derived from the above-described imaging systems, to measure vibration in the track 41 and/or temperature and pressure/strain in the drive lugs or in other locations of the track 41 in order to determine the likelihood of track misalignment. In response to the detection, automatically controlling operational parameters of the vehicle 10 in order to prevent misalignment (e.g. increasing track tension by way of tensioner and/or reducing speed of vehicle 10 and/or turning vehicle toward the left or right, and/or into or away from sloping ground). Also, in some embodiments, an actuator could act on the alignment lever (or other alignment means) of the track system to correct the track alignment.

f. Smart Traction i. Slip Control

Some embodiments may collect and process signals from temperature, pressure, speed sensors $84_1$-$84_S$ located in the track 41, or information derived from the above-described imaging systems, to determine whether a track 41 is slipping with respect to the surface which it is traversing, and to measure to what degree the track 41 is slipping. This measurement can be used as an input signal to a power transmission system for controlling the torque transmitted from the engine to the drive wheel. For example, a pressure sensor signals can be used by a processing entity 88 in order to progressively reduce the amount of torque provided from the engine of the vehicle 10 to the drive wheels of the track system $16_i$ until the slippage measured by the sensors is below a predetermined threshold.

ii. Traction Optimization

Some embodiments may collect and process signals from temperature, pressure, chemical sensors $84_1$-$84_S$ located in the track 41, or information derived from the above-described imaging systems, to determine whether a track 41 is slipping with respect to the surface which it is traversing, and to measure to what degree the track 41 is slipping. This measurement can be used as an input signal to a power transmission system for controlling the torque transmitted from the engine to the drive wheel. For example, a pressure sensor signals can be used by a processing entity 88 in order to progressively reduce the amount of torque provided from the engine of the vehicle 10 to the drive wheels of the track system $16_i$ until the slippage measured is at a pre-determined slip ratio.

iii. Target Optimal Slip Ratio

Some embodiments may collect and process signals from temperature, pressure, chemical sensors $84_1$-$84_S$ located in the track, or information derived from the above-described imaging systems, to determine whether a track 41 is slipping with respect to the surface which it is traversing, and to measure to what degree the track is slipping. This measurement can be used as an input signal to a power transmission system for controlling the torque transmitted from the engine to the drive wheel. For example, a pressure sensor signals can be used by a processing entity 88 in order to progressively reduce the amount of torque provided from the engine of the vehicle 10 to the drive wheels of the track system 16$_i$ until the slippage measured is at a pre-determined slip ratio.

5. Energy Harvesting a. Solar

Some embodiments may use sunlight (e.g. one or more solar cells) to drive pressure, temperature, acceleration, chemical sensors 84$_1$-84$_S$.

b. Motion/Vibration

Some embodiments may use micro-electromechanical systems (MEMS) devices (e.g. piezoelectric cantilever device) to harvest energy to drive pressure, temperature, acceleration, chemical sensors 84$_1$-84$_S$. MEMS devices can be embedded into track 41 or form part of the track system 16$_i$.

c. Heat

Some embodiments may use heat (e.g. a thermoelectric generator) to drive pressure, temperature, acceleration, chemical sensors 84$_1$-84$_S$. Thermoelectric generators could be embedded into track 41 or form part of the track system 16$_i$.

6. Higher Level Concepts a. Intelligent Drive Mode for Tractor i. Manual or Automatic Selection Vs Field Work to be Done In some embodiments, the settings of the active components of vehicles 10 can be saved and associated with characteristics sensed by the monitoring device 82. For example, when a vehicle 10 enters a field, the monitoring device 82 may detect slippage in the track or another of the track system components related to general field operation, and may further detect environmental conditions (based on weather, humidity, location, etc.). In response, the monitoring device 82 may issue a signal causing the tractor to adjust certain vehicle parameters (e.g. engine rpm, proper gear selection, etc.) and/or retrieve a past configuration of parameters related to current environmental conditions. As a result, field operation and machine efficiency under various conditions may be optimized.

ii. Tillage Mode that Includes Anti-Ratcheting Protection

When the monitoring system 82 detects excessive strain in the track (e.g. drive lug) or another component of the track system (e.g. drive wheel), it can issue a signal to the vehicle 10 to reduce the available power to the track in order to avoid damage to the track and/or other track system components.

iii. Roading Mode that Controls Max Speed

Some embodiments may collect and process signals from temperature and/or chemical sensors 84$_1$-84$_S$ located in the track 41, or information derived from the above-described imaging systems, to determine whether the vehicle 10 is traversing a road. This determination can be used as an input signal to an intelligent drive mode system for selecting a specific drive mode that adjust speed according to track temperature limit.

iv. Slip Sensing

Some embodiments may collect and process signals from temperature, pressure, chemical sensors 84$_1$-84$_S$ located in the track 41, or information derived from the above-described imaging systems, to determine whether a track 41 is slipping with respect to the surface which it is traversing, and to measure to what degree the track 41 is slipping. This measurement can be used as an input signal to an intelligent drive mode system for selecting a specific drive mode.

v. Soil Humidity Level

Some embodiments may use at least one moisture sensor 84$_x$ in a track 41 to measure soil moisture and send soil moisture information to a processing entity 88 for measuring soil moisture over a traversed area. This measurement can be used as an input signal to an intelligent drive mode system for selecting a specific drive mode.

vi. Torque Sensing

Some embodiments may collect and process signals from temperature, strain and/or pressure sensors 84$_1$-84$_S$ located in the sprockets to measure the amount of torque being provided to the sprocket. This measurement can be used as an input signal to an intelligent drive mode system for selecting a specific drive mode.

vii. Ultimately Removes the Need for a Driver: Autonomous Tractor

In some embodiments, the vehicle 10 is an autonomous vehicle, as described in more detail below.

b. Intelligent Tractor Surround i. Object Detection in the Surroundings

Some embodiments may use Lidar, Sonar or camera systems to detect and/or map the surroundings of a vehicle 10.

ii. Alarm and Surrounding Camera

Some embodiments may use Lidar, Sonar or camera systems to detect and/or map surroundings of a vehicle 10 and produce alarm signals.

iii. Automatic Braking

Some embodiments may use Lidar, Sonar or camera systems to detect and/or map surroundings of a vehicle 10 and automatically applying breaks to vehicle.

iv. Camera System to Follow the Rows

Some embodiments may use Lidar, Sonar or camera systems to detect and/or map surroundings of a vehicle 10 and steer vehicle accordingly.

v. Camera for Shoulder Straddling Management

Figure 57:
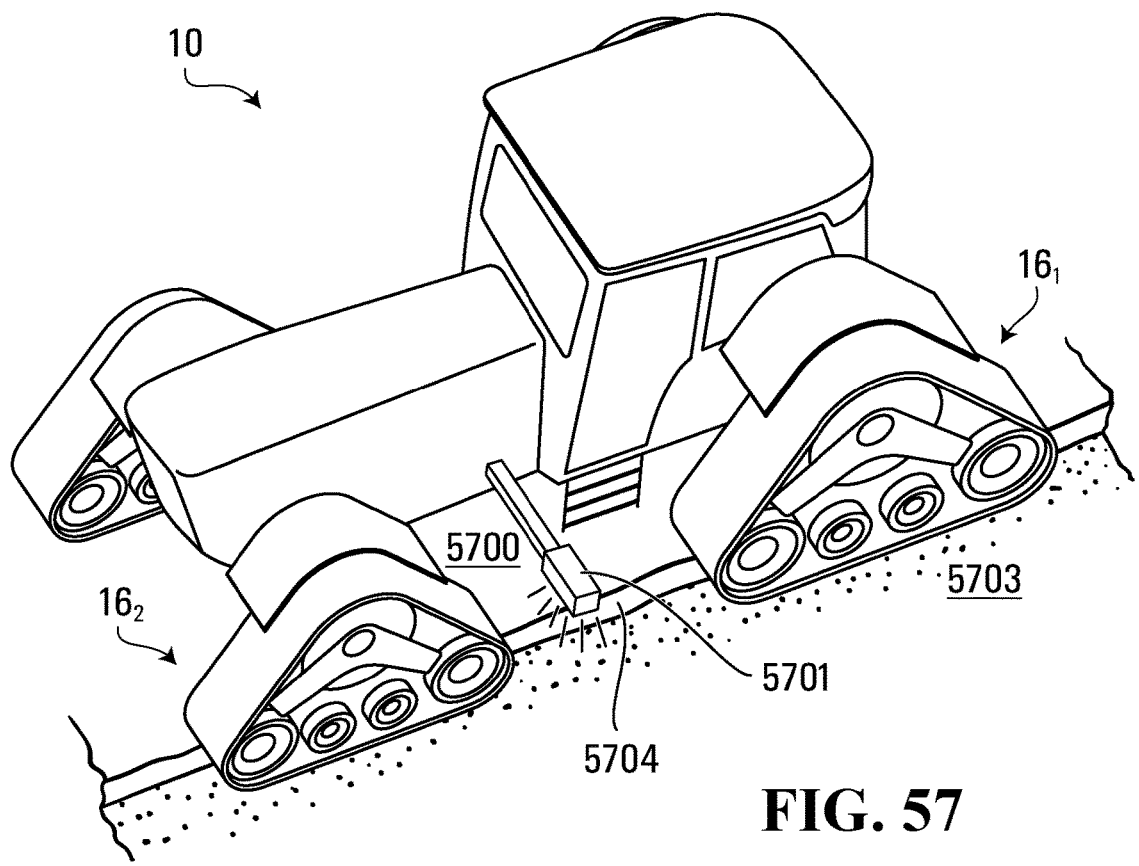
FIG. 57 shows an example of another embodiment of a schematic network diagram of an imaging system configured to detect a shoulder straddling condition of a track.
Figure 58:
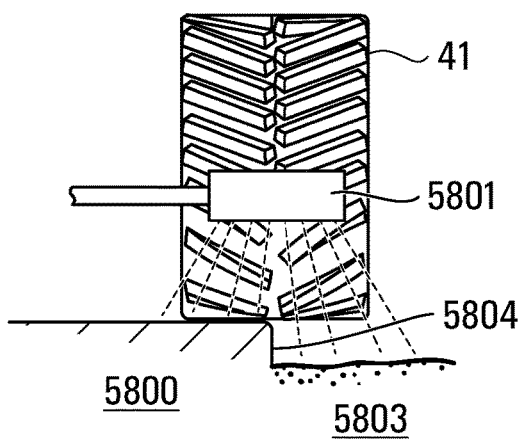
FIG. 58 shows another view of the imaging system of FIG. 57.
Figure 59:
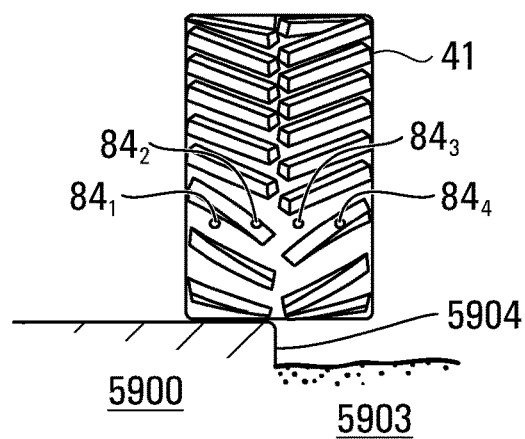
FIG. 59 shows an example of another embodiment of a sensor array configured to detect a shoulder straddling condition of a track.

In some embodiments, and with particular reference to FIGS. 57 to 59, the monitoring system 82 can be configured to detect when a track 41 of the vehicle 10 is straddling an interface 5704 between a paved portion 5700 of a road and an unpaved shoulder 5703 of a road (i.e. herein referred to as a shoulder straddling condition), as shown in FIG. 57. When in a shoulder straddling condition, as shown in FIGS. 58 and 59, a portion of the track 41 traverses a hard paved portion 5800, 5900 of the road, and another portion of the track traverses a softer unpaved portion 5805, 5903 of the shoulder of the road. This can results in a disproportional amount of stress and strain being applied to the portion of the track traversing the hard paved portion 5800, 5900 of the road and, ultimately, in damage to the track 41. It is therefore advantageous to detect this condition in order to avoid it or to minimize the amount of time that the track is used in this condition.

In some embodiments, and with reference to FIGS. 57 and 58, the vehicle is equipped with an image capture device 5701 configured to acquire images of the area around the track 41 in order to allow the monitoring system 82 to detect whether the track 41 is in a shoulder straddling condition. For example, images of the ground surrounding the track 41 may be analyzed by the image processing system 500 of FIG. 50 (or by the monitoring system 82, itself) and a determination may be made as to whether the track 41 is in a shoulder straddling condition, or may be approaching a shoulder straddling condition. Various aspects of the surfaces 5800 and 5803, such as colour, brightness, texture, etc.

can be compared and analyzed in order to determine whether the track 41 is in a shoulder straddling condition and the exact location of the interface 5804 with respect to the track 41.

In another embodiment, and with reference to FIG. 59, a plurality of sensors 84₁, 84₂, 84₃, 84₄ may be used by the monitoring system 82 to determine whether the track 41 is in a shoulder straddling condition. For example, when the track 41 is in the straddling condition shown in FIG. 59, the pressure and/or temperature sensed by sensors 84₁ and 84₂ will be higher than the pressure and/or temperature sensed by sensors 84₃ and 84₄. This discrepancy may allow the monitoring system 82 to determine whether the track 41 is in a shoulder straddling condition and the approximate location of the interface 5904 with respect to the track 41.

Figure 65:
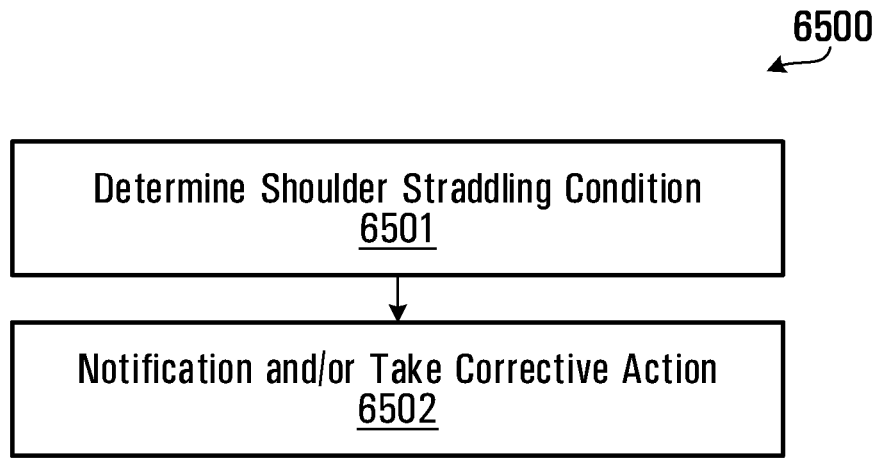
FIG. 65 shows an example of another embodiment of a flow diagram of a method of addressing a shoulder straddling condition.

In some embodiments, and with reference to FIG. 65, when the monitoring system 82 determines that the track 41 is in a shoulder straddling condition, at step 6501, as described above, it may then notify the operator of the vehicle of the shoulder straddling condition and/or issue a signal that can be used to control the direction of the vehicle in order to remove the track 41 from the shoulder straddling condition at step 6502. Notifying the operator of the vehicle can be implemented in accordance with any of the embodiments described herein.

In some embodiments, the above-describe sensors can be used in combination in order combine the measurement of multiple parameters, with a view to extracting further information. For example, pressure sensors can be used in conjunction with moisture sensors in order to determine when the moisture sensors should be in contact with soil. Moreover, in some embodiments, multiple sensors can measure the same parameter (e.g. signals from multiple pressure sensors to average out ground pressure or compaction measurements, and thereby avoid outlier measurements).

In some embodiments, the monitoring system 82 may perform certain actions in respect of the agricultural vehicle 10 based on identification of components of the track systems 16₁-16₄ using the tags 78₁-78_G, such as controlling the agricultural vehicle 10 (e.g., the speed of the agricultural vehicle 10, etc.) differently based on what is identified and/or conveying information relating to what is identified to a remote party (e.g., a provider such as a manufacturer or distributor of the track systems 16₁-16₄ and/or of the agricultural vehicle 10) who can act differently based on what is identified (e.g., manage a warranty, prepare for maintenance of the agricultural vehicle 10, etc.).

For example, in some embodiments, as shown in FIG. 28, a tag 78_x is part of the track 41 of a track system 16_i to convey the identifier 81 of the track 41, such as a serial number, a make, a model, a type, and/or any other information identifying (i.e., indicating the identity of) the track 41. In this embodiment, the tag 78_x is an RFID tag configured to wirelessly transmit an identification signal conveying the identifier 81 to the processing entity 88 of the monitoring system 82, in which case the processing entity 88 comprises an RFID reader.

In some embodiments, the processing entity 88 may issue one or more output signals to control the agricultural vehicle 10 based on the identity of the track 41. One or more operational aspects of the agricultural vehicle 10 may be controlled differently depending on the identity of the track 41. The processing entity 88 may thus enable, disable, and/or otherwise alter operation of one or more components of the vehicle 10 based on the identity of the track 41.

For example, in some embodiments, the speed of the agricultural vehicle 10 may be regulated based on the identity of the track 41. This may be used, for instance, to help ensure that the track 41 is suitable for use on the vehicle 10, for allowing the vehicle 10 to operate at certain speeds and/or under certain conditions (e.g., loads, types of ground such as an agricultural field vs. a paved road, etc.) without wearing or otherwise damaging the track 41 and/or other components of the vehicle 10, and/or for other reasons.

In some embodiments, the processing entity 88 may send an output signal to the powertrain controller 114 to allow the speed of the agricultural vehicle 10 to be greater when the track 41 is validated than when the track 41 is not validated, based on the identity of the track 41. For instance, in some embodiments, the processing entity 88 may validate the track 41 when the identifier 81 of the track 41 from the tag 78_x matches track validation information (e.g., one or more serial numbers, makes, models, etc. of tracks that are approved for the vehicle 10) stored in the memory portion 110, and may not validate the track 41 when the identifier 81 of the track 41 from the tag 78_x does not match the track validation information stored in the memory portion 11 or when no identifier is received from the track 41. In some cases, no identifier may be received from the track 41 because the track 41 is a different model, make, etc. which may not have any tag such as the tag 78_x.

The processing entity 88 may allow the speed of the agricultural vehicle 10 to be greater in certain conditions when the track 41 is validated than when the track 41 is not validated, based on the identity of the track 41. For instance, in some embodiments, the processing entity 88 may allow the speed of the agricultural vehicle 10 to be greater when travelling on a paved road (i.e., roading) when the track 41 is validated than when the track 41 is not validated, based on the identity of the track 41 (e.g., and based on a sensor 84_x such as a pressure sensor of the track 41 that indicates that the track 41 is on the paved road due to hardness of the ground beneath it).

In addition to or instead of controlling the speed of the agricultural vehicle 10 based on the identity of the track 41, in some embodiments, the processing entity 88 may control other operational aspects of the agricultural vehicle 10 differently depending on the identity of the track 41. For instance, in some embodiments, the processing entity 88 may enable operation of the vehicle 10 when the track 41 is deemed to be suitable for loading on the vehicle 10 or disable operation of the vehicle 10 when the track 41 is deemed to be unsuitable for the loading on the vehicle 10.

In some embodiments, a warranty associated with the agricultural vehicle 10 may be managed based on the identity of the track 41. For example, in some embodiments, the processing entity 88 may convey information relating to the identity of the track 41 to a remote party (e.g., a provider such as a manufacturer or distributor of the track systems 16₁-16₄ and/or of the agricultural vehicle 10) who can manage the warranty based on the identity of the track 41. For instance, in some embodiments, at least part (i.e., part or an entirety) of the warranty, such as one or more clauses of the warranty, may be cancelled, not honored or otherwise altered when the track 41 is not approved for use on the agricultural vehicle 10 or otherwise validated. The processing entity 88 may validate the track 41 when the identifier 81 of the track 41 from the tag 78_x matches track validation information (e.g., one or more serial numbers, makes, models, etc. of tracks that are approved for the vehicle 10) stored in the memory portion 110, and may not validate the track 41 when the identifier 81 of the track 41 from the tag 78_x does not match the track validation information stored in the memory portion 11 or when no identifier is received from the track 41. In some cases, no identifier may be received from the track 41 because the track 41 is a different model, make, etc. which may not have any tag such as the tag $78_x$.

The processing entity 88 may convey the information relating to the identity of the track 41 to the remote party who can manage the warranty based on the identity of the track 41 in any suitable way. For example, in some embodiments, the processing entity 88 may transmit the information relating to the identity of the track 41 (e.g., the identifier 81 of the track 41 or an absence of an identifier of the track 41; a date and time at which the track 41 was installed on the agricultural vehicle 10 and detected by the processing entity 88; etc.) to a computer associated with the remote party over a communication link, which may be implemented over a cellular network, a WiFi network or other wireless LAN, a WiMAX network or other wireless WAN, etc. As another example, in some embodiments, the processing entity 88 may store the information relating to the identity of the track 41 in the memory portion 11 and provide it to the remote party when the agricultural vehicle 10 is serviced.

In some examples of implementation, the processing entity 88 may notify a user such as the operator of the agricultural vehicle 10 as to whether the track 41 is validated. For instance, in some embodiments, the processing entity 88 may notify the user that the track 41 is not validated and that this may affect the warranty associated with the vehicle 10. The processing entity 88 may convey a notification as to whether the track 41 is validated on the communication device 130 (e.g., whether part of the user interface 70 of the operator cabin 20, or a personal communication device such as a smartphone, tablet, computer, etc.) for the user.

In some embodiments, the processing entity 88 may issue an output signal to a remote computer to prepare for maintenance (e.g., repair and/or replacement of components) of the agricultural vehicle 10 based on the identity of the track 41. For example, in some embodiments, the processing entity 88 may issue the output signal to the remote computer, which may be associated with a provider of tracks, to indicate that a new track corresponding in make, model, etc. to the track 41 is to be prepared to replace the track 41, such as when the processing entity 88 determines that the track 41 is due for replacement (e.g., based on a usage (e.g., hours of use) of the track 41, based on output of a sensor $84_x$ that indicates that the track 41 is excessively worn or damaged, etc.).

While in embodiments considered above the agricultural vehicle 10 is driven by a human operator in the vehicle 10, in other embodiments, the vehicle 10 may be an unmanned agricultural vehicle (e.g., a teleoperated or autonomous unmanned agricultural vehicle).

For instance, in some embodiments, the agricultural vehicle 10 may be an autonomous agricultural vehicle that is operable without human control, including by steering, accelerating, and decelerating (e.g., braking) itself autonomously without human control, to travel on an agricultural field to perform agricultural work and possibly on a paved road (e.g., between agricultural fields). Although it can drive itself, in some embodiments, the autonomous agricultural vehicle 10 may be controlled by a human driver in some situations.

Figure 39:
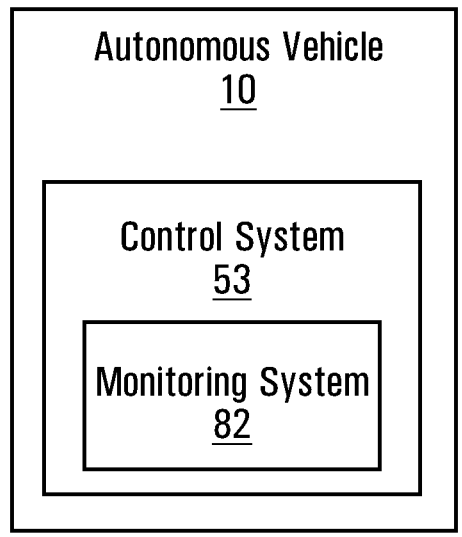
FIGS. 39 to 42 show an example of an embodiment in which the vehicle is an autonomous vehicle.
Figure 40:
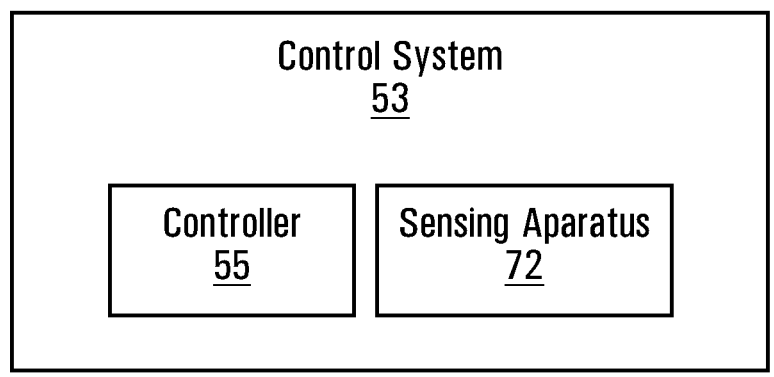

In this embodiment, as shown in FIGS. 39 and 40, the autonomous agricultural vehicle 10 comprises a control system 53 that is configured to operate the vehicle 10 autonomously (i.e, without human control). More particularly, in this embodiment, the control system 53 comprises at least part of the monitoring system 82, including at least part of the sensors $84_1$-$84_S$, the tags $78_1$-$78_G$, and the processing entity 88.

The control system 53 is configured to operate the autonomous agricultural vehicle 10, including to steer, accelerate, and decelerate (e.g., brake) the vehicle 10, autonomously (i.e, without human control) as the vehicle 10 travels in an agricultural field to perform agricultural work and possibly on a paved road (e.g., to travel between agricultural fields). To that end, the control system 15 comprises a controller 55 and a sensing apparatus 72 to perform actions controlling the autonomous agricultural vehicle 10 (e.g., actions to steer, accelerate, decelerate, etc.) based on a computerized perception of the environment of the vehicle 10.

While its control system 53 enables it to drive itself, the autonomous agricultural vehicle 10 may be controlled by a human driver, such as the operator in the cabin 20, in some situations. For example, in some embodiments, the control system 53 may allow the autonomous agricultural vehicle 10 to be selectively operable either autonomously (i.e., without human control) or under human control (i.e., by a human driver) in various situations (e.g., the autonomous agricultural vehicle 10 may be operable in either of an autonomous operational mode and a human-controlled operational mode).

Figure 41:
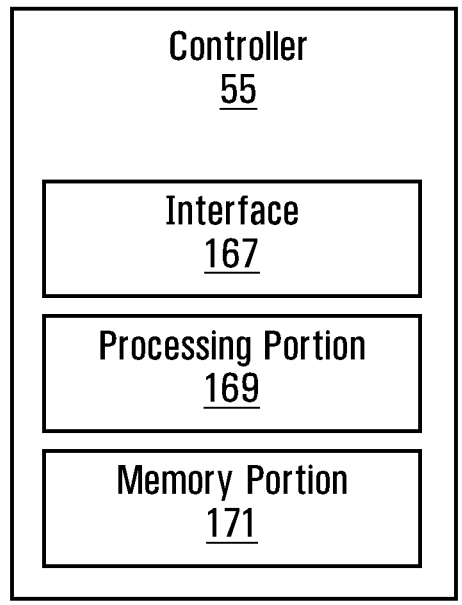
Figure 42:
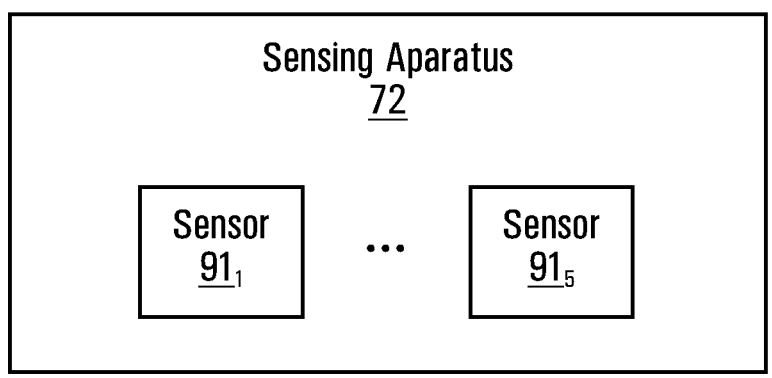

The controller 55 is a processing apparatus configured to process information received from the sensing apparatus 72 and possibly other sources in order to perform actions controlling the autonomous agricultural vehicle 10, including to steer, accelerate, and decelerate the vehicle 10. With additional reference to FIG. 41, in this embodiment, the controller 55 comprises an interface 167, a processing portion 169, and a memory portion 171, which are implemented by suitable hardware and/or software.

The interface 167 comprises one or more inputs and outputs allowing the controller 55 to receive input signals from and send output signals to other components to which the controller 55 is connected (i.e., directly or indirectly connected), including the sensing apparatus 72, the powertrain 15, the steering mechanism 18, and possibly other components such as the user interface 70, a communication interface 163 configured to communicate over a communication network (e.g., a cellular or other wireless network, for internet and/or other communications) and/or with one or more other vehicles that are near the autonomous agricultural vehicle 10 (i.e., for inter-vehicle communications), etc.

The processing portion 169 comprises one or more processors for performing processing operations that implement functionality of the controller 55. A processor of the processing portion 169 may be a general-purpose processor executing program code stored in the memory portion 171. Alternatively, a processor of the processing portion 169 may be a specific-purpose processor comprising one or more preprogrammed hardware or firmware elements (e.g., application-specific integrated circuits (ASICs), electrically erasable programmable read-only memories (EEPROMs), etc.) or other related elements.

The memory portion 171 comprises one or more memories for storing program code executed by the processing portion 169 and/or data (e.g., maps, vehicle parameters, etc.) used during operation of the processing portion 169. A memory of the memory portion 171 may be a semiconductor medium (including, e.g., a solid-state memory), a magnetic storage medium, an optical storage medium, and/or any other suitable type of memory. A memory of the memory portion 171 may be read-only memory (ROM) and/or random-access memory (RAM), for example.

In this embodiment, the controller 55 implements the processing entity 88 of the monitoring system 82. For example, in some embodiments, the interface 167, the processing portion 169, and the memory portion 171 of the controller 55 may comprise the interface 102, the processing portion 108, and the memory portion 110 of the processing entity 88.

In some embodiments, the controller 55 may comprise and/or interact with one or more other control units of the autonomous agricultural vehicle 10. For example, in some embodiments, the controller 55 may comprise and/or interact with a powertrain control unit of the powertrain 15, such as an engine control unit (ECU), a transmission control unit (TCU), etc.

The sensing apparatus 72 comprises a set of sensors $91_1$-$91_S$ to sense aspects of the environment of the autonomous agricultural vehicle 10 and generate sensor information indicative of these aspects of the environment of the vehicle 10 that is provided to the controller 55 in order to control the vehicle 10 on an agricultural field and possibly on a paved road (e.g., as it travels between agricultural fields). The sensor information can be used by the controller 55 to determine actions which are to be performed by the autonomous agricultural vehicle 10 in order for the vehicle 10 to progress as it performs agricultural work in an agricultural field and possibly as it travels on a paved road (e.g., between agricultural fields). The sensors $91_1$-$91_S$ can provide situational information proximate to the vehicle 10, including any potential hazards proximate to the vehicle 10.

The sensors $91_1$-$91_S$ may include any suitable sensing device. In this embodiment, the sensors $91_1$-$91_S$ include respective ones of the sensors $84_1$-$84_s$ of the monitoring system 82, as well as a camera (e.g., video, stereoscopic, etc.) and/or other imaging device, a Light Detection and Ranging (LIDAR) device, a radar device, a wheel speed sensor, a GPS and/or other location sensor, and/or any other suitable sensing device.

Examples of other actions that can be performed by the processing entity 88 of the monitoring system 82 in various embodiments, such as where the agricultural vehicle 10 is autonomous, are discussed below.

a. Self-Steering Track System

Some embodiments use pressure and/or temperature and/or moisture and/or chemical sensors $84_1$-$84_s$ in a track 41 to steer a vehicle. This can be used by autonomous farming vehicles to steer towards/away from soil with, for example, a greater compaction, or a specific chemical composition. The signals produced by the sensors $84_1$-$84_s$ can be sent locally or remotely for processing by a data processor. Sensors can also be used to assess field topography and produce signals that allow a processing entity 88 to assist an autonomous vehicle 10 in accomplishing a particular maneuver (e.g. driving vehicle with tracks located between furrows). Sensors in the track can also be used to sense track misalignment caused by the traversal of uneven ground (e.g. side hill). Feedback signals can then be used to steer the vehicle in order to maintain a certain course.

b. GPS Positioning System

Some embodiments use a Global Positioning System receiver, positioned in a track 41 and/or a track system $16_i$, to provide location information to a local or remote data processor. GPS signals can be used in steering the vehicle 10.

c. Human Remote Control

Some embodiments use the self-steering track and the GPS positioning systems described above to produce a machine augmented intelligence system to allow a human user to remotely control a vehicle within certain computer-defined parameters (e.g. within the field and between furrows).

d. Under Carriage Monitoring Function for Autonomous Vehicle (or Under Trained Employ)

Some embodiments use sensors $84_1$-$84_s$ in the track system $16_i$ and/or track 41 to monitor an under carriage of an autonomous vehicle 10 for noise, chemicals and/or vibration. The signals received from the sensors $84_1$-$84_s$ can be used to remotely monitor the vehicle for any abnormal operating conditions.

Figure 43:
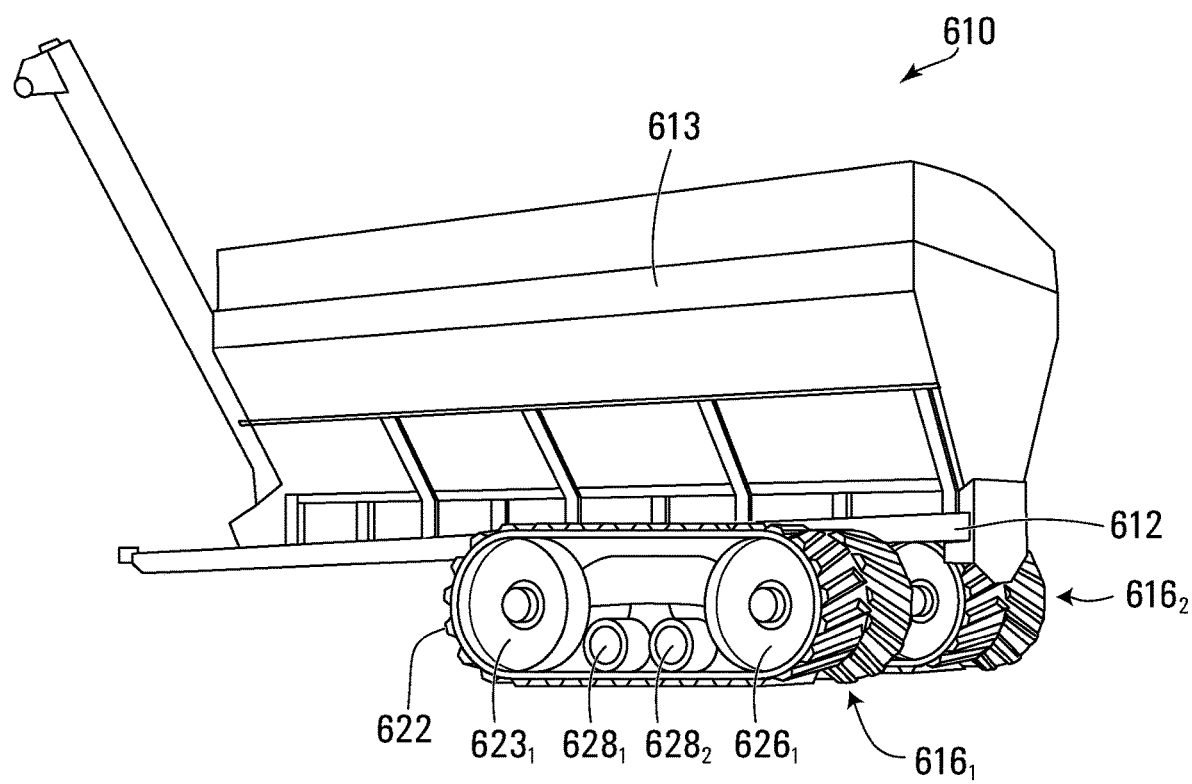
FIG. 43 shows an example of another embodiment in which a trailed vehicle comprises a monitoring system.

In some embodiments, the work implement 13 that is drawn by the agricultural vehicle 10 may implement features disclosed herein in respect of the agricultural vehicle 10, including the monitoring system 82. For instance, with additional reference to FIG. 43, the work implement 13 may comprise a trailed vehicle 610 (e.g., a cart) comprising a frame 612, a body 613 (e.g., a container) and track systems $616_1$, $616_2$. In this example, the trailed vehicle 610 is a harvest cart. In other examples, the trailed vehicle 610 may be a fertilizer cart, a sprayer, a planter or any other suitable type of trailed vehicle. Each track system $616_i$ of the trailed vehicle 610 comprises front (i.e., leading) idler wheels $623_1$, $623_2$ at a first longitudinal end portion of the track system $616_i$, rear (i.e., trailing) idler wheels $626_1$, $626_2$ at a second longitudinal end portion of the track system $616_i$ opposite the first longitudinal end portion, and a plurality of roller wheels $628_1$-$628_4$ intermediate the front idler wheels $623_1$, $623_2$ and the rear idler wheels $626_1$, $626_2$. The track system $616_i$ further comprises a track 641 disposed around the wheels $626_1$, $626_2$, $626_1$, $626_2$, $628_1$-$628_4$. The trailed vehicle 610, including the track system $616_i$, may implement the monitoring system 82 as described above. Additionally or alternatively, the track 641 may be configured in a manner similar to the track 41 as described above.

In this example, the trailed vehicle 610 is not motorized in that it does not comprise a prime mover for driving the track systems $616_1$, $616_2$. Rather, the trailed vehicle 610 is displaced by the agricultural vehicle 10 to which the trailed vehicle 610 is attached. However, in some examples, the trailed vehicle 610 may be motorized. That is, the trailed vehicle 610 may comprise a prime mover for driving a drive wheel of each track system $616_i$. For example, instead of comprising rear idler wheels $626_1$, $626_2$, the track system $616_i$ may comprise a drive wheel for driving the track 622.

While in embodiments considered above the vehicle 10 is an agricultural vehicle, in other embodiments, the vehicle 10 may be an industrial vehicle such as a construction vehicle (e.g., a loader, a telehandler, a bulldozer, an excavator, etc.) for performing construction work or a forestry vehicle (e.g., a feller-buncher, a tree chipper, a knuckleboom loader, etc.) for performing forestry work, a military vehicle (e.g., a combat engineering vehicle (CEV), etc.) for performing military work, an all-terrain vehicle (ATV), a snowmobile, or any other vehicle operable off paved roads. Although operable off paved roads, the vehicle 10 may also be operable on paved roads in some cases.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

In case of any discrepancy, inconsistency, or other difference between terms used herein and terms used in any document incorporated by reference herein, meanings of the terms used herein are to prevail and be used.

Although various embodiments and examples have been presented, this was for purposes of description, but should not be limiting. Various modifications and enhancements will become apparent to those of ordinary skill in the art.

The invention claimed is:

1. A track for traction of a vehicle, the track being mountable around a track-engaging assembly configured to move the track around the track-engaging assembly, the track-engaging assembly comprising a plurality of wheels for engaging the track, the track being elastomeric to flex around the track-engaging assembly, the track comprising:
    a ground-engaging outer surface for engaging the ground;
    an inner surface opposite to the ground-engaging outer surface;
    elastomeric material;
    a monitoring device configured to issue a signal, the monitoring device comprising an electronic component carried by an electronic component substrate, and a piezoelectric generator configured to power the monitoring device, wherein the piezoelectric generator has a piezoelectric element deformable in response to deformation of a portion of the elastomeric material of the track to generate power, wherein the piezoelectric generator has an electrical conductor electrically interconnecting the piezoelectric element and the electronic component; and
    a protective substance coated on at least a portion of the electronic component of the monitoring device and allowing the signal to pass through the protective substance and the elastomeric material of the track, wherein the protective substance is inside the elastomeric material and engages the electronic component, the electrical conductor, and the piezoelectric generator, wherein the protective substance encapsulates the electronic component substrate, and wherein a portion of the piezoelectric generator extends from the protective substance and is uncovered by the protective substance.

2. A track for traction of a vehicle, the track being mountable around a track-engaging assembly configured to move the track around the track-engaging assembly, the track-engaging assembly comprising a plurality of wheels for engaging the track, the track being elastomeric to flex around the track-engaging assembly, the track comprising:
    a ground-engaging outer surface for engaging the ground;
    an inner surface opposite to the ground-engaging outer surface;
    elastomeric material;
    a monitoring device configured to issue a signal, the monitoring device comprising a piezoelectric generator configured to power the monitoring device, the piezoelectric generator comprising a piezoelectric element embedded in a portion of the elastomeric material of the track, wherein the piezoelectric element is deformable in response to deformation of the portion of the elastomeric material of the track to generate power, wherein the piezoelectric generator has an electrical conductor electrically interconnecting the piezoelectric element and an electronic component of the monitoring device, wherein the electronic component is carried by an electronic component substrate; and
    a protective substance that is inside the elastomeric material and engages the electronic component, the electrical conductor, and the piezoelectric generator, wherein the protective substance encapsulates the electronic component substrate, and wherein a portion of the piezoelectric generator extends from the protective substance and is uncovered by the protective substance.

3. The track of claim 1, wherein: the monitoring device is configured to monitor the track; and the signal relates to a characteristic of the track.

4. The track of claim 3, wherein the characteristic of the track is a temperature of the track.

5. The track of claim 1, wherein: the monitoring device is configured to monitor soil on which the vehicle moves; and the signal relates to the soil.

6. The track of claim 5, wherein the signal relates to compaction of the soil.

7. The track of claim 5, wherein: the monitoring device comprises a moisture sensor configured to sense a moisture level of the soil; and the signal relates to the moisture level of the soil.

8. The track of claim 5, wherein: the monitoring device comprises a chemical sensor configured to sense a chemical characteristic of the soil; and the signal relates to the chemical characteristic of the soil.

9. The track of claim 1, wherein: the monitoring device is configured to monitor at least one of the track and a road travelled upon by the vehicle; and the signal relates to positioning of the track relative to the road.

10. The track of claim 9, wherein the signal is directed to a powertrain of the vehicle to operate the powertrain of the vehicle differently when the vehicle is off-road than when the vehicle is on-road.

11. The track of claim 1, wherein the signal relates to a substance used where the vehicle travels.

12. The track of claim 1, wherein the signal relates to equipment external to the vehicle.

13. The track of claim 12, wherein the equipment comprises at least one of irrigation equipment and fertilization equipment.

14. The track of claim 1, wherein the protective substance is malleable at least during application of the protective substance onto at least the portion of the electronic component of the monitoring device.

15. The track of claim 14, wherein the protective substance is malleable after application of the protective substance onto the monitoring device during use of the track.

16. The track of claim 1, wherein the piezoelectric element is bendable in response to bending of the portion of the elastomeric material of the track to generate power.

17. The track of claim 1, wherein the piezoelectric element comprises a piezoelectric film.

18. The track of claim 1, wherein the piezoelectric generator comprises a piezoelectric substrate supporting the piezoelectric element.

19. The track of claim 18, wherein: the monitoring device comprises a sensor; the electronic component is part of the sensor; and the piezoelectric substrate is contiguous to and engages the electronic component substrate.

20. The track of claim 1, wherein: the monitoring device comprises a sensor; the protective substance coats the electronic component and a substrate of the sensor; and a sensing element of the sensor extends outside of the protective substance.

21. The track of claim 1, wherein the signal is indicative of a level of wear of the track.

22. The track of claim 1, wherein the signal relates to servicing of the track.

* * * * *